United States Patent
Arimilli

(10) Patent No.: US 6,275,502 B1
(45) Date of Patent: Aug. 14, 2001

(54) ADVANCED PRIORITY STATISTICAL MULTIPLEXER

(75) Inventor: Harinarayana Arimilli, Coon Rapids, MN (US)

(73) Assignee: Multi-Tech Systems, Inc., Mounds View, MN (US)

( * ) Notice: Subject to any disclaimer, the term of this patent is extended or adjusted under 35 U.S.C. 154(b) by 0 days.

(21) Appl. No.: 08/885,534

(22) Filed: Jun. 30, 1997

Related U.S. Application Data

(63) Continuation of application No. 08/333,365, filed on Nov. 2, 1994, now Pat. No. 5,757,801, which is a continuation-in-part of application No. 08/229,958, filed on Apr. 19, 1994, now Pat. No. 5,682,386.

(51) Int. Cl.⁷ .................. H04J 3/16; H04J 3/22

(52) U.S. Cl. .............. 370/468; 370/477; 370/537; 370/471

(58) Field of Search ................ 370/229, 230, 370/232, 235, 391, 412, 464, 465, 468, 477, 493, 435, 437, 538, 539, 540, 541, 542, 543

(56) References Cited

U.S. PATENT DOCUMENTS

| | | | |
|---|---|---|---|
| Re. 34,034 | 8/1992 | O'Sullivan | 379/59 |
| 3,304,372 | 2/1967 | Filipowsky et al. | 179/2 |

(List continued on next page.)

FOREIGN PATENT DOCUMENTS

| | | |
|---|---|---|
| 3504064 | 8/1986 | (DE) . |
| 3630469 | 3/1988 | (DE) . |
| 3409532 | 4/1989 | (DE) . |

(List continued on next page.)

OTHER PUBLICATIONS

European Search Report for Application No. EP 93403164 completed on Sep. 21, 1995 by Examiner Lambley; 4 pages.

(List continued on next page.)

*Primary Examiner*—Ajit Patel
*Assistant Examiner*—Bob A. Phunkulh
(74) *Attorney, Agent, or Firm*—Schwegman, Lundberg, Woessner & Kluth, P.A.

(57) ABSTRACT

A data multiplexing network is described which multiplexes a plurality of asynchronous data channels with an asynchronous data stream representing compressed voice signals and/or facsimile signals onto a single synchronous data packet stream. The single synchronous data packet stream is then transmitted by a high speed statistical multiplexer over a composite link to a second site using a modified high-level synchronous data link control protocol with an overlay of an advanced priority statistical multiplexing algorithm. The asynchronous data channels and the compressed voice channel and/or facsimile signals are demultiplexed and reconstructed for sending to other asynchronous computer terminals and to a standard telephone or facsimile analog port at the second site, respectively. PBX trunk interfaces are also provided to allow PBX's to share the composite link between sites. Communication between the first site by voice or facsimile and the second site is transparent to the users. The multiplexer efficiently allocated the bandwidth of the composite link by detecting silence periods in the voice signals and suppressing the sending of the voice information to preserve bandwidth. An advanced priority statistical multiplexer is also described which dynamically allocates composite link bandwidth to both time-sensitive and non-time-sensitive data to maximize data throughout efficiency and quality while simultaneously reducing multiplexer processing overhead.

41 Claims, 63 Drawing Sheets

Microfiche Appendix Included
(2 Microfiche, 91 Pages)

U.S. PATENT DOCUMENTS

| | | |
|---|---|---|
| 3,781,818 * | 12/1973 | Pardoe et al. ............... 370/538 |
| 3,789,165 | 1/1974 | Campanella . |
| 3,904,830 | 9/1975 | Every, Sr. et al. . |
| 3,973,081 | 8/1976 | Hutchins . |
| 3,997,732 | 12/1976 | Every, Sr. et al. . |
| 4,100,377 | 7/1978 | Flanagan . |
| 4,107,471 | 8/1978 | Reed . |
| 4,205,202 | 5/1980 | Kahn . |
| 4,284,850 | 8/1981 | Clingenpeel . |
| 4,354,273 | 10/1982 | Araseki et al. . |
| 4,377,860 | 3/1983 | Godbole . |
| 4,403,322 | 9/1983 | Kato et al. . |
| 4,425,661 | 1/1984 | Moses et al. . |
| 4,445,213 | 4/1984 | Baugh et al. . |
| 4,446,555 * | 5/1984 | Devault et al. ............... 370/352 |
| 4,476,559 | 10/1984 | Brolin et al. . |
| 4,479,195 | 10/1984 | Herr et al. . |
| 4,479,213 | 10/1984 | Galand et al. . |
| 4,495,620 | 1/1985 | Steele et al. . |
| 4,500,987 | 2/1985 | Hasegawa . |
| 4,524,244 | 6/1985 | Faggin et al. . |
| 4,534,024 | 8/1985 | Maxemchuk et al. . |
| 4,546,212 | 10/1985 | Crowder, Sr. . |
| 4,549,291 * | 10/1985 | Renoulin et al. ............... 370/452 |
| 4,578,537 | 3/1986 | Faggin et al. . |
| 4,587,651 | 5/1986 | Nelson et al. . |
| 4,593,389 | 6/1986 | Wurzburg et al. . |
| 4,598,397 | 7/1986 | Nelson et al. . |
| 4,609,788 | 9/1986 | Miller et al. . |
| 4,610,022 | 9/1986 | Kitayama et al. . |
| 4,629,829 | 12/1986 | Puhl et al. . |
| 4,652,703 | 3/1987 | Lu et al. . |
| 4,660,218 | 4/1987 | Hashimoto . |
| 4,670,874 | 6/1987 | Sato et al. . |
| 4,697,281 | 9/1987 | O'Sullivan . |
| 4,700,341 | 10/1987 | Huang . |
| 4,707,831 | 11/1987 | Weir et al. . |
| 4,718,082 | 1/1988 | Parker et al. . |
| 4,740,963 | 4/1988 | Eckley . |
| 4,750,169 | 6/1988 | Carse et al. . |
| 4,751,510 | 6/1988 | De Saint Michel et al. . |
| 4,751,736 | 6/1988 | Gupta et al. . |
| 4,757,527 | 7/1988 | Beniston et al. . |
| 4,764,955 | 8/1988 | Galand et al. . |
| 4,794,595 | 12/1988 | Ohyama . |
| 4,807,250 | 2/1989 | Tanaka . |
| 4,809,271 | 2/1989 | Kondo et al. . |
| 4,813,040 | 3/1989 | Futato . |
| 4,827,085 | 5/1989 | Yaniv et al. . |
| 4,835,765 | 5/1989 | Bergmans et al. . |
| 4,839,802 | 6/1989 | Wonak et al. . |
| 4,845,746 | 7/1989 | Li . |
| 4,847,900 | 7/1989 | Wakim . |
| 4,862,449 | 8/1989 | Hoefkens et al. . |
| 4,864,559 | 9/1989 | Perlman . |
| 4,866,732 | 9/1989 | Carey et al. . |
| 4,873,715 | 10/1989 | Shibata . |
| 4,884,264 * | 11/1989 | Servel et al. ............... 370/422 |
| 4,887,265 | 12/1989 | Felix . |
| 4,890,282 | 12/1989 | Lambert et al. . |
| 4,901,333 | 2/1990 | Hodgkiss . |
| 4,905,282 | 2/1990 | McGlynn et al. . |
| 4,912,756 | 3/1990 | Hop . |
| 4,912,758 | 3/1990 | Arbel . |
| 4,914,650 | 4/1990 | Sriram . |
| 4,926,416 * | 5/1990 | Weik ............... 370/354 |
| 4,926,448 | 5/1990 | Kraul et al. . |
| 4,932,048 | 6/1990 | Kenmochi et al. . |
| 4,935,954 | 6/1990 | Thompson et al. . |
| 4,942,569 | 7/1990 | Maeno . |
| 4,953,210 | 8/1990 | McGlynn et al. . |
| 4,965,789 | 10/1990 | Bottau et al. . |
| 4,972,457 | 11/1990 | O'Sullivan . |
| 4,972,462 | 11/1990 | Shibata . |
| 4,972,483 | 11/1990 | Carey . |
| 4,977,591 | 12/1990 | Chen et al. . |
| 4,991,169 | 2/1991 | Davis et al. . |
| 4,993,022 * | 2/1991 | Kondo et al. ............... 370/462 |
| 4,995,059 | 2/1991 | Ishikawa . |
| 4,998,241 | 3/1991 | Brox et al. . |
| 5,001,710 | 3/1991 | Gawrys et al. . |
| 5,001,745 | 3/1991 | Pollock . |
| 5,005,183 | 4/1991 | Carey et al. . |
| 5,008,901 | 4/1991 | Wallach et al. . |
| 5,008,926 | 4/1991 | Misholi . |
| 5,014,232 | 5/1991 | Andre . |
| 5,020,058 | 5/1991 | Holden et al. . |
| 5,025,443 | 6/1991 | Gupta . |
| 5,036,513 | 7/1991 | Greenblatt . |
| 5,044,010 | 8/1991 | Frenkiel et al. . |
| 5,046,188 | 9/1991 | Molnar . |
| 5,051,720 | 9/1991 | Kittirutsunetorn . |
| 5,062,133 | 10/1991 | Melrose . |
| 5,065,395 | 11/1991 | Shenoi et al. . |
| 5,065,425 | 11/1991 | Lecomte et al. . |
| 5,081,647 | 1/1992 | Bremer . |
| 5,083,310 | 1/1992 | Drory . |
| 5,086,471 | 2/1992 | Tanaka et al. . |
| 5,099,472 | 3/1992 | Townsend et al. . |
| 5,107,519 | 4/1992 | Ishikawa . |
| 5,115,429 | 5/1992 | Hluchyj et al. . |
| 5,121,385 | 6/1992 | Tominaga et al. . |
| 5,127,001 | 6/1992 | Steagall et al. . |
| 5,127,041 | 6/1992 | O'Sullivan . |
| 5,132,966 * | 7/1992 | Hayano et al. ............... 370/233 |
| 5,136,586 | 8/1992 | Greenblatt . |
| 5,138,662 | 8/1992 | Amano et al. . |
| 5,146,470 | 9/1992 | Fujii et al. . |
| 5,150,410 | 9/1992 | Bertrand . |
| 5,151,937 | 9/1992 | Chujo et al. . |
| 5,153,897 | 10/1992 | Sumiyoshi et al. . |
| 5,162,812 | 11/1992 | Aman et al. . |
| 5,164,982 | 11/1992 | Davis . |
| 5,177,734 | 1/1993 | Cummiskey et al. . |
| 5,182,762 | 1/1993 | Shirai et al. . |
| 5,187,591 | 2/1993 | Guy et al. . |
| 5,187,692 | 2/1993 | Haneda et al. . |
| 5,193,110 | 3/1993 | Jones et al. . |
| 5,195,130 | 3/1993 | Weiss et al. . |
| 5,208,812 | 5/1993 | Dudek et al. . |
| 5,208,850 | 5/1993 | Kino . |
| 5,214,656 | 5/1993 | Chung et al. . |
| 5,227,876 * | 7/1993 | Cucchi et al. ............... 370/235 |
| 5,228,026 | 7/1993 | Albrow et al. . |
| 5,233,660 | 8/1993 | Chen . |
| 5,235,595 | 8/1993 | O'Dowd . |
| 5,249,218 | 9/1993 | Sainton . |
| 5,258,983 | 11/1993 | Lane et al. . |
| 5,261,027 | 11/1993 | Taniguchi et al. . |
| 5,263,019 | 11/1993 | Chu . |
| 5,272,695 | 12/1993 | Makino et al. . |
| 5,276,703 | 1/1994 | Budin et al. . |
| 5,278,900 | 1/1994 | Van Gerwen et al. . |
| 5,280,479 * | 1/1994 | Mary ............... 370/462 |
| 5,282,197 | 1/1994 | Kreitzer . |
| 5,283,638 | 2/1994 | Engberg et al. . |
| 5,283,819 | 2/1994 | Glick et al. . |
| 5,289,539 | 2/1994 | Maruyama . |
| 5,295,136 | 3/1994 | Ashley et al. . |
| 5,307,413 | 4/1994 | Denzer . |
| 5,309,562 | 5/1994 | Li . |

| | | |
|---|---|---|
| 5,313,498 | 5/1994 | Sano . |
| 5,317,604 | 5/1994 | Osterweil . |
| 5,319,682 | 6/1994 | Clark . |
| 5,327,520 | 7/1994 | Chen . |
| 5,329,472 | 7/1994 | Sugiyama . |
| 5,341,374 | 8/1994 | Lewen et al. . |
| 5,343,473 | 8/1994 | Cidon et al. . |
| 5,343,521 | 8/1994 | Jullien et al. . |
| 5,355,365 | 10/1994 | Bhat et al. . |
| 5,365,577 | 11/1994 | Davis et al. . |
| 5,371,853 | 12/1994 | Kao et al. . |
| 5,379,292 * | 1/1995 | Kurata et al. .................. 370/216 |
| 5,384,780 | 1/1995 | Lomp et al. . |
| 5,390,239 | 2/1995 | Morris et al. . |
| 5,406,557 | 4/1995 | Baudoin . |
| 5,414,796 | 5/1995 | Jacobs . |
| 5,416,776 | 5/1995 | Panzarella et al. . |
| 5,438,614 | 8/1995 | Rozman et al. . |
| 5,444,770 | 8/1995 | Davis et al. . |
| 5,463,616 | 10/1995 | Kruse et al. ..................... 370/24 |
| 5,472,351 | 12/1995 | Greco et al. . |
| 5,473,676 | 12/1995 | Frick et al. . |
| 5,479,407 | 12/1995 | Ko et al. . |
| 5,490,060 | 2/1996 | Malec et al. . |
| 5,493,609 | 2/1996 | Winseck, Jr. et al. . |

FOREIGN PATENT DOCUMENTS

| | | | |
|---|---|---|---|
| 0 429 054 A3 | 5/1991 | (EP) | .............. H04L/29/06 |
| 488865A2 | 6/1992 | (EP) . | |
| 0 650 286 A2 | 4/1994 | (EP) | .............. H04M/11/06 |
| 2210237A | 1/1989 | (GB) . | |
| 63-054052 | 8/1988 | (JP) . | |
| 193489 | 7/1990 | (JP) . | |
| 257748 | 10/1990 | (JP) . | |
| WO 92/06550 | 4/1992 | (WO) . | |
| WO 93/22869 | 11/1993 | (WO) . | |
| WO 94/26056 | 11/1994 | (WO) . | |

OTHER PUBLICATIONS

S. Casale et al., Statistical Voice/High–Speed Data Multiplexing on a 64 KBIT/S Channel, *IEEE*, pp. 459–464, dated 1991.

T. Komiya et al, "An Approach to the Multifunction Graphic Terminal for the ISDN Environment", *IEEE*, pp. 32–36, dated 1988.

D. Gulick et al., "Interface for the ISDN to Your PC with A Voice/Data Board", *Electronic Design*, pp. 85–88, dated Dec. 10, 1987.

S. Sasaki et al., "Variable Rate Voice Coding System", *IEEE*, pp. 364–367, dated 1992.

"Video Calls Use Basic Phone Lines", Mitch Radcliffe, *MacWeek*, (Aug. 3, 1992).

"Radish System Lets Phone Users Send Voice, Data Simultaneously", *PC Week*, 9, 19, pp. 53, (May 11, 1992).

"Don't Just Tell Them, Show Them!", Glenn A. Pierce, Jr., *Automation*, (Aug. 1990).

"Mitsubishi Still Color Picture TV Phone", *Techno Japan*, 23, 6, (Jun. 1990).

"The Photophone", (Product Brochure) GTE (Feb. 15, 1990).

"Wrist TVs Still Fiction, but Police Videophone Take Hold", Ray Smith, *TE&M*, (Dec. 15, 1987).

"Audiographic Terminal", M. Laube, *Electrical Communication*, 60, 1, (1986).

"Comparison of Coding Schemes for Telewriting Systems", Tominaga et al., *ICCC*, (1986).

"Simultaneous Transmission of Voice and Handwriting Signals: Sketchphone System", Kishimoto et al., *IEEE*, (1981).

"Telewriting Terminal Equipment" (Recommendation T.150) *CCITT*, (1988).

"A Family of 2–Wire, Duplex Modems Operating at Data Signalling Rates . . . ", *Facsimile Recommendation V.32 CCITT*, (1988).

"*** PICFON Card Brochure", *Specom Technologies Corp.*, (Published Prior to Applicant's Invention).

Pen Telephone Brochure, Shimadzu, (Published Prior to Applicant's Invention).

"Telewriter Product Description", *Optel Communications, Inc.*, (Published Prior to Applicant's Invention).

"Videowriter '91 Product Description", *Optel Communications, Inc.*, (1991).

Copy of PCT Search Report for Application Serial No. PCT/US 96/11313 completed on Nov. 7, 1996, by C. Mikkelsen, 4 pages.

IBM Technical Disclosure Bulletin, *Speech Data Adaptive Multiplexer*, 27, No. 2, pp. 969, dated Jul. 1994.

Copy of PCT Search Report dated Apr. 25, 1996 by Areste Canosa for Application No. PCT/US95/05034 (8 pages).

Copy of PCT Search Report dated Apr. 10, 1996 by J. Lange for Application No. PCT/US95/14826 (7 pages).

Copy of PCT Search Report dated Mar. 28, 1996 by M. Vandevenne for Application No. PCT/US95/14829 (8 pages).

Copy of PCT Search Report dated May 24, 1996 by C. Canosa Areste for Application No. PCT/US 95/14253 (6 pages).

Copy of European Search Report dated Apr. 18, 1996 by S. Lambley for Application No. EP 93403164 (5 pages).

Canadian Application No. 2,104,701, Computer–Based Multifunction Personal Communications System, pp. 1–105, and 52 sheets of drawings, dated Jul. 9, 1994.

AT&T Microelectronics, "High Speed Data Pump Chip Sets," published in December 1991.

AT&T Microelectronics, "WE DSP16C Digital Signal Processor/CODEC Preliminary Data Sheet," 32 pages, published in May, 1991.

AT&T Microelectronics, "T7540 Digital Telephone CODEC Data Sheet Addendum," pp. 1–4, published in Jul., 1991.

AT&T Microelectronics, "T7540 Digital Telephone CODEC Preliminary Data Sheet," pp. 1–64, published in Jan., 1991.

Zilog Intelligent Peripheral Controllers, "Z84C01 Z80 CPU with Clock Generator/Controller," pp. 43–73, published in 1991.

Zilog Intelligent Peripheral Controllers, "Z84C90 CMOS Z80 KIO Serial/Parallel/counter/timer," pp.205–224, published in 1991.

U.S. West Caller ID publication, received Jul. 18, 1994, one page.

J.D. Mills, et al., "A Data and Boice System for the General Service Telephone Network," *IECON*, pp. 1143–1148, 1987.

Copy of European Search Report (Application No. EP 94304742), completed Jun. 8, 1995 by Examiner Mikkelsen.

"TechTips—A Periodic Round–up of Technical Applications, Notes and Information on MultiTech's Data Communications Products" by MultiTech Systems, vol. 2, No. 2, May 1992.

"MultiX25—X.25 PAD, The New MultiX25 PAD 8 Port X.25 Packet Assembler/Disassembler for Public and Private Data Networks," y MultiTech Systems.

Y. Akaiwa et al., "An Integrated Voice and Data Radio Access System," 1992, pp.255–258, IEEE.

CCITT V.42, "Error–Correcting Procedures for DCES Using Asynchronous–to–Synchronous Conversion", vol. VIII, pp. 296–370, dated 1988.

* cited by examiner

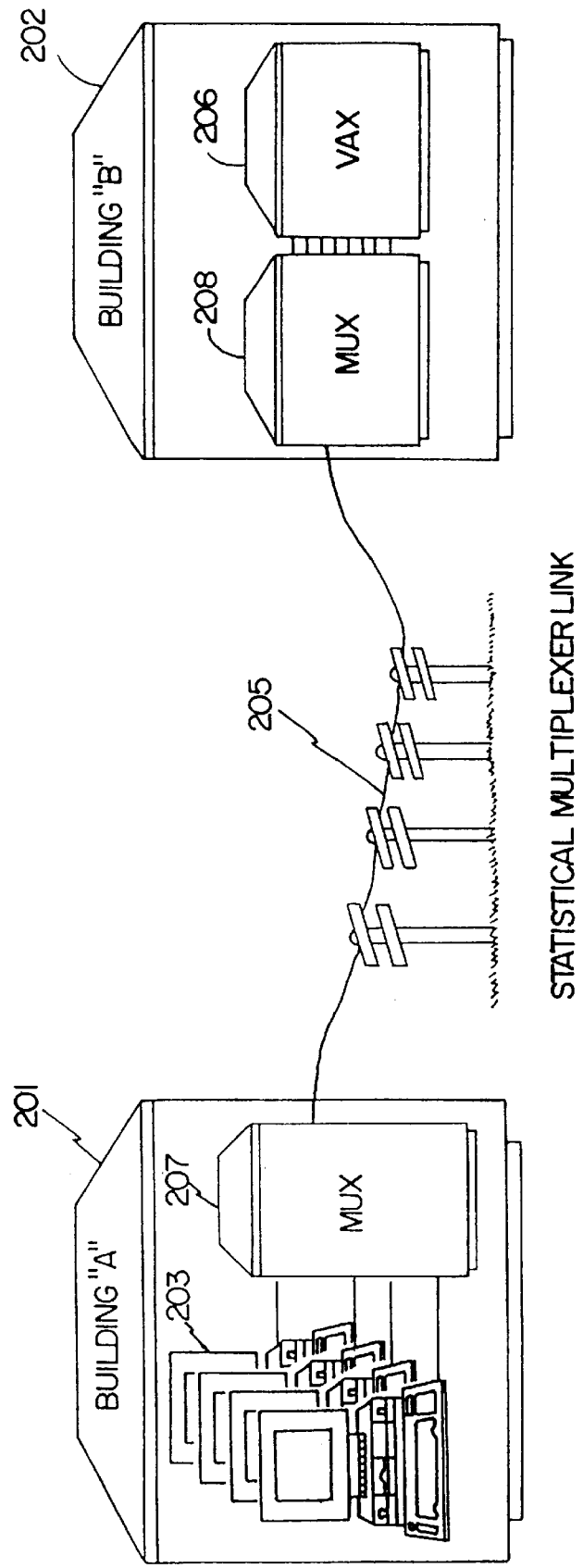
Fig. 2        PRIOR ART

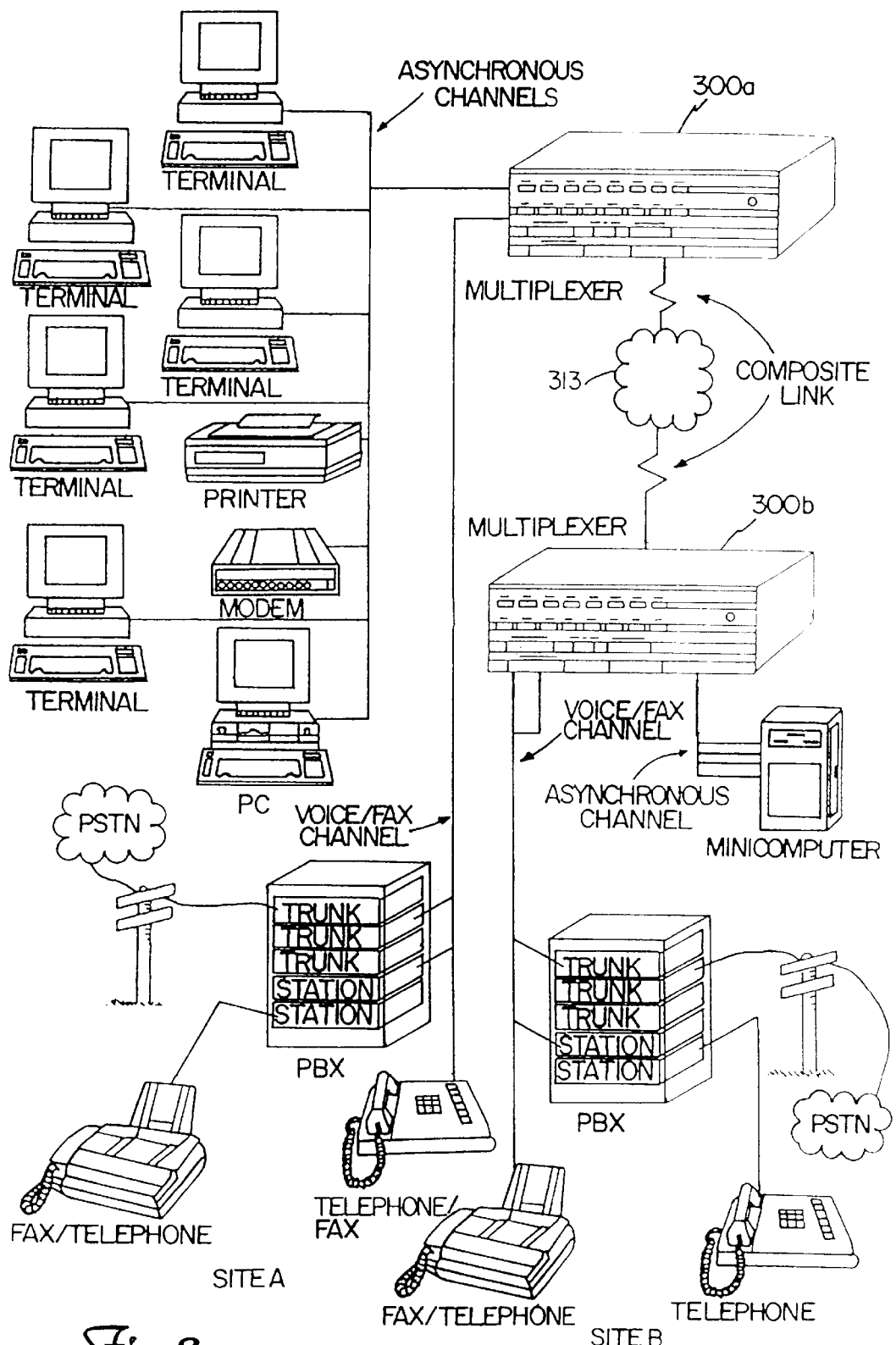
Fig. 3  TYPICAL VOICE/FAX/DATA NETWORK

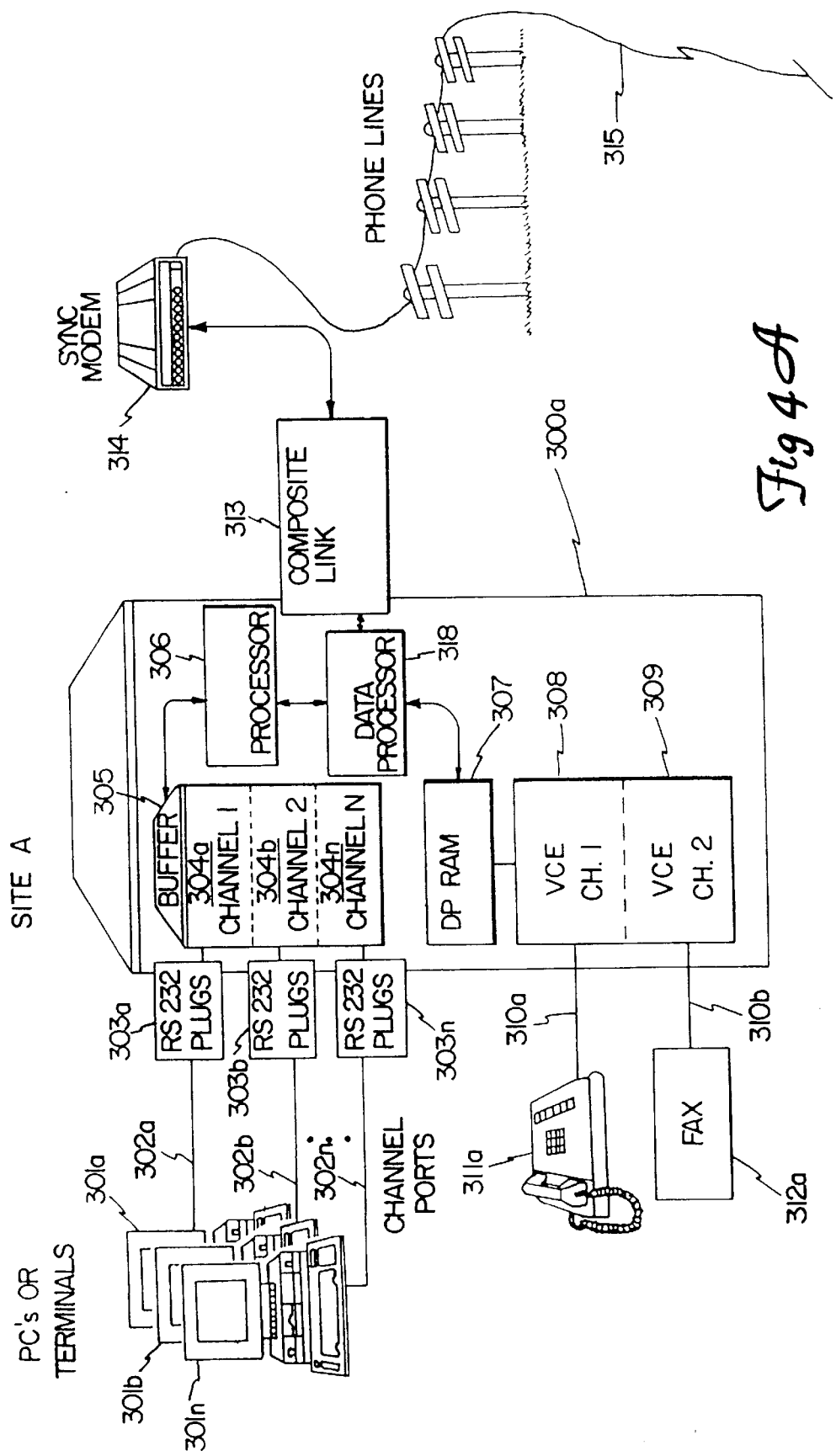

FXS TO FXS

FXS TO FXO

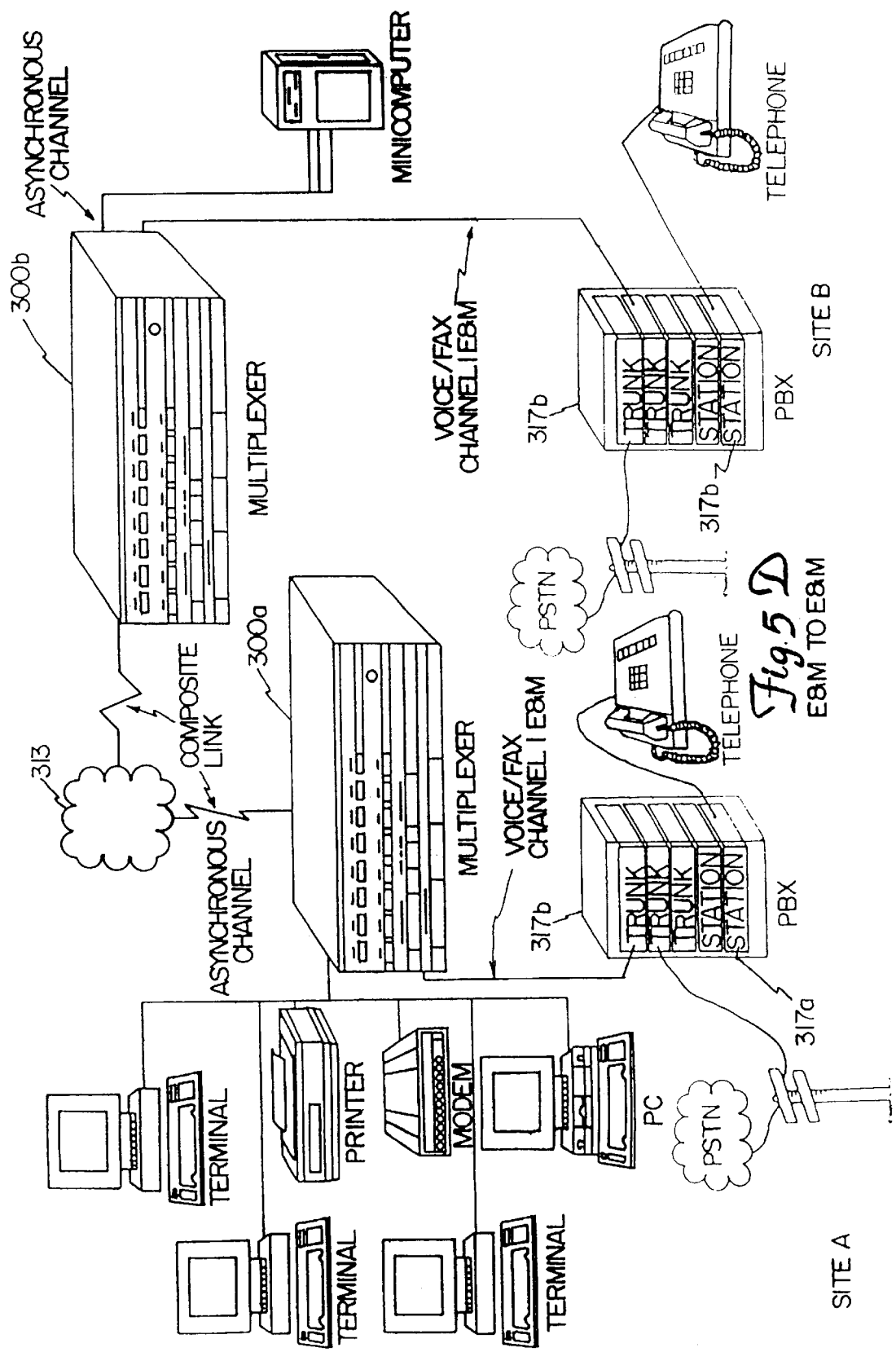
Fig. 5D E&M TO E&M

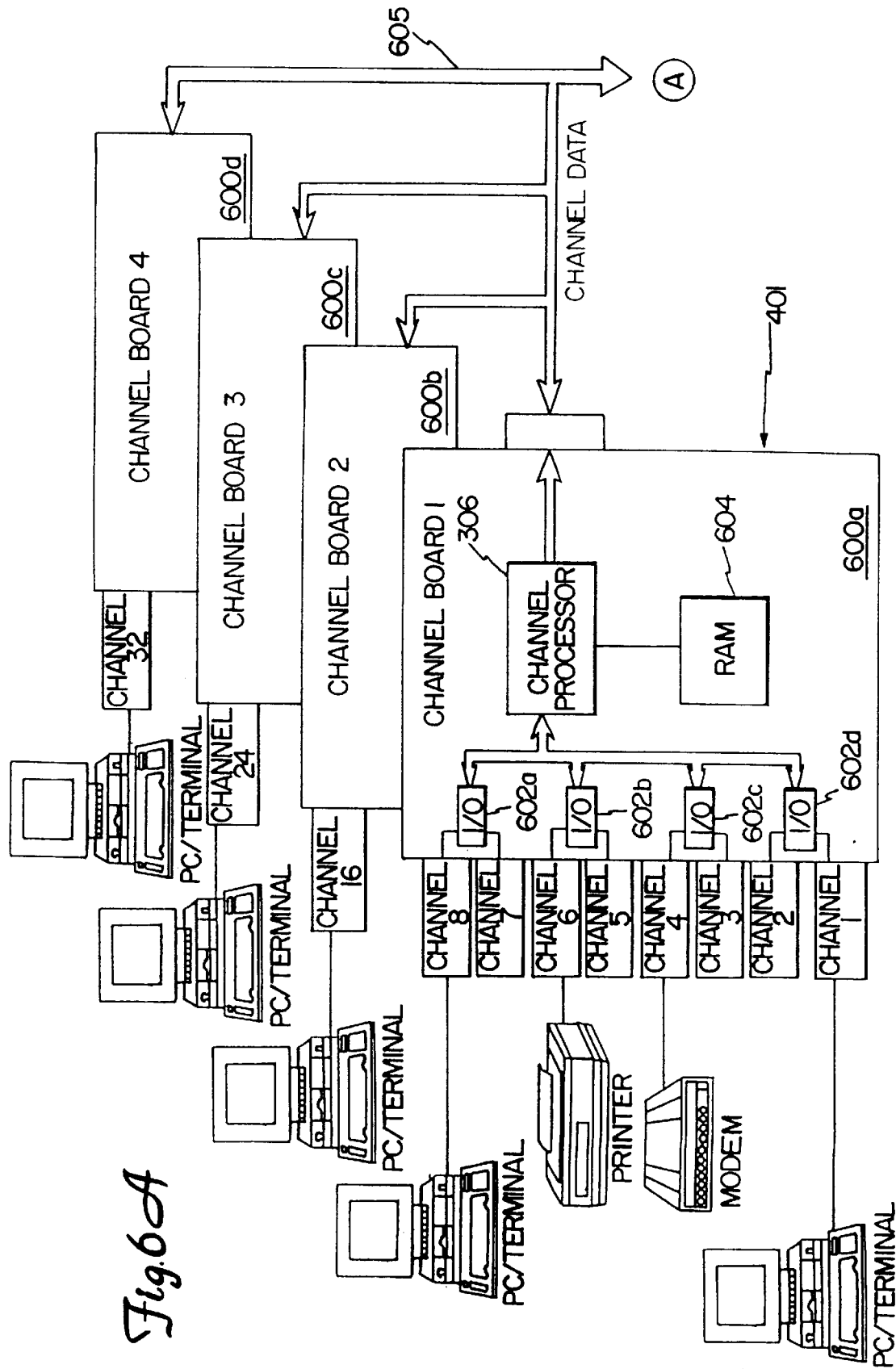

| FIG. 7A | FIG. 7B | FIG. 7C |
|---|---|---|
| FIG. 7D | FIG. 7E | FIG. 7F |
| FIG. 7G | FIG. 7H | FIG. 7I |

FIG. 7

| FIG. 8A | FIG. 8B | FIG. 8C |
|---|---|---|
| FIG. 8D | FIG. 8E | FIG. 8F |
| FIG. 8G | FIG. 8H | FIG. 8I |

FIG. 8

| FIG. 9A | FIG. 9B | FIG. 9C |
|---|---|---|
| FIG. 9D | FIG. 9E | FIG. 9F |
| FIG. 9G | FIG. 9H | FIG. 9I |

FIG. 9

| FIG. 10A | FIG. 10B | FIG. 10C |
|---|---|---|
| FIG. 10D | FIG. 10E | FIG. 10F |
| FIG. 10G | FIG. 10H | FIG. 10I |

FIG. 10

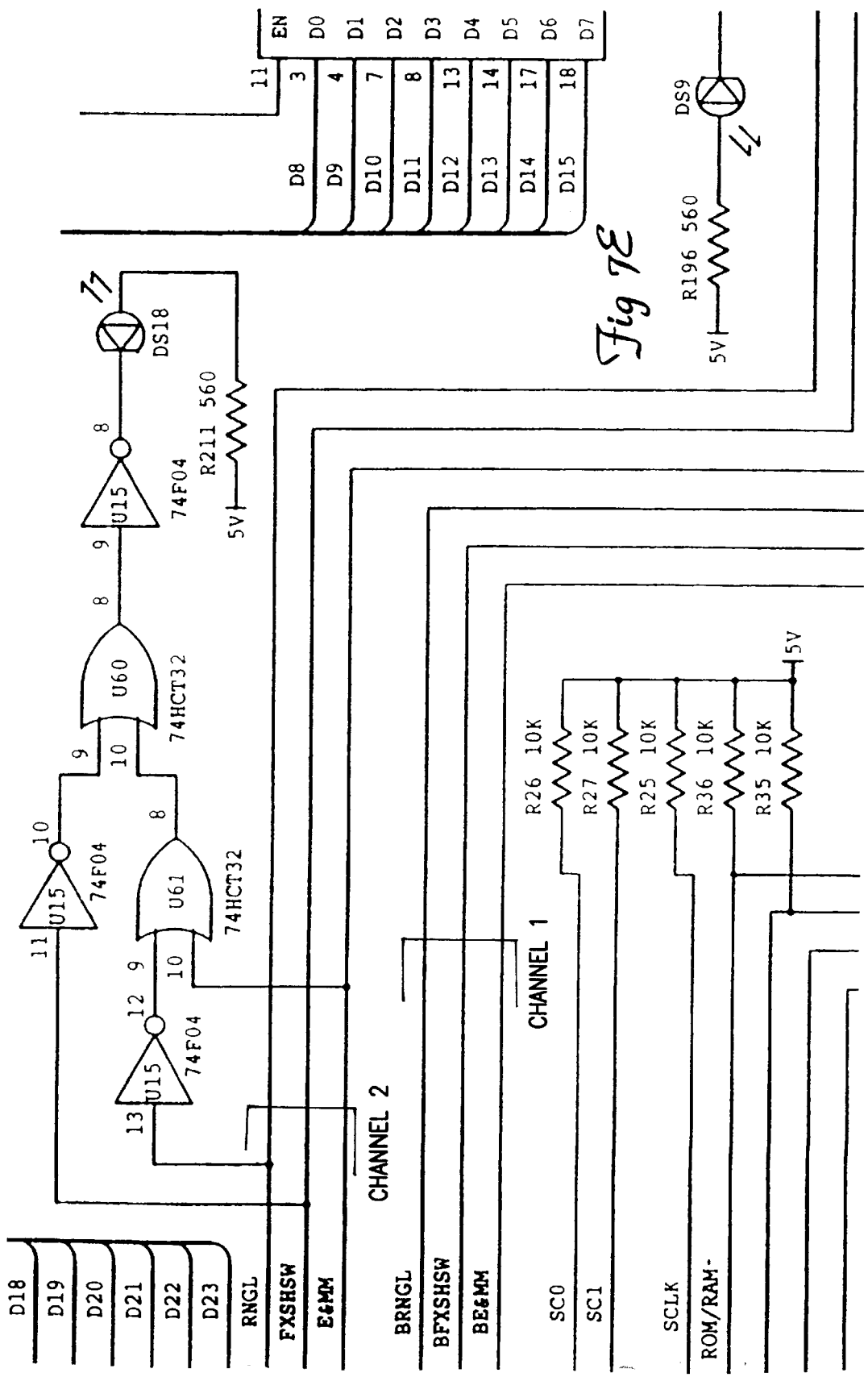

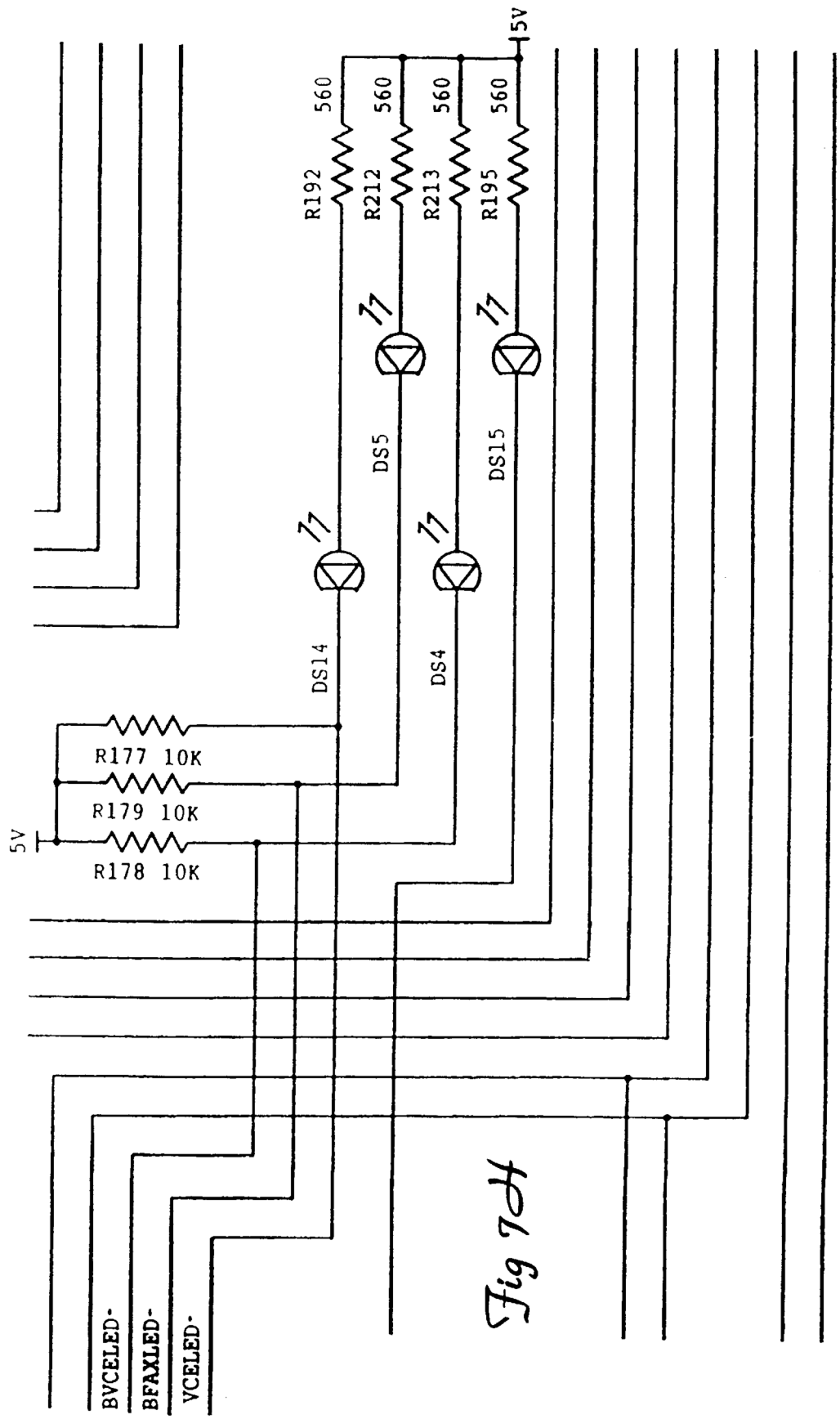

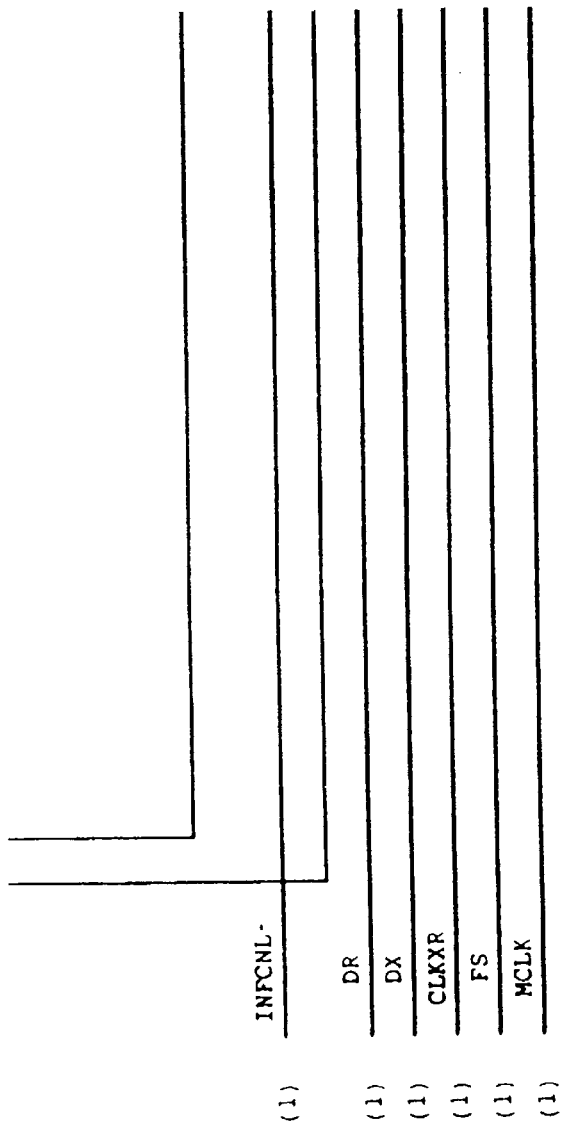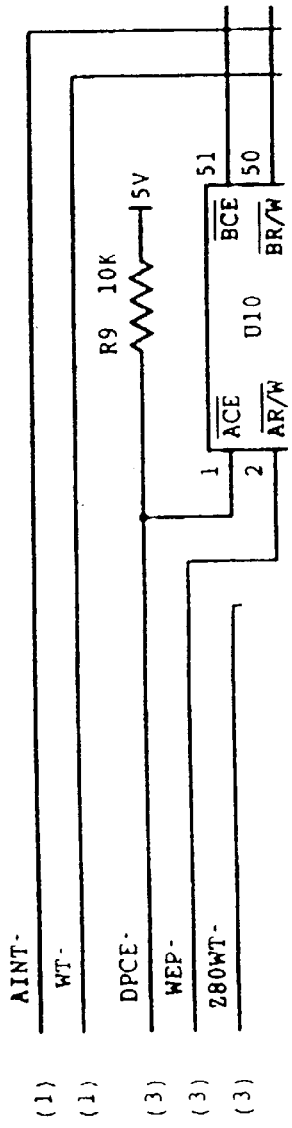
Fig. 8D

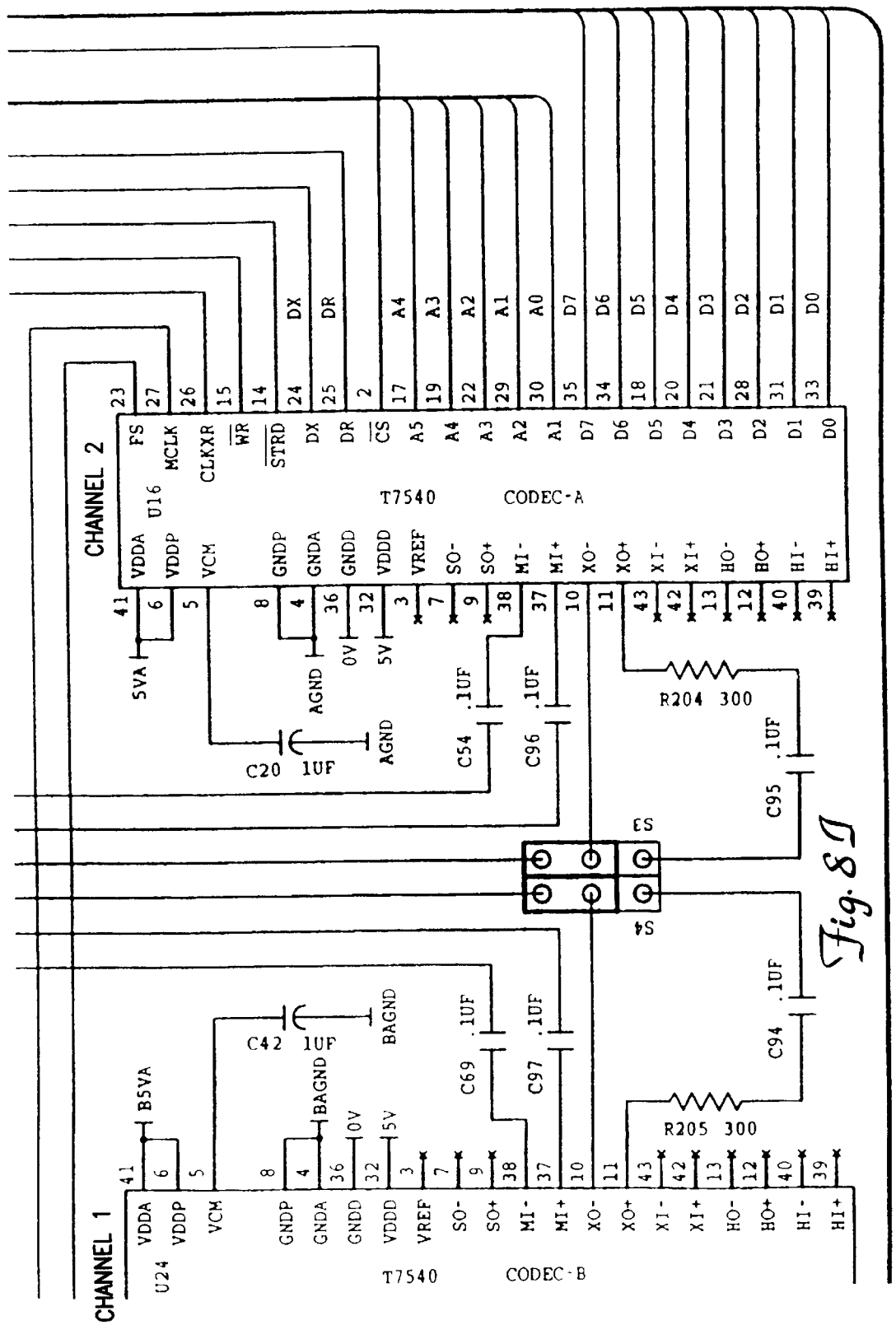

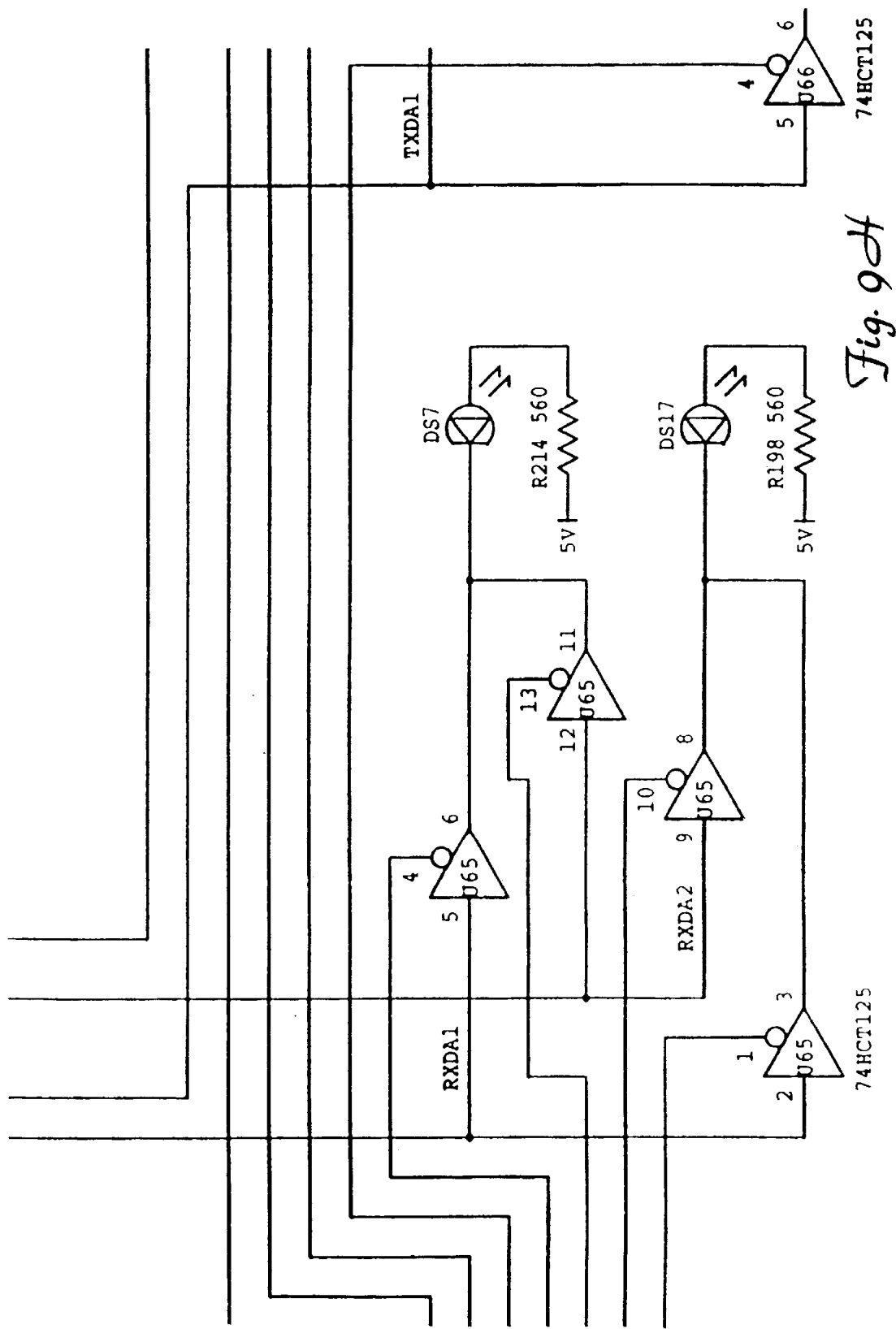

Fig. 16

| BLOCK I.D.# 02 | DEST. NODE (0-255) | BYTE COUNT | VOICE/FAX DATA | CRC BYTE #1 | CRC BYTE #2 |

Fig. 17

| BLOCK I.D.# 03 | BUFFER FULL=0 BUFFER EMPTY=1 | BYTE COUNT | SOURCE NODE # OF INITIATING MUX (BYTE A) | SOURCE NODE # OF ADJACENT MUX IN NETWORK (BYTE B) | ⋯ | SAME SOURCE NODE # AS BYTE B | CRC BYTE #1 | CRC BYTE #2 |

← 8 BYTES MAXIMUM →

Fig. 18

| BLOCK I.D. # 04 | DEST. NODE # (0-255) | DEST. CHANNEL # (0-31) | SOURCE NODE # (0-255) | SOURCE CHANNEL # (0-31) | SEQUENCE # (N0-N7) N=(0,9) | BYTE COUNT (0-128) | DATA BYTE #1 | ... | DATA BYTE #128 | CRC BYTE #1 | CRC BYTE #2 |

VARIABLE # OF BYTES 1 TO 128

Fig. 19

| BLOCK I.D. (05H), 85H | DEST NODE # (0-255) | SOURCE NODE # (0-255) | SEQUENCE # (N0-N8) N=(0,9) | # OF RCV STATUS BYTES TO FOLLOW (1-4) | RCV STATUS BYTE #1 | ... | RCV STATUS BYTE #4 | # OF EIA BYTES TO FOLLOW (0-32) | EIA BYTES 1-32 | CRC BYTE #1 | CRC BYTE #2 |

MAX 4 BYTES

MAX 32 BYTES

ADVANCED PRIORITY STATISTICAL MULTIPLEXER

This application is a continuation of U.S. patent application Ser. No. 08/333,365, filed Nov. 2, 1994 now issued as U.S. Pat. No. 5,757,801.

This is a continuation in part of copending U.S. patent application Ser. No. 08/229,958 Now U.S. Pat. No. 5,682,386 which is filed Apr. 19, 1994 now issued as U.S. Pat. No. 5,757,801 entitled "Data/Voice/Fax Compression Multiplexer" which is hereby incorporated by reference.

MICROFICHE APPENDIX

A microfiche appendix having 2 total number of microfiche and 91 number of frames is included in this specification.

FIELD OF THE INVENTION

The present invention relates to data communication multiplexers and in particular to automatic data bandwidth allocation in communication multiplexers which multiplex data, facsimile and compressed voice over a single composite link.

BACKGROUND OF THE INVENTION

Data multiplexers in the telecommunications field are used to combine several asynchronous and synchronous data communication signals from individual data terminal equipment (DTE) sources such as computer terminals or personal computers (PC's) onto a single composite link. The individual asynchronous and synchronous signals from the PC's are connected to the multiplexer channel inputs and converted into a single signal called the composite signal which is then sent over a single analog or digital link called the composite link. Of course, the composite link may be a dedicated telephone line, a leased line, or a single private wire.

The data multiplexer combines the channel signals from individual PC's into a composite signal by using one of a variety of techniques such as frequency division multiplexing, time division multiplexing and statistical time division multiplexing. Frequency division multiplexers assign separate frequencies to each signal and combine the frequencies onto the single composite link. Time division multiplexers assign a time slice of a single carrier to each of the channels being combined. Statistical time division multiplexers are an adaptation of time division multiplexers in which only those channels actually sending data get a slice of time. This results in a more efficient use of the composite link.

Typically, a data multiplexer is used as an efficient alternative to traditional data communications in which a single channel uses a single telephone line link. By combining a plurality of asynchronous channels into a composite link, fewer telephone lines or leased lines and less equipment is used to transfer the data. This is especially cost effective when a four wire "leased" line is used to connect a pair of synchronous modems. This type of private line offers a degree of security that public dial-up telephone lines cannot match. In addition, the superior error correction of a synchronous multiplexer network is preferred over the single telephone line asynchronous connections. Better yet, the use of a digital line with a DSU (Digital Service Unit) connection is more reliable and error free than analog.

FIG. 1 shows a typical arrangement for a prior art connection of a plurality of PC's at building A 101 and a computer system at building B 102. The computer system at building B may be personal computers (PC's) 103 such as those shown in building A or any variety of computer equipment devices. Traditional dial-up telephone links 105a, 105b, 105c through 105n are used between the plurality of PC's in building A 101 and the plurality of data terminal equipment (DTE) devices of building B such as a VAX computer 106. Each asynchronous link, therefore, requires its own dial-up link 105a, 105b, 105c through 105n, which is in many cases not cost effective. The connections may be between two sites, or multiple sites may be connected.

FIG. 2 shows a prior art data multiplexer scheme in which a plurality of PC's 203 at building "A" 201 are multiplexed using a data multiplexer and synchronous modem 207 to transmit the information over a single telephone link 205 to building "B" 202. The signals are then demultiplexed by a similar multiplexor/modem 208 and transmitted to the DTE of building "B" 202, which for illustrative purposes is shown as a VAX computer 206.

In general, FIG. 2 describes a data multiplexer 207 and, in particular, a device manufactured by the assignee of the present invention called the MultiMux (model 900, 1600 or 3200) product from Multi-Tech Systems, Inc. of Mounds View, Minn. The product allows for up to n-RS232 connections to local PC's 203, dumb terminals, host computers such as a DEC VAX 206, or other devices which communicate via asynchronous connection. In one product environment, n equals eight where eight PC's or other asynchronous devices can be attached to eight RS232 ports. The composite link is typically handled through an proprietary protocol with data rates up to 64 kilobytes per second. Not shown is a command port for menu driven control of the operational settings of the data multiplexer.

Connections from one site to another site over a composite link using a dedicated line is an efficient use of the line resources, however additional line connections are still typically needed between the two sites or more sites for traditional telephone voice or facsimile connections between the sites. There is a need in the art, therefore, to combine compressed voice grade telephone signals with data signals and facsimile signals and transmit all over a composite link to further increase the efficient use of a single telephone line connection. There is yet a further need in the art to combine voice grade telephone signals with both synchronous and asynchronous data signals for transmission over a composite link for enhanced efficiency of a single telephone line connection.

SUMMARY OF THE INVENTION

The present invention solves the aforementioned deficiencies of the prior art and solves other problems that will be understood and appreciated by those skilled in the art upon reading and understanding the present specification. The present invention describes a data multiplexing network which combines a plurality of asynchronous and synchronous data channels with an asynchronous data stream representing compressed voice signals and/or facsimile signals onto a single synchronous data packet stream. The single synchronous data packet stream is then transmitted by a high speed statistical multiplexer over a composite link to a second site using a modified high-level synchronous data link control protocol with an overlay of an advanced priority statistical multiplexing algorithm. The asynchronous/synchronous data channels and the compressed voice channel and/or facsimile signals are demultiplexed and reconstructed at the second site for sending to other asynchronous and synchronous data terminal equipment and to a standard telephone or facsimile analog port or PBX interface, respectively. Communication between the first site by voice or facsimile and the second site is transparent to the users.

The total bandwidth of the composite link communicating between sites may be instantaneously allocated to high priority data (time sensitive) and low priority data (non-time-sensitive) based on instantaneous system demands. In voice over data communications it is possible to greatly reduce bandwidth allocated to the high priority voice packet information by eliminating transmissions of repeated silent packets. The voice detection algorithm tells the data processor that the packet is empty which is representative of silence. The data processor then does not send the packet, but instead sends a flag to the other side of the composite link to indicate no voice is being sent. In the event of silence, the maximum low priority data (asynchronous or synchronous data) packet size is dynamically changed based on the use of the voice channel. If there is a lot of silence, or the voice channel is not active at all, then the maximum low priority data packet size can grow to be quite large providing a larger asynchronous and synchronous data channel throughput. An advanced priority statistical multiplexer ensures maximum data throughput quality and efficiency while simultaneously reducing multiplexer processing overhead.

DESCRIPTION OF THE DRAWINGS

In the drawings, where like numerals describe like components throughout the several views.

FIG. 2 is a prior art description of the connection between building A and building B using a statistical multiplexer link;

FIG. 3 is a general block diagram showing the preferred embodiment of the present invention which combines both telephone and facsimile information through a number of possible alternative interfaces with digital data information for transmission to and demultiplexing at a remote site;

FIG. 5D is a diagram showing a fourth one of the preferred connections of the present invention which multiplexes voice telephone and facsimile information through a local PBX with local digital data information for transmission to and demultiplexing at a remote site for connection to other DTE devices and to remote PBX for remote voice telephone and facsimile equipment;

FIGS. 6A, 6B and 6C are detailed block diagrams of the asynchronous channel cards, the aggregate cards and the voice/fax cards, respectively, of the multiplexer shown in FIG. 4B;

FIG. 16 shows a Voice/Fax Data Frame used to transmit voice/fax channel data;

FIG. 17 shows a Network Control Frame used in a networking environment;

FIG. 18 shows an Asynchronous Channel Data Frame used to transmit asynchronous channel data;

DETAILED DESCRIPTION OF PREFERRED EMBODIMENTS

Figure 1:
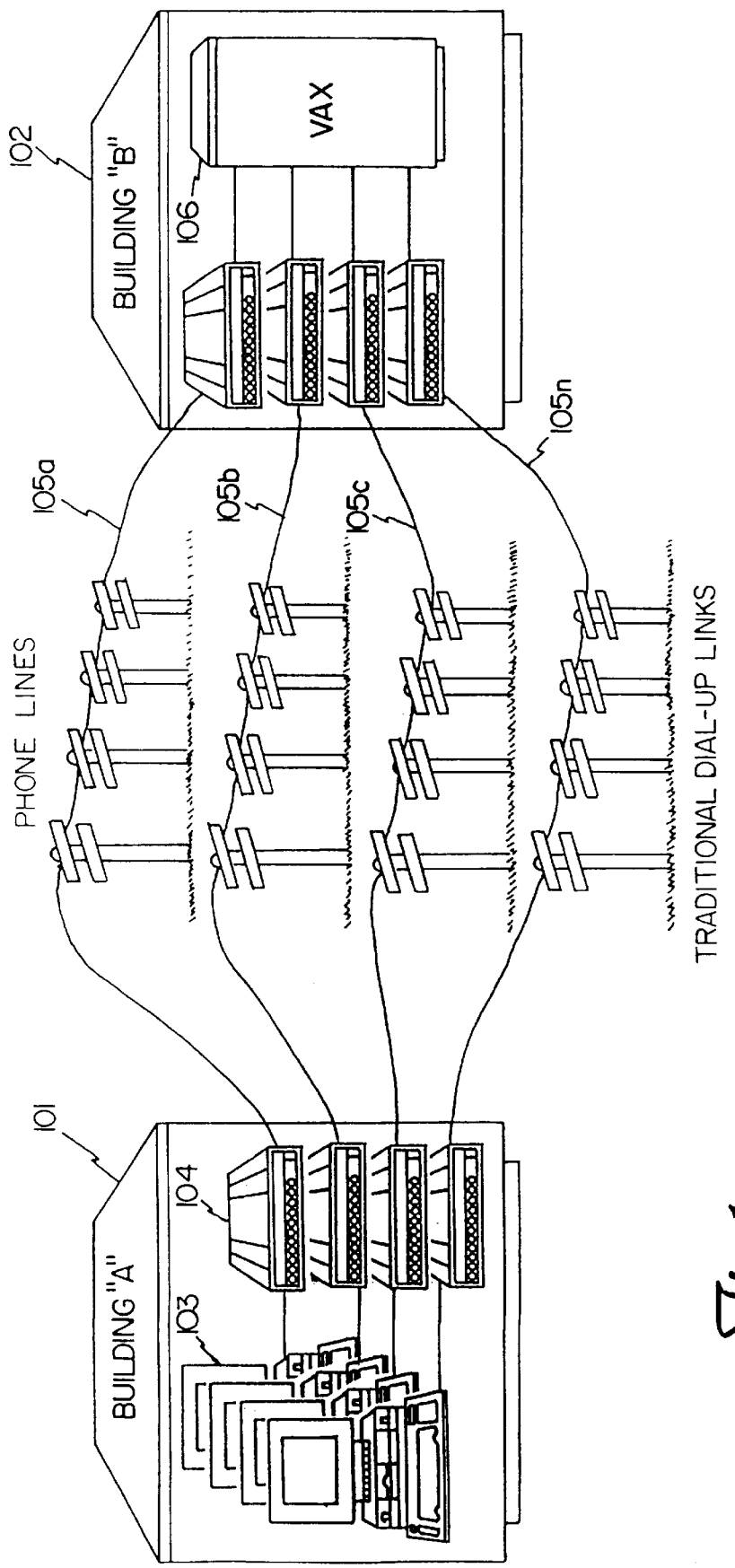
FIG. 1 is a drawing of a prior art connection between building A and building B using traditional dial-up telephone links by modem.

In the following Detailed Description of the Preferred Embodiment, reference is made to the accompanying drawings which form a part hereof and in which is shown by way of illustration specific embodiments in which the invention may be practiced. These embodiments are described in sufficient detail to enable those skilled in the art to practice and use the invention, and it is to be understood that other embodiments may be utilized and that electrical, logical, and structural changes may be made without departing from the spirit and the scope of the present invention. The following detailed description is, therefore, not to be taken in a limiting sense and the scope of the present invention is defined by the appended claims.

System Overview

FIG. 3 is a block diagram showing a plurality of connection combinations for the preferred embodiment of the present invention which is a communication system in which a data/voice/fax multiplexer 300a is configured to take voice information from telephone equipment, facsimile information from facsimile machines and asynchronous and synchronous data from data terminal equipment (DTE) devices and combine this information and data for transmission over a single composite communications link. Data/voice/fax multiplexers 300a and 300b (generally referred to as data/voice/fax multiplexer 300) are identically configured for multiplexing and demultiplexing this data and information. The result of this connection allows telephone, facsimile and data communications between sites "A" and "B" in a method of communication which appears to users at both sites to be simultaneous and transparent.

The present invention shown in FIG. 3 connects a plurality of data terminal equipment (DTE) devices such as computers, terminals, printers, modems, etc., through asynchronous and synchronous channels to the data/voice/fax multiplexer 300 at site "A". Also, telephone equipment such as telephone desk sets, PBX equipment and facsimile (fax) equipment are also connected to data/voice/fax multiplexer 300. The data/voice/fax multiplexer 300 is configured to take analog voice channel inputs from telephone equipment through specially configured voice channel interfaces to be digitized, compressed and encoded into a special packet protocol using a voice compression algorithm. Multiplexer 300 is also configured to connect to fax equipment to receive and demodulate the fax picture data to place the decoded picture data into the special packet protocol. The asynchronous/synchronous data received by multiplexer 300 from the DTE devices is combined with packetized picture data and packetized compressed voice information for multiplexing and synchronous transmission over the composite link.

At site "B", multiplexer 300b operates identically to multiplexer 300a at Site "A" to multiplex outgoing data, voice or fax information and to demultiplex incoming data from site "A". Each multiplexer 300 operates to compress or decompress the digitized voice data from telephone equipment using a voice compression algorithm described more fully below. Multiplexers 300 also operate to modulate and demodulate the fax picture data so that all three forms of data (DTE data, compressed voice data and facsimile picture data) are combined using a special packet protocol for transmission over the composite link, and synchronous data, such as LAN signals are modulated and demodulated as well. The composite link 313 may be an analog line such as a public telephone line using synchronous modems, a private leased line using synchronous modems or a digital line using DSU (Digital Service Units).

Hardware Overview

As shown in FIG. 4, the present invention combines a plurality of asynchronous data channels 302a–302n, which in many cases are RS232 interfaces 303a through 303n, along with a data packet stream of compressed voice or facsimile information into a single data stream. The single packetized data stream is transmitted using synchronous modem 314 over a single telephone line 315 to a remote site (Site "B"). As described more fully below, the composite link 313 may be selected to be an analog line such as a public telephone line using synchronous modems, a private leased line using synchronous modems or a digital line using DSU (Digital Service Units). FIG. 4 shows only one such composite link implementation which is a public telephone line 315 using synchronous modems 314.

As shown in FIG. 4, the basic elements at the local site (Site "A") connected to multiplexer 300a are terminals or PCs 301a–301n which are connected to channel ports 302a–302n which in turn connect to RS232 interfaces 3Q3a–303n. The channel ports 302a–302n provide access to data buffers 304a–304n controlled by microprocessor 306 which assembles the data packets for the data processor 318. The combined data packets are connected to the phone line 315 by synchronous modem 314 for transmission at high speeds over the dedicated phone line 315.

Asynchronous data from the individual PC's contain start and stop flags. The asynchronous data is collected from the individual PC's and is assembled into synchronous data packets, each with a header and a trailer. Typically, 85% to 90% of an asynchronous line is not used efficiently since the line is not carrying any data most of the time. By using a statistical multiplexer 314, the sporadic data activity of several individual channels 302a–302n connected to PC's 301a–301n can be combined onto a single line 315 to make more efficient use of that line. The microprocessor statistically multiplexes and collects the asynchronous data and packetizes it into synchronous data packets for transmission.

Synchronous data transmissions also gain efficiency over asynchronous data transmissions by reducing framing overhead. By way of example of the data transmission efficiency gram, asynchronous data is by definition formatted by framing each character with a start and stop bit. This process can account to up to one-third of the bits in a single transmission on an asynchronous link. In contrast to this, synchronous data is transmitted in a packet that first contains a header (which contains destination address), followed by a block of data characters and followed by trailer information (such as error checking codes, checks sums, etc.). Since the packet is addressed, a statistical multiplexer can arrange the packet in any order with the other asynchronous data based on demand and use of the asynchronous data lines.

Data from the asynchronous channels 302a–202n connected to the PC's 301a–301n is sent to the microprocessor for statistical multiplexing after first being buffered through buffer 305 and collected by internal microprocessor 306. The microprocessor 306 assembles the data into the synchronous data stream in the form of synchronous data packets which are framed by the address and error correcting data and sent to data processor 318 for multiplexing with voice and fax data packets for transmission over the synchronous composite link.

The composite link 315 may be a digital or analog network link, a simple analog leased line, a four-wire leased line or private line. Communication over the composite link is through a special synchronous modems operating typically at 300 to 19.2 kbps, 38.4 kbps or DSU's (Digital Service Units) operating at 9600 to in excess of 256 Kbps. The management and control format of the data transmitted over the composite link is described more fully below. This format is similar to the high-level synchronous data link control format (HDLC) used for inter-modem or DSU communication. A proprietary modified form of the HDLC is used with the preferred embodiment of the present invention which is called Modified HDLC or MHDLC. MHDLC is used in combination with an Advanced Priority Statistical Multiplexing (APSM) algorithm to achieve a highly efficient use of the composite link.

Multiplexer Overview

Figure 4A:
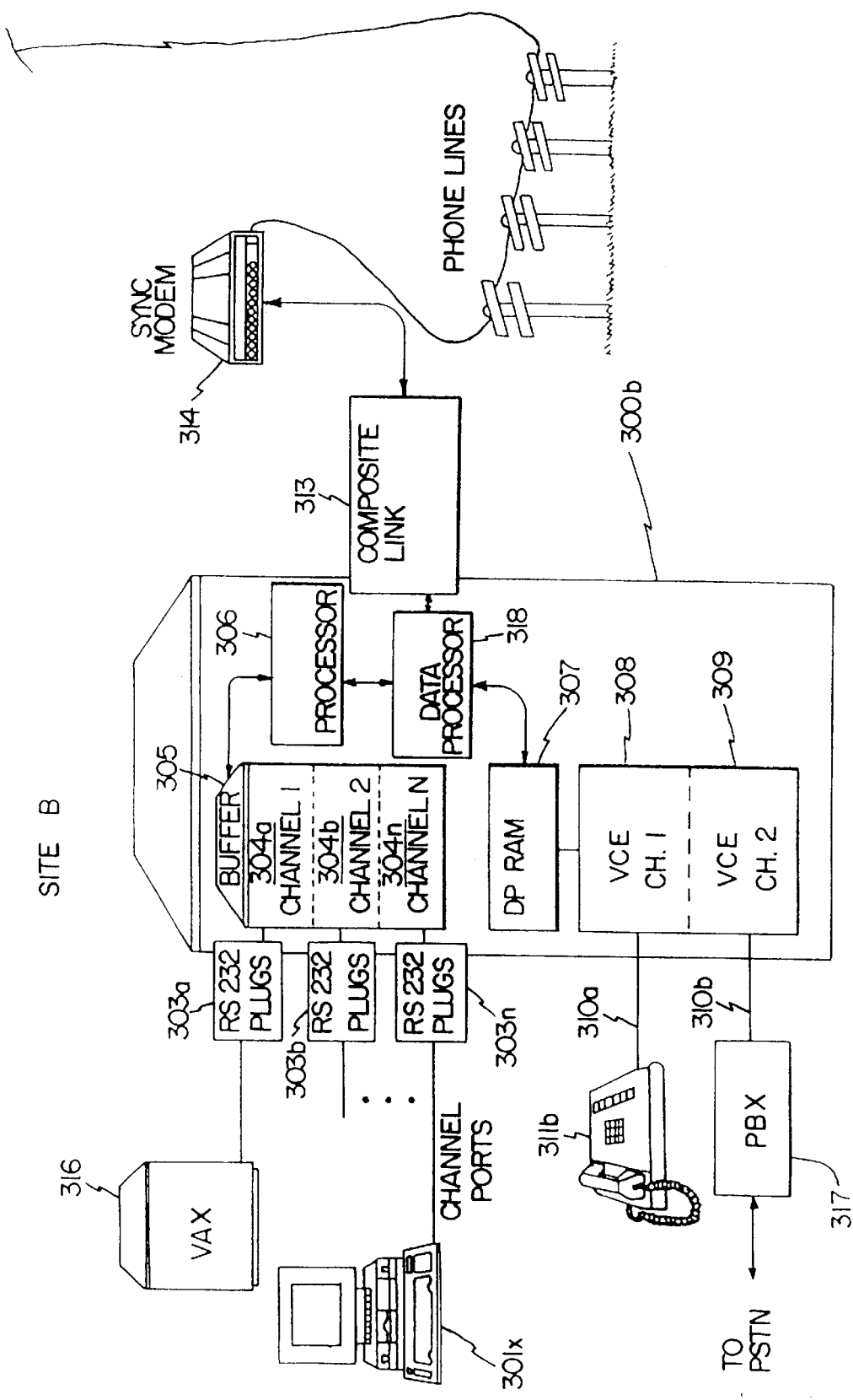
FIG. 4A is a detailed block diagram showing the use of the multiplexor 300 of the present invention to combines both telephone (voice), facsimile through a variety of connections with data over a single composite link to a remote site.
Figure 4B:
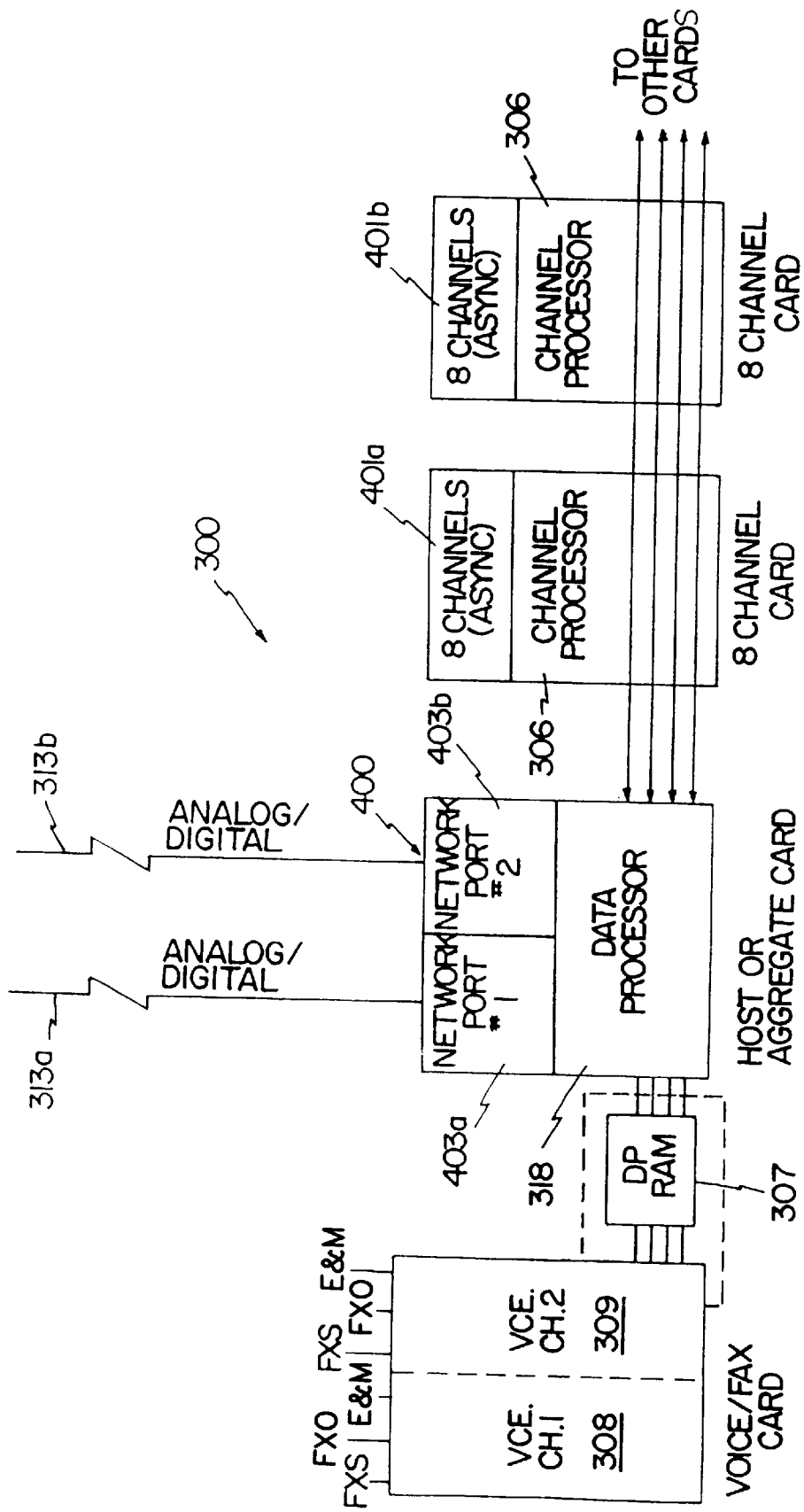
FIG. 4B is a detailed block diagram showing the division of major components of the data/voice/fax multiplexor of FIG. 4A including the FXS, FXO and E&M interfaces.

FIG. 4B is a block diagram of a single data/voice/fax multiplexer 300 with the circuits shown divided according to the physical implementation on multiple cards. Those skilled in the art will readily recognize that the physical implementation of the present invention need not follow the physical partitioning exemplified here. The multiplexer 300 uses statistical time division multiplexing to transmit data, voice and facsimile data in a fashion that appears simultaneous to the user at each end. In the illustrated embodiment of the present invention, two eight-channel interface cards 401*a* and 401*b* are included to provide a total of sixteen RS232 asynchronous ports for connection to PC's, mainframe computers, and other DTE devices, although as shown below, more channel cards may be added to extend the number of asynchronous channels serviced. In the preferred implementation, 32 asynchronous channels are interfaced using four 8-channel cards. The channels are buffered and connected to the host or aggregate card 400 of the multiplexer 300 for multiplexing with packetized voice or facsimile information from Voice Channel Equipment (VCE) Channel 1 circuit 308 or VCE Channel 2 circuit 309 (both VCE channels implemented on a single card).

Those skilled in the art will readily recognize that a variable number of asynchronous RS232 port cards and a variable number of voice or facsimile interface cards may be combined in the preferred embodiment of the present invention without limiting the scope of the invention. Thus, the design of the data/voice/fax multiplexor 300 is modular to allow the addition of cards to expand the capability of the system. In the preferred implementation shown in FIG. 4B, two VCE channel circuits 308 and 309 on a single card are used to send/receive facsimile or analog voice information connections for packetizing and transmission over the composite link lines 313*a* and 313*b*. As part of the modular design, the preferred implementation of data voice/fax/multiplexor 300 is shown with two dedicated lines 313*a* and 313*b* to ports 403*a* and 403*b* respectively. Network ports 403*a* and 403*b* each interface to separate lines using dedicated synchronous modems 314 for analog lines or to DSU's (Data Service Units) for digital lines.

The facsimile information from a fax machine is received as a telephone connection on VCE channel 1 circuit 308 or VCE channel 2 circuit 309. The facsimile information is taken off the analog carrier by demodulating the carrier so that the picture or pixel packets are recovered. The picture or pixel packets are then passed through dual port RAM 307 to be received by the data processor 318. The data processor 318 combine the facsimile or pixel packets with the synchronous data packets received from the asynchronous data channels 401*a*–401*b* for statistical multiplexing and transmission over one of the composite link lines 313*a* or 313*b* through network ports 403*a* or 403*b*, respectively.

In addition, or alternatively, telephone equipment connected to either VCE channel 1 circuit 308 or VCE channel 2 circuit 309 will receive analog voice information, digitize the voice information, compress and encode the digitized voice information into packets and load the packets into dual port RAM (Random Access Memory) 307 for receipt by the data processor 318. These compressed voice packets are then statistically multiplexed with the facsimile picture packets and/or the asynchronous data packets from asynchronous channel cards 401*a* and 401*b* for multiplexed transmission over the composite link lines 313*a* or 313*b*. The packets are collected and transmitted over the telephone line using a proprietary synchronous data link format which, for purposes of the present discussion, is described as a modified high speed data link control or MHDLC using a proprietary advanced priority statistical multiplexing algorithm described more fully below.

Operation of the Voice/Facsimile Channel Interface

The VCE channel 1 circuit 308 and VCE channel 2 circuit 309 of FIG. 4B are identical circuits which are capable of operating in parallel to transmit and receive signals to and from telephones and facsimile machines. Illustrated in FIG. 4B for VCE channel 1 circuit 308 and VCE channel 2 circuit 309 are three types of telephone line interfaces labeled FXS, FXO, and E&M. The FXS acronym stands for Foreign Exchange Station. The FXS interface mimics the subscriber-side of a standard tip and ring two-wire telephone connection either as a loop or a ground start configuration. The FXO acronym stands for Foreign Exchange Office. The FXO interface mimics the central office or provider-side of a standard tip and ring two-wire telephone connection. The E&M acronym was historically designated in telephone circuit diagrams as the "e" in "received" and the "m" in "transmit" for trunk signaling. The E&M interface mimics a typical PBX trunk interface.

Figure 5A:
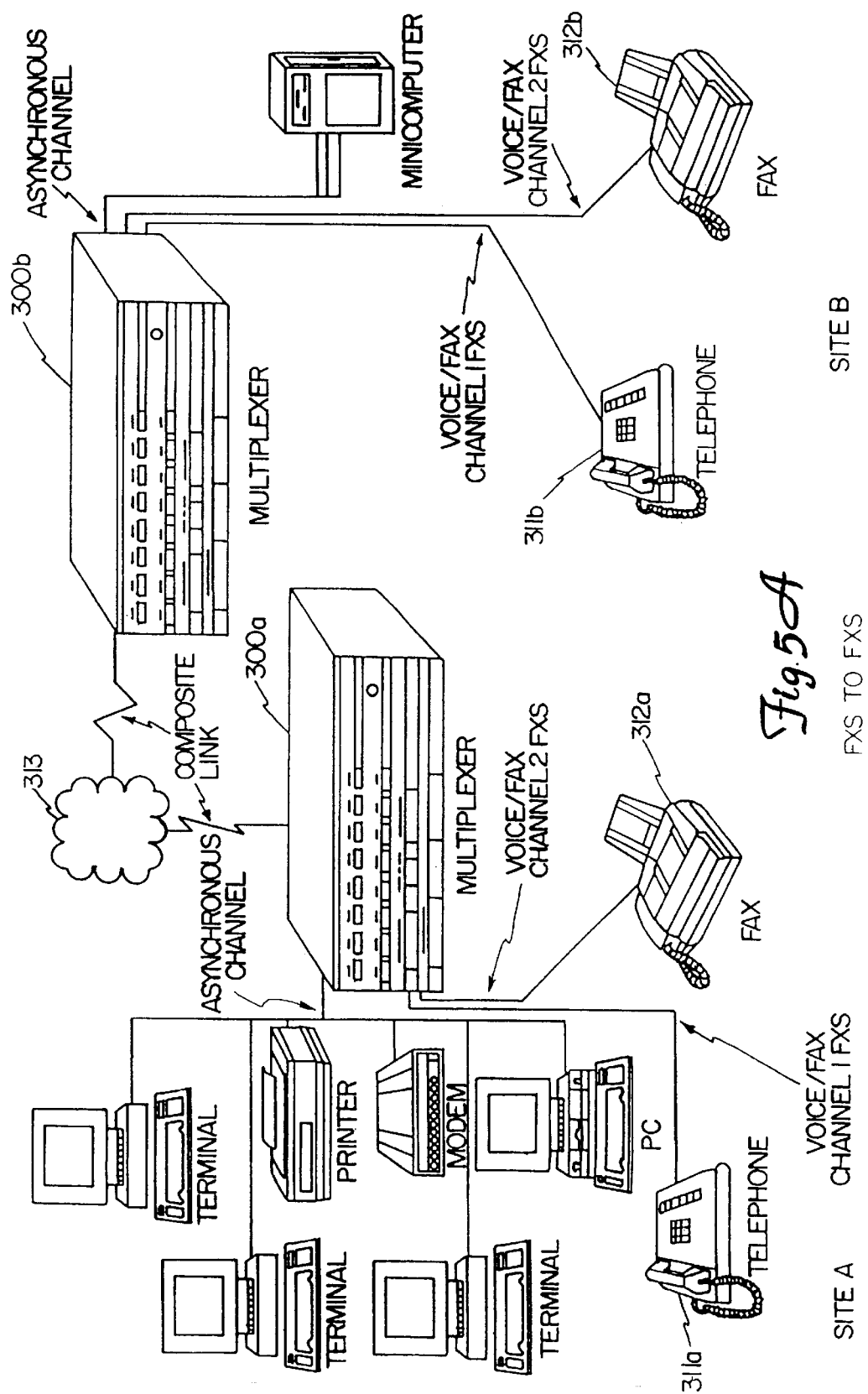
FIG. 5A is a diagram showing a first one of the preferred connections of the present invention which multiplexes voice telephone, facsimile information and digital data information for transmission to and demultiplexing at a remote site for connection to other DTE devices and for connection to remote voice telephone and facsimile equipment.
Figure 6B:
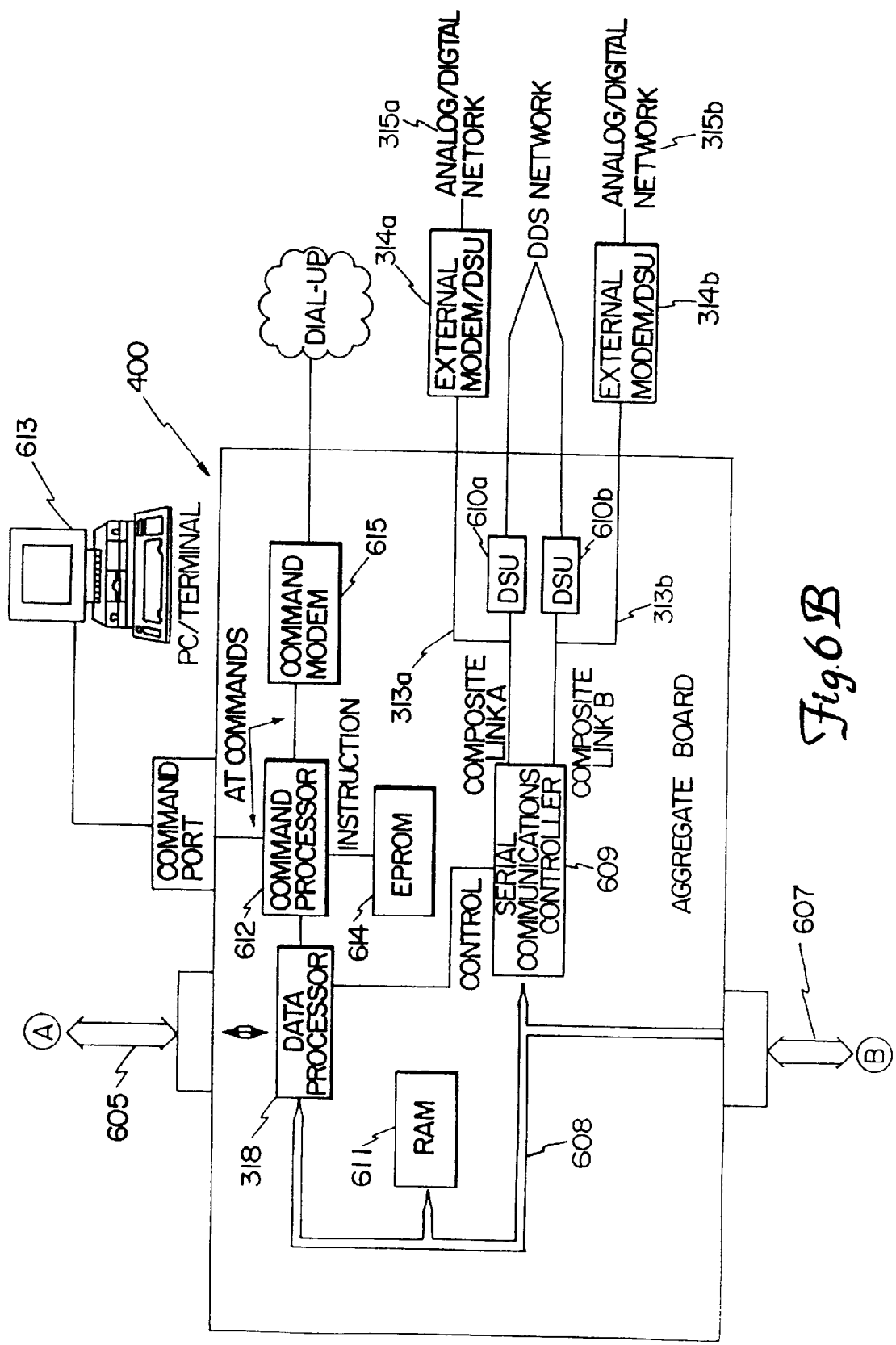
Figure 6C:
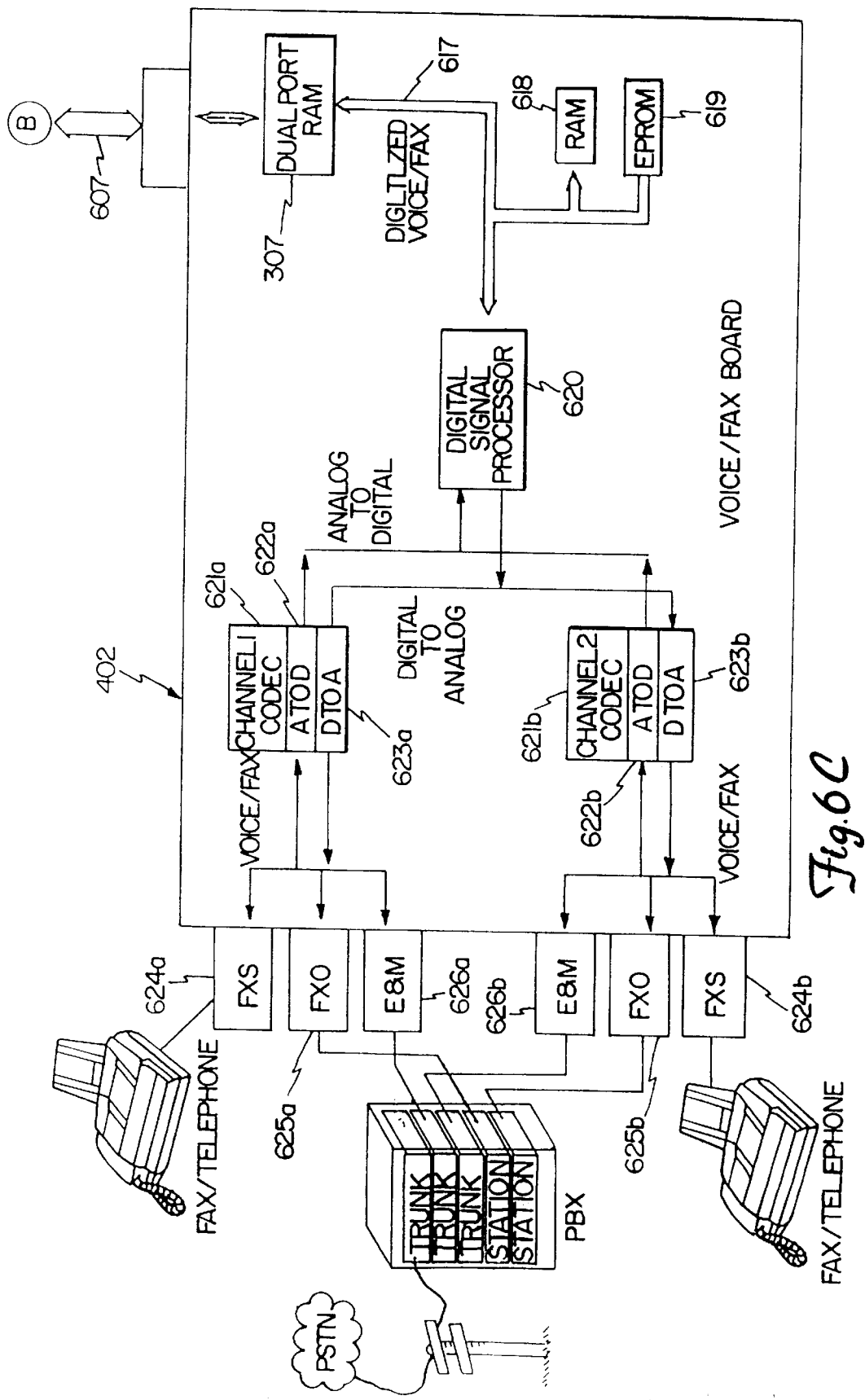

As shown in more detail in FIG. 6C, each voice channel card is capable of handling the three interfaces: FXS, FXO and E&M to provide a wide variety of connectivity for interfacing to different types of telephone equipment. Four of these types of connections are illustrated in FIGS. 5A though 5D.

As shown in FIG. 5A, a telephone or facsimile machine may be connected to the FXS interface at Site "A", which will appear to this equipment as though it were connected to the subscriber side of a standard tip and ring two-wire analog telephone connection. The FXS connection on VCE channel 1 circuit 308 or VCE channel 2 circuit 309 shown in FIGS. 4A and 4B would appear to be a telephone central office (CO) to this telephone equipment (or a PBX-mimic of a CO). Thus, if a user picked up the handset of a standard telephone connected to the FXS interface at Site "A" of FIG. 5A, the telephone or fax machine at site "B" would ring.

Figure 5B:
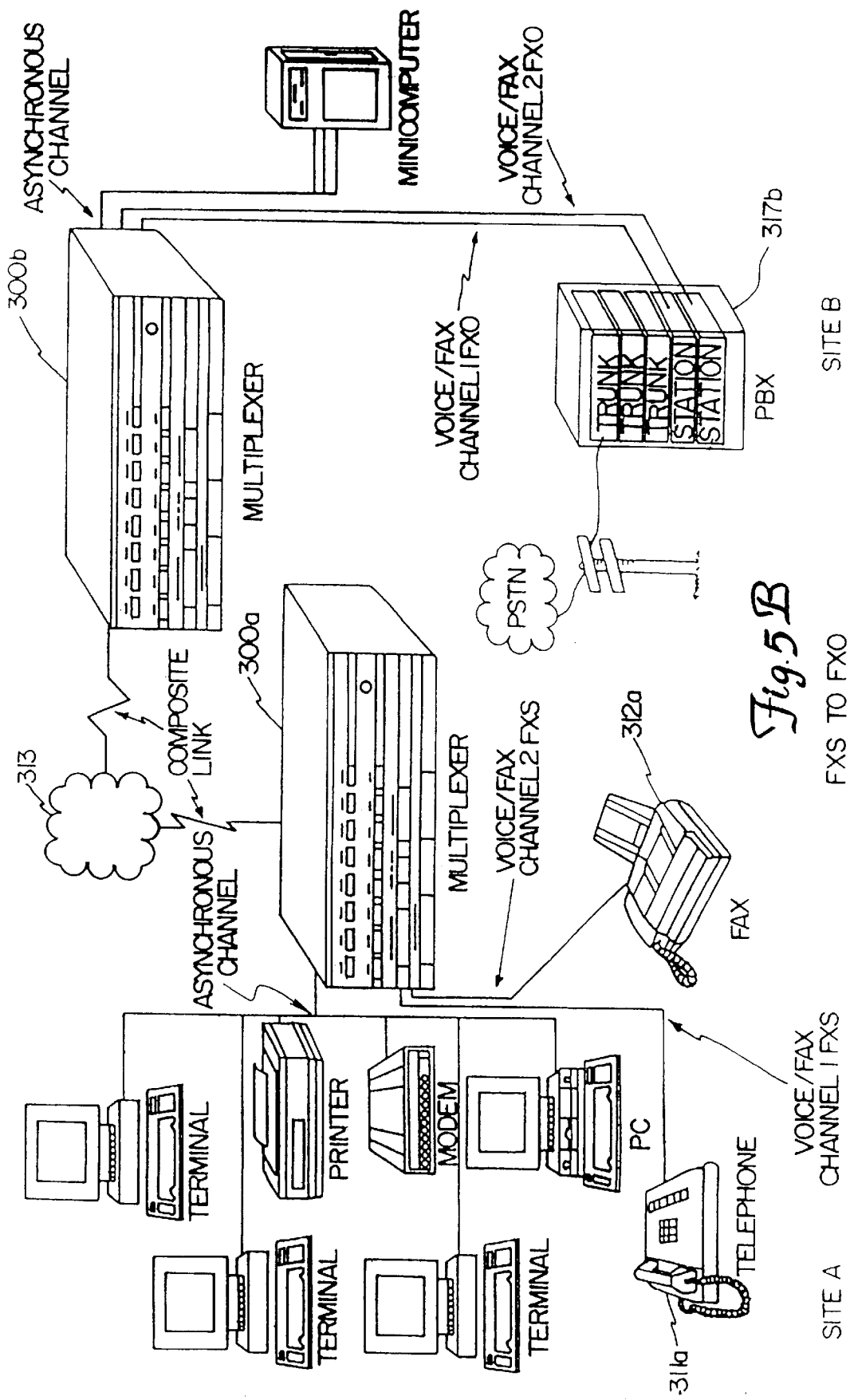
FIG. 5B is a diagram showing a second one of the preferred connections of the present invention which multiplexes voice telephone, facsimile information and digital data information for transmission to and demultiplexing at a remote site for connection to other DTE devices and to a remote PBX.

A PBX may be connected to the FXO interface on VCE channel 1 circuit 308 or VCE channel 2 circuit 308 shown in FIGS. 4A and 4B. Referring to FIG. 5B, the PBX at site "B" is attached to the FXO interface of the multiplexer 300*b*. The PBX at site "B" will see the multiplexer FXO interface as a piece of telephone equipment responding to the PBX connection. A telephone or fax machine at site "A" is connected to the FXS interface of multiplexer 300*a* but will appear to be connected to the station connection of the PBX at site "B". The telephone or fax machine at site "A" will then be able to dial any extension serviced by the PBX at site "B" or dial out to the local Public Switched Telephones Network (PSTN) from the PBX. The telephone or fax equipment at site "A" appears to be directly connected to the PBX at site "B".

Figure 5C:
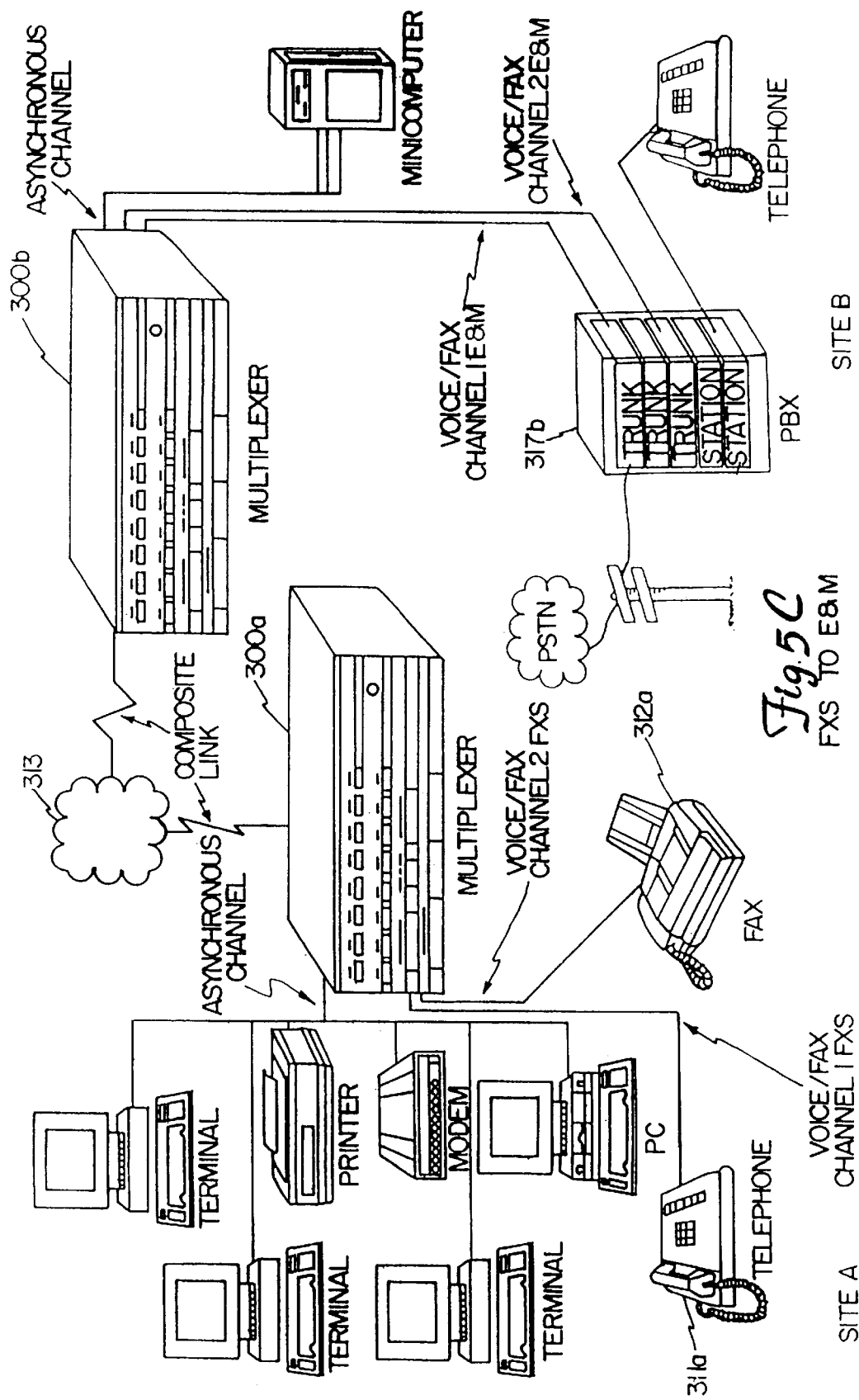
FIG. 5C is a diagram showing a third one of the preferred connections of the present invention which multiplexes voice telephone, facsimile information and digital data information for transmission to and demultiplexing at a remote site for connection to other DTE devices and to remote voice telephone and facsimile equipment through a remote PBX.

A PBX trunk interface may also be connected to the E&M interface on VCE channel 1 circuit 308 or VCE channel 2 circuit 308 shown in FIGS. 4A and 4B. Referring to FIG. 5C, the trunk interface of the PBX at site "B" is attached to the E&M interface of the multiplexer 300*b*. The PBX at site "B" will see the multiplexer E&M interface as a trunk telephone line responding to the PBX connection. A telephone or fax machine at site "A" is connected to the FXS interface of multiplexer 300*a* but will appear to be connected to the PBX at site "B" through the trunk interface. The telephone or fax machine at site "A" will then be able to dial any extension serviced by the PBX at site "B" or dial out to the local Public Switched Telephones Network (PSTN) from the PBX. The telephone or fax equipment at site "A" appears to be directly connected to the PBX at site "B". The telephone or fax equipment serviced by the PBX at site "B" can access the telephone or fax equipment at site "A" by calling the appropriate trunk number for site "A".

A PBX trunk interface of PBX equipment at both sites "A" and "B" may be connected to the E&M interface on VCE channel 1 circuit 308 or VCE channel 2 circuit 308 shown in FIGS. 4A and 4B. Referring to FIG. 5D, a trunk interface of the PBX at site "A" is attached to the E&M interface of the multiplexer 300*a* and a trunk interface of the PBX at site "B" is attached to the E&M interface of the multiplexer 300*b*. The PBX at site "A" will see the multiplexer E&M interface as a trunk telephone line responding to the PBX connection and the PBX at site "B" will see the multiplexer E&M interface as a trunk telephone line responding to the PBX connection. Both PBX's will see the other PBX as a direct connection through a trunk line. The telephone or fax machine at site "A" will then be able to dial any extension serviced by the PBX at site "B" or dial out to the local Public Switched Telephones Network (PSTN) from the PBX at site "B" Similarly, the telephone or fax machine at site "B" will then be able to dial any extension serviced by the PBX at site "A" or dial out to the local Public Switched Telephones Network (PSTN) from the PBX at site "A"

Asynchronous Channel Cards

FIG. 6A is a detailed block diagrams of the asynchronous channel cards. As described above, the present system is modular in its design to allow a variable number of asynchronous channel interfaces. Thus, FIG. 6A such channel boards 600*a*, 600*b*, 600*c*, 600*d*, each capable of collecting asynchronous data from eight RS 232 interfaces for a total of 32 RS 232 asynchronous interfaces.

Each channel board 600*a*, 600*b*, 600*c*, 600*d*, is identical in design and commonly referenced as channel board 600. Each channel board 600 is controlled by a channel processor 306 to collect and distribute asynchronous data to and from the eight channels through I/O interfaces 602*a*, 602*b*, 602*c*, 602*d*. The I/O interfaces communicate with channel processor 306 via a bus to share a data path. Channel processor 306 utilizes a local RAM memory 604 for storing the operation and control programs. The asynchronous data collected or the asynchronous data to be distributed is transferred to and from the aggregate card or board 400 of FIG. 6B along channel data bus 605. The channel data bus 605 is continued on FIG. 6B through connection point A.

In an alternate embodiment of the present invention, the channel processor 306 can compress the asynchronous data using a compression algorithm such as the algorithm used in the CCITT V.42b is standard. Also, the channel boards 600*a*, 600*b*, 600*c*, 600*d*, may operate to receive synchronous data for multiplexing over the composite link.

Aggregate Card

Aggregate card 400 of FIG. 4B is shown in greater detail in the block diagram of FIG. 6B. A data processor 318 controls the internal operation of aggregate card 400 and performs the functions of collecting asynchronous data from bus 605, collecting voice and fax data packets from interface 607, and multiplexing and framing the various data packets and call signaling packets into synchronous data packets. Data processor 318 in the preferred embodiment is a Z180 microprocessor. A RAM memory 611 on internal bus 608 supports data processor 318 to store control programs and to buffer packet information received from the voice/fax board 402 via connection 607. The synchronous data packets are sent from data processor 318 along internal bus 608 to a serial communications controller 609. Serial communications controller 609 operate under the control of the data processor 318 via control lines separate from the internal bus 608. The synchronous data stream may be transmitted via a variety of paths through serial communications controller 609 as composite links. External synchronous modems 314*a* and 314*b* provide modem communications over active two-wire or four-wire leased lines or an alternative communication path may be established via DSU (Digital Service Units) 610*a* and 610*b* to digital data networks.

Data processor 318 is under direct control of command processor 612 which supports a local connection to a status and control PC 613 and a remote connection to the status and control PC at the remote site through dial-up modem 615 for coordination of configuration information and operating parameters. The command processor maintains the configuration information and operating parameters in a non-volatile EPROM memory 614.

Voice/Fax Card

A dual channel voice/fax card 402 is shown in the detailed block diagram of FIG. 6C. Voice Channel Equipment (VCE) Channel 1 circuit 402*a* and VCE Channel 2 circuit 402*b* of FIG. 5 are implemented on a single card 402 shown in FIG. 6C. The local incoming analog voice information or fax carrier is received on the FXS interfaces. The remote reconstructed analog voice information or fax carrier is produced locally on the FXO interfaces. The PBX trunk signaling is produced on the E&M interfaces.

The incoming analog voice information or fax carrier is received on the FXS interface 624*a* and 624*b* and converted from analog information to digital samples by analog to digital converters 622*a* or 622*b*, respectively. The digital samples are passed to digital signal processor 620 which either decodes the fax carrier information if fax information is detected or compresses the voice data if voice information was detected. The voice compression algorithms are described more fully below. The compressed voice data is placed in packets by the digital signal processor 620 and passed to the data processor 318 of FIG. 6B in via interface 607 through connection point B. The fax picture data is similarly packetized by the digital signal processor 620 and passed to the data processor 318 of FIG. 6B.

Detailed Electrical Schematic Diagrams

Figure 7A:
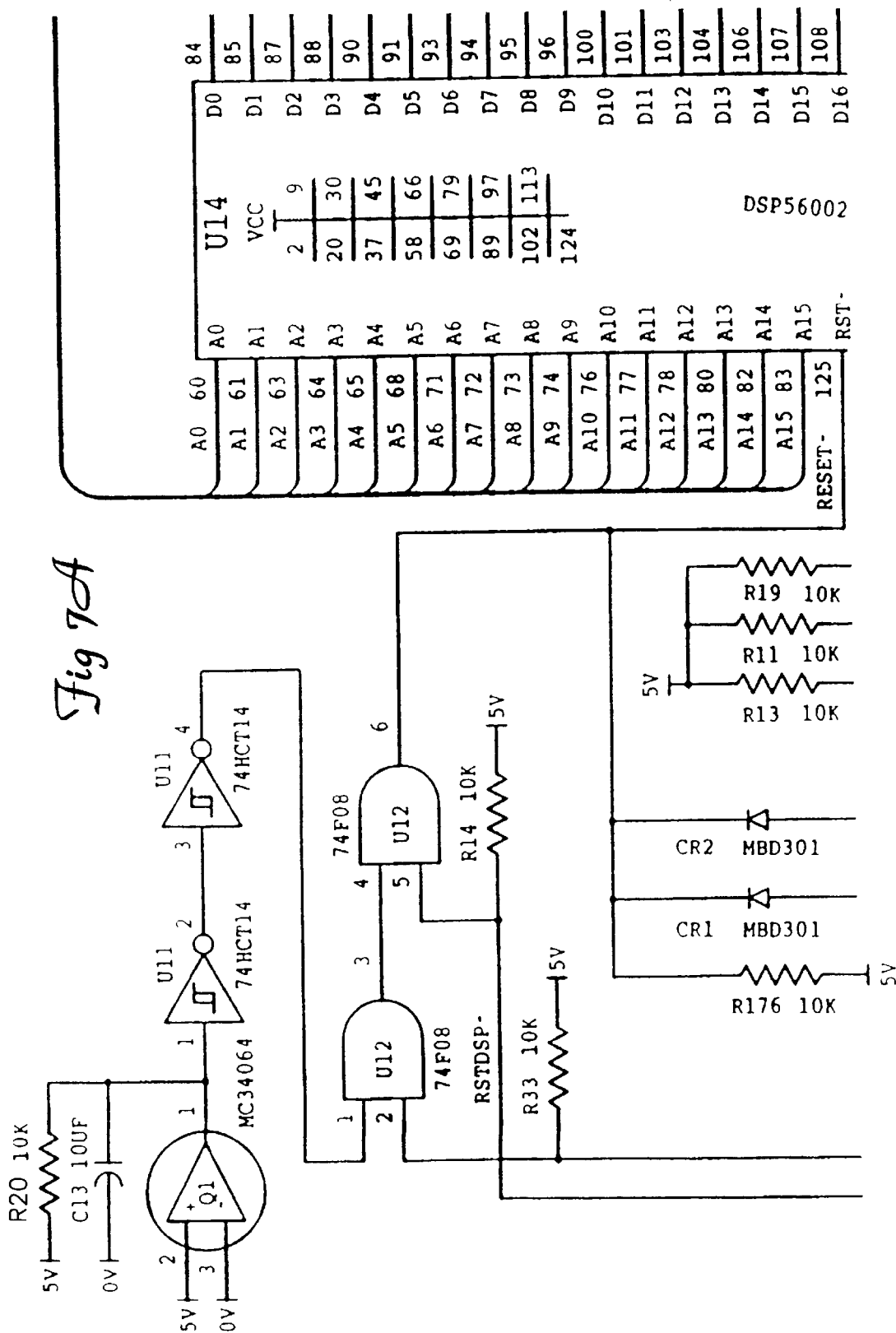
FIGS. 7A–7B, 8A–8B, 9A–9B and 10A–10B are detailed electrical schematic diagrams of the voice/fax card of FIG. 6C.
Figure 7B:
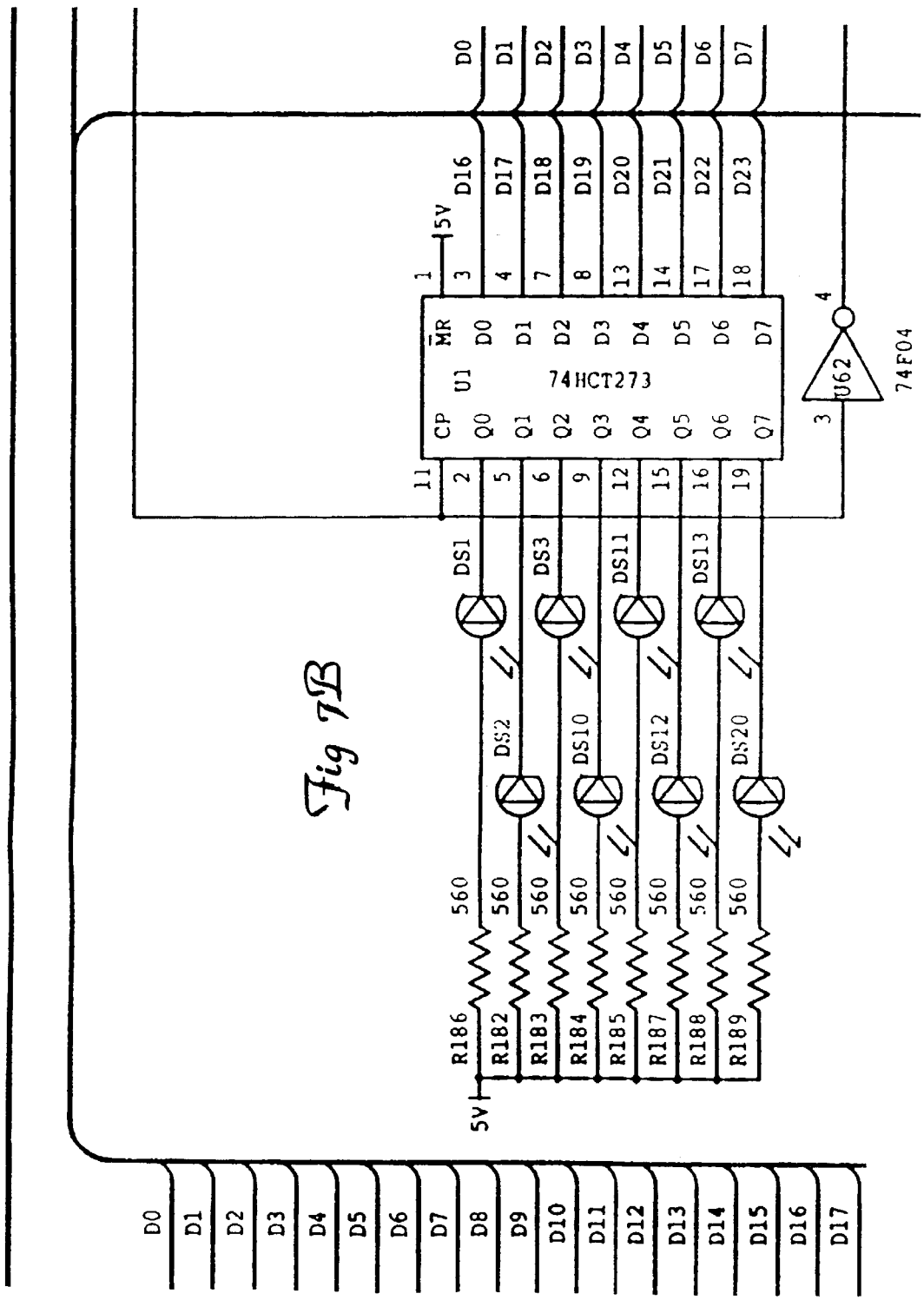
Figure 7C:
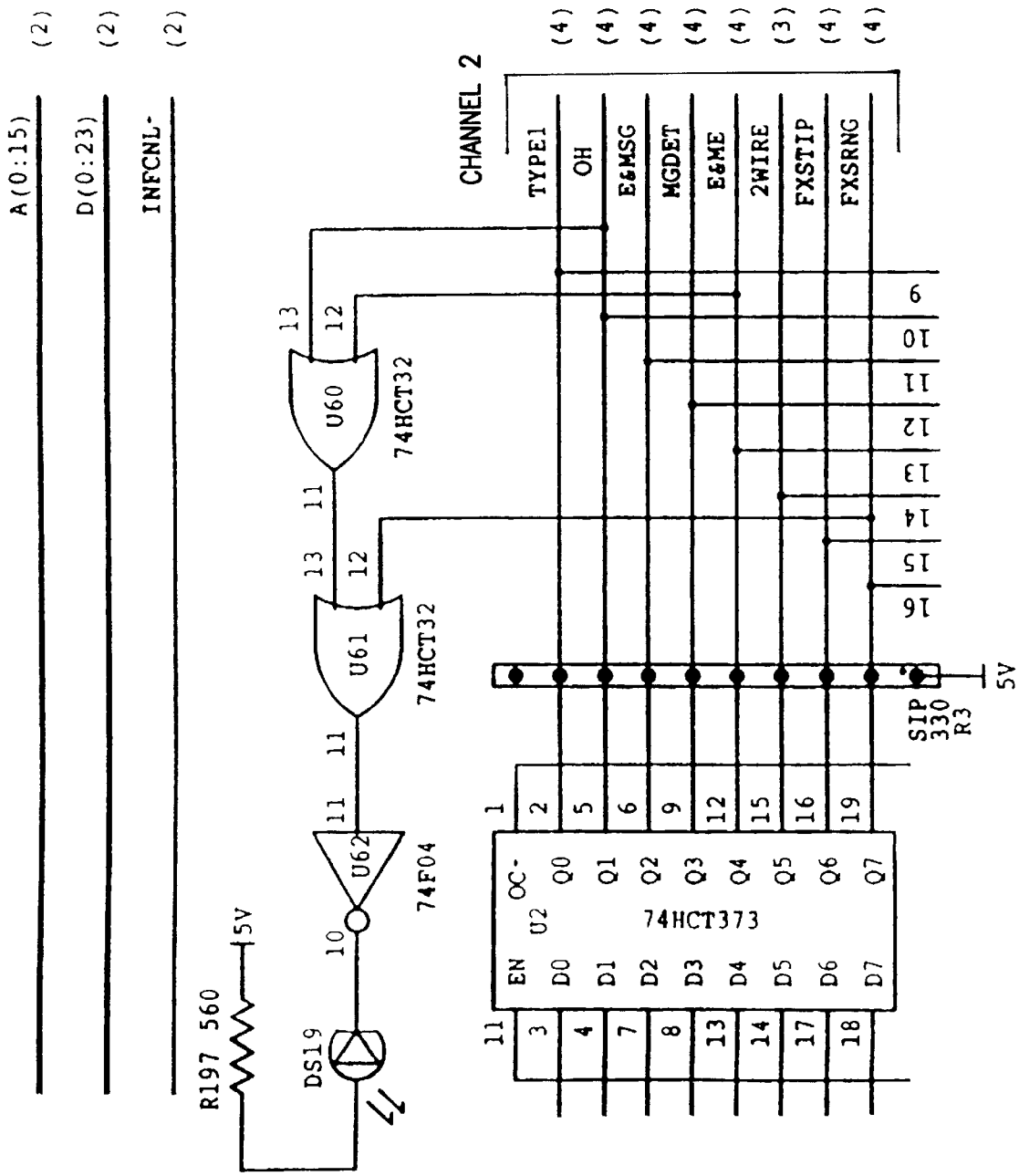
Figure 7D:
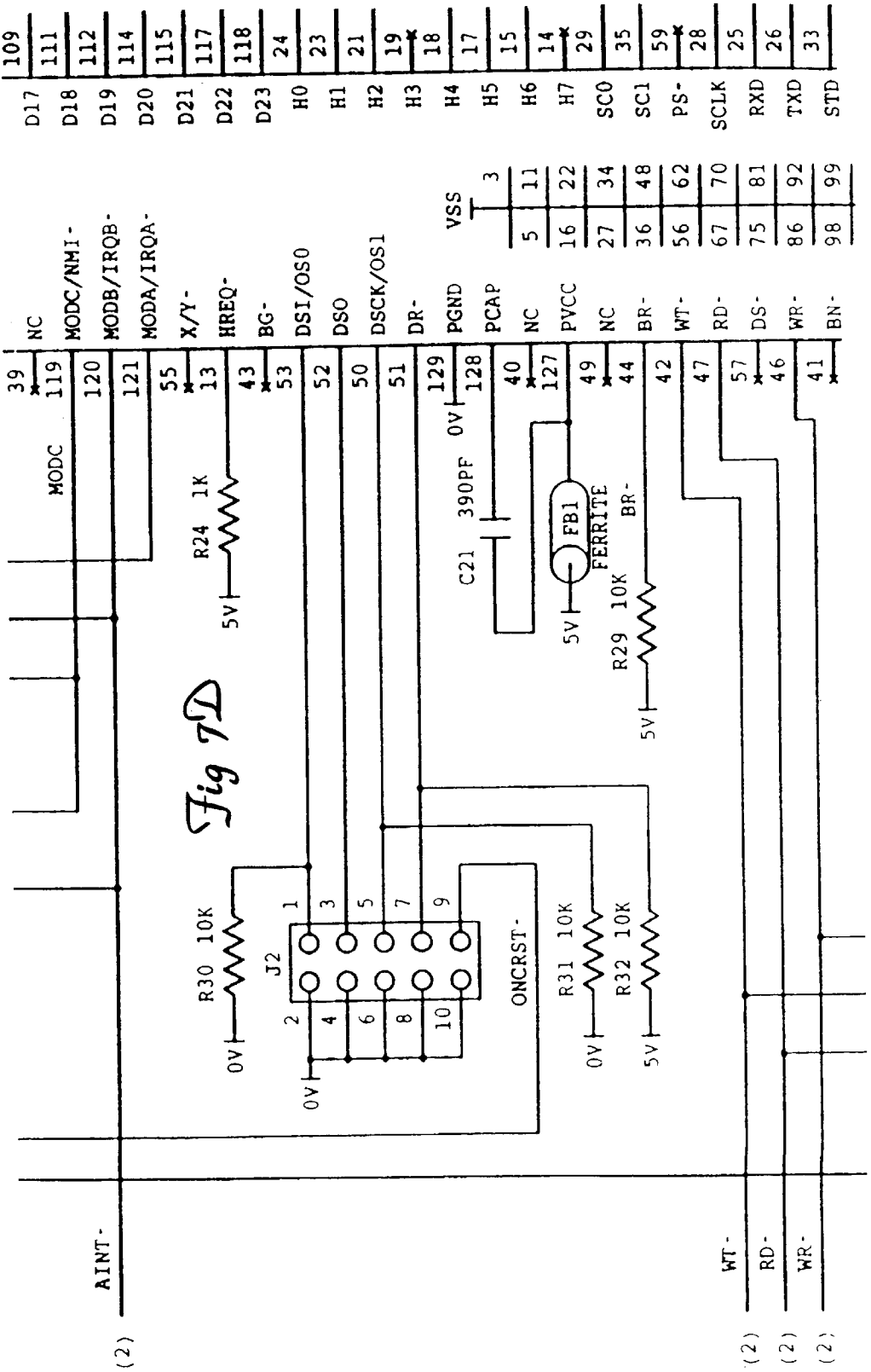
Figure 7J:
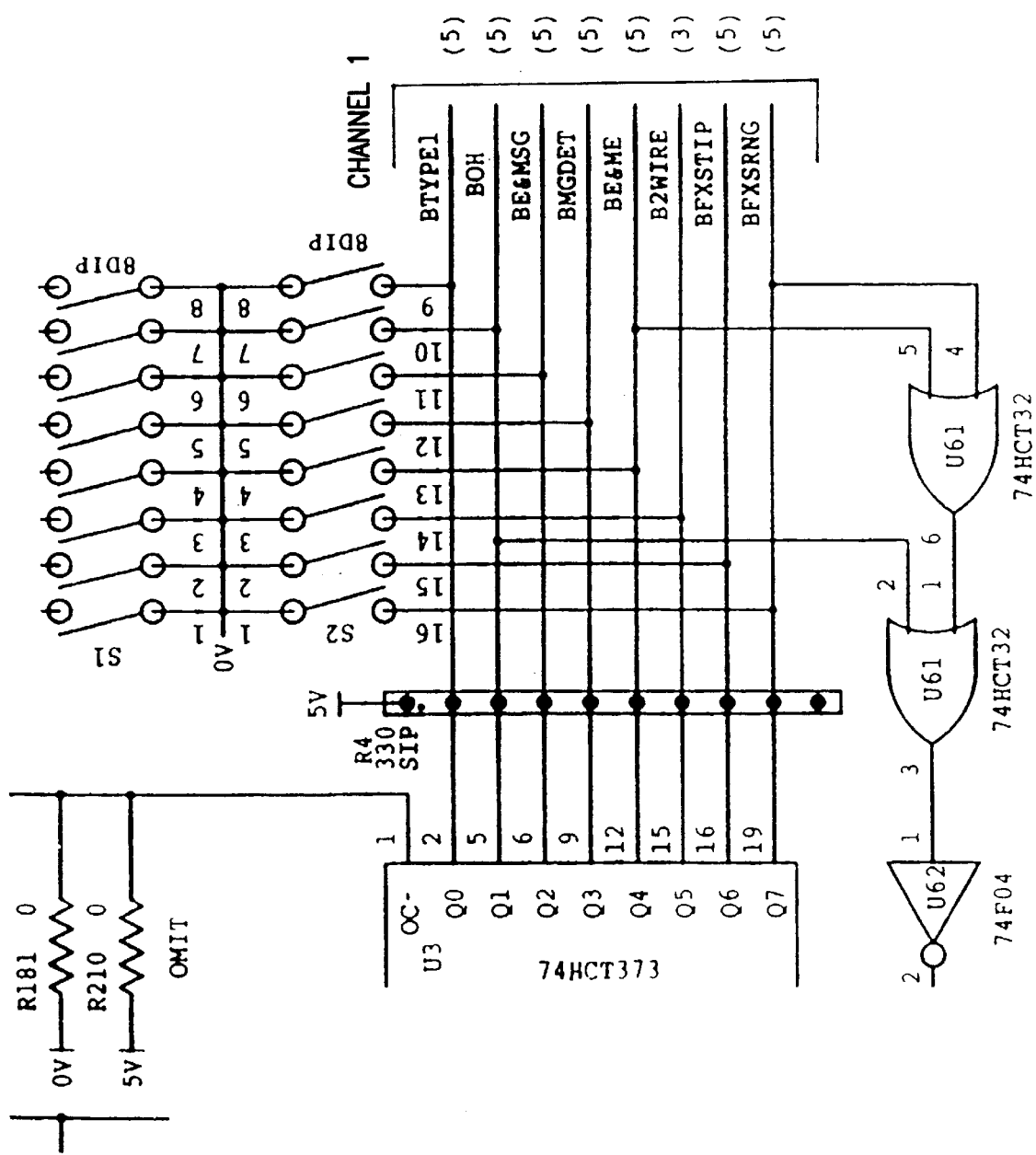

FIGS. 7A–7B, 8A–8B, 9A–9B and 10A–10B are detailed electrical schematic diagrams of the circuits depicted in block diagram form in FIGS. 6C. In FIG. 7A, the DSP 56002 circuit U14 corresponds to the digital signal processor (DSP) 620 of FIG. 6C which functions to compress and decompress digitized voice signals and handle the call progress signals. The call progress signalling establishes the calls before the voice compression or decompression starts through the FXS, FXO and E&M interfaces. DSP 56002 also functions to detect the fax tones and perform fax modulation and demodulation and to perform far-end echo-cancellation in the digital domain.

DSP 56002 circuit U14 controls the FXS, FXO and E&M interfaces to handle the call progress via the data bus D0-D23 through buffer circuits U2 and U3 for channel 1 and channel 2, respectively. For example, for the FXS interface, the DSP 56002 circuit U14 operates to control the ring of the telephone and detect the off-hook of the telephone. For the FXO interface, DSP 56002 circuit U14 operates to detect the ring from the PBX and returns an off-hook signal to the station side of the PBX. For the E&M interface, DSP 56002 circuit U14 operates to connect to the trunk of the PBX to primarily control the E-lead and M-lead for trunk signalling. Integrated circuit U1 is a buffer circuit used to control the status indicator LED's shown in FIG. 7B.

Figure 10A:
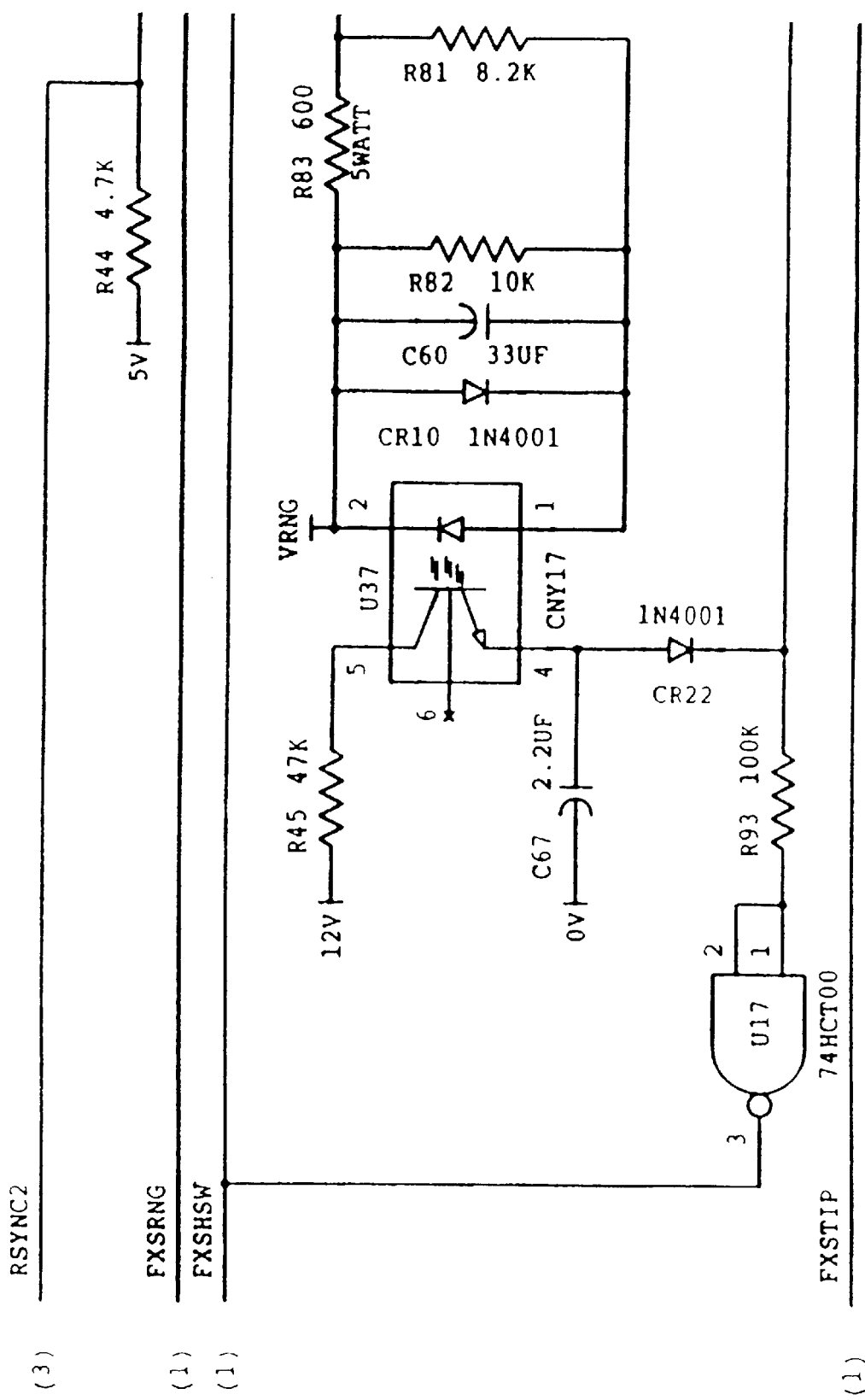
Figure 10B:
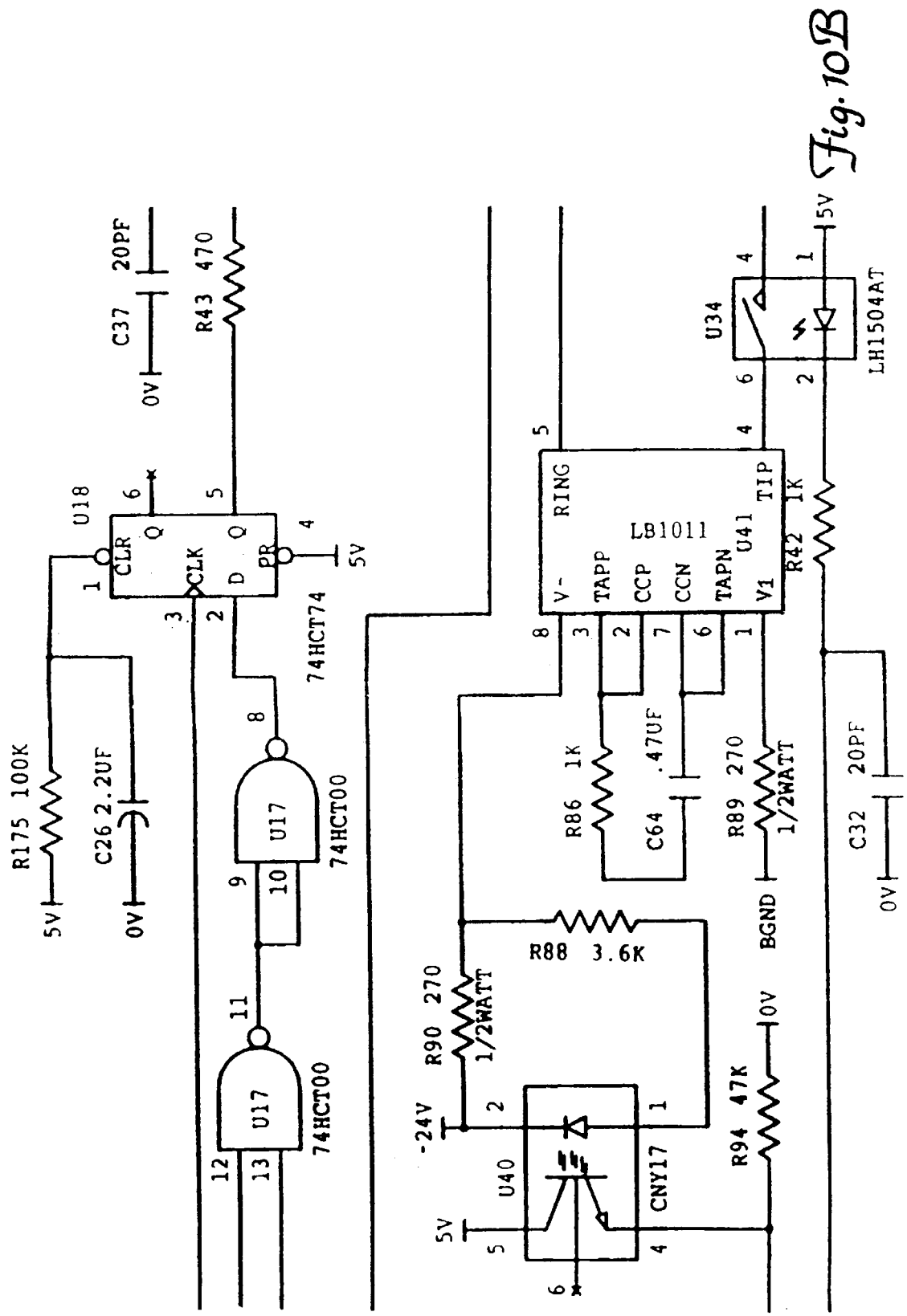
Figure 10C:
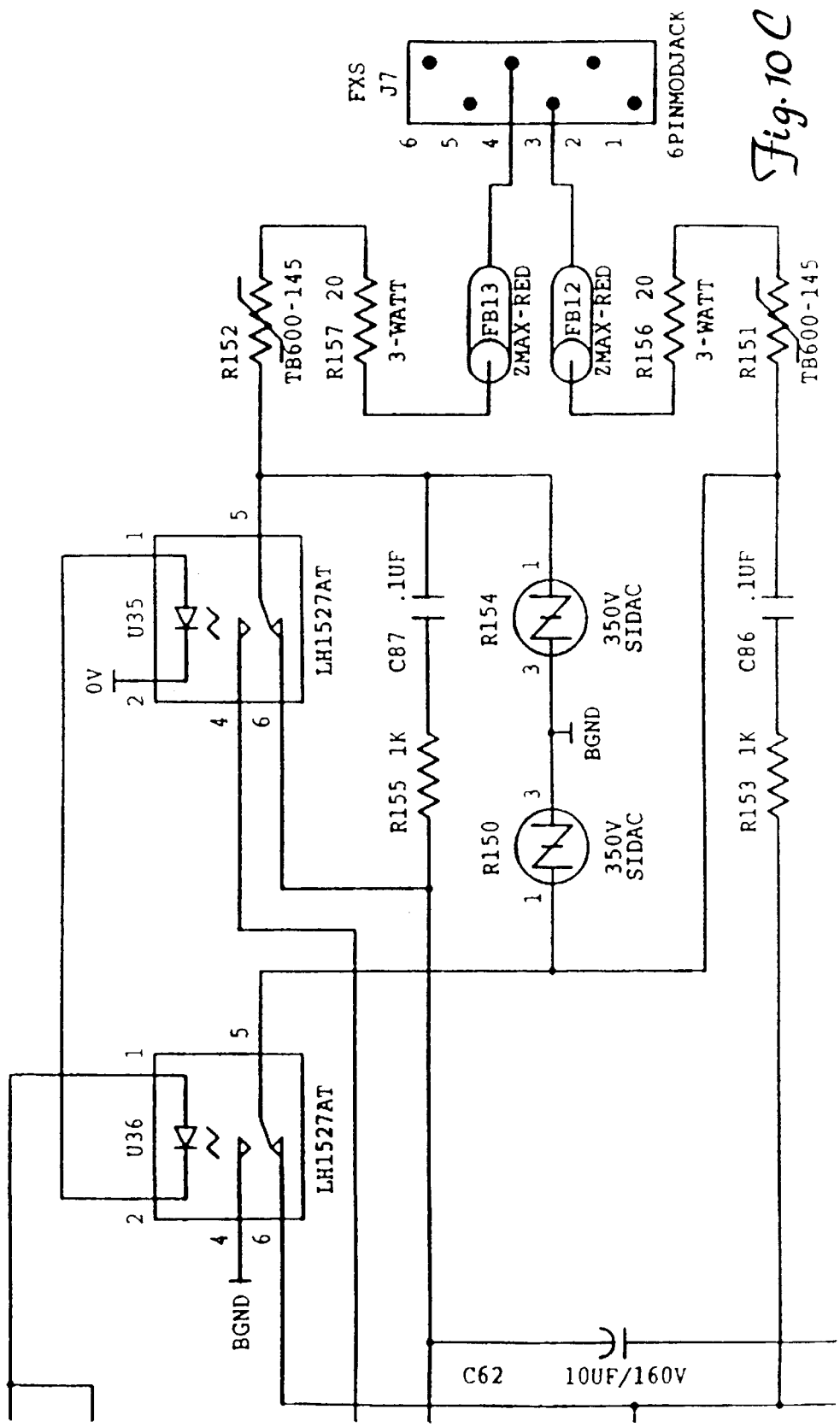
Figure 10D:
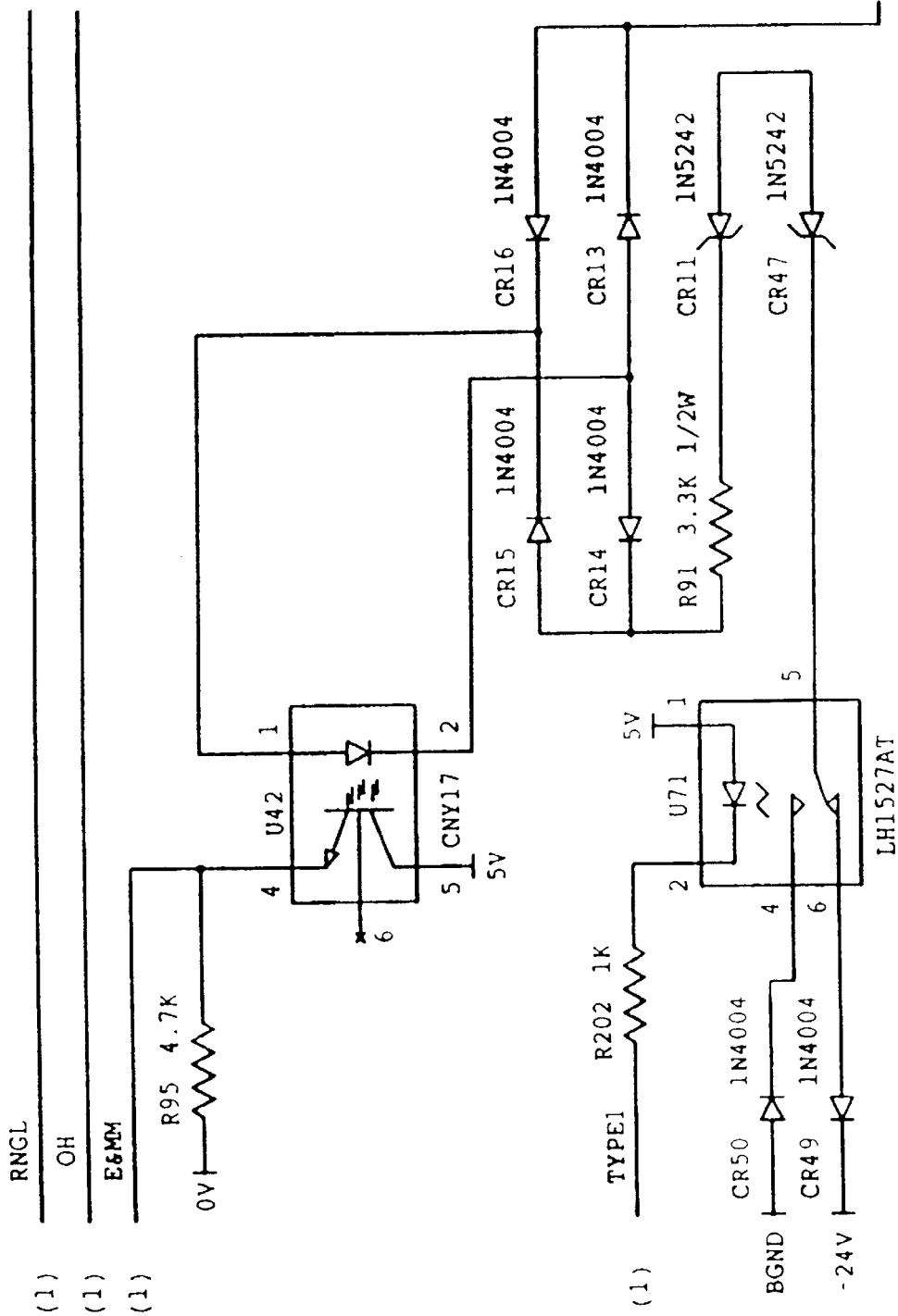
Figure 10E:
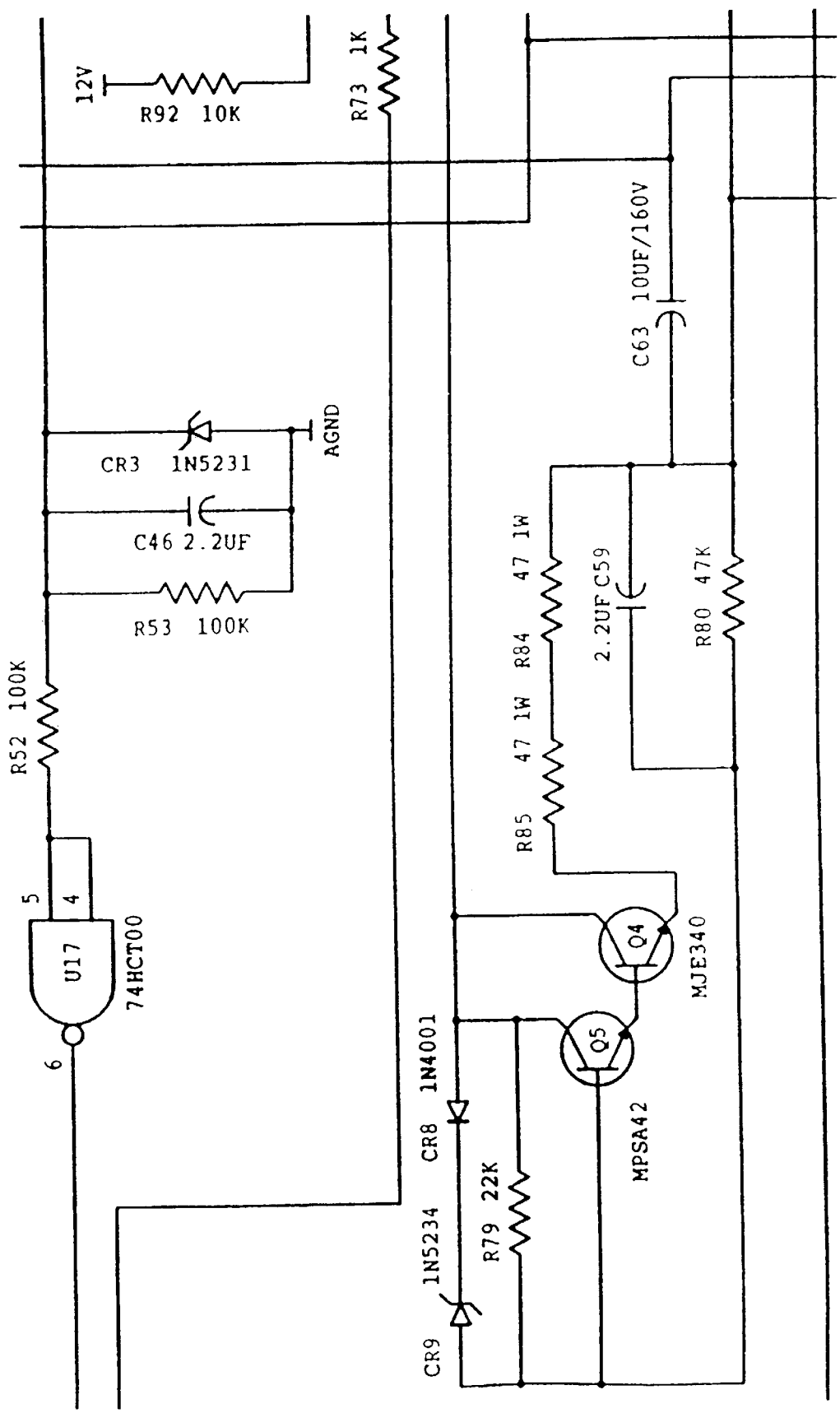
Figure 10F:
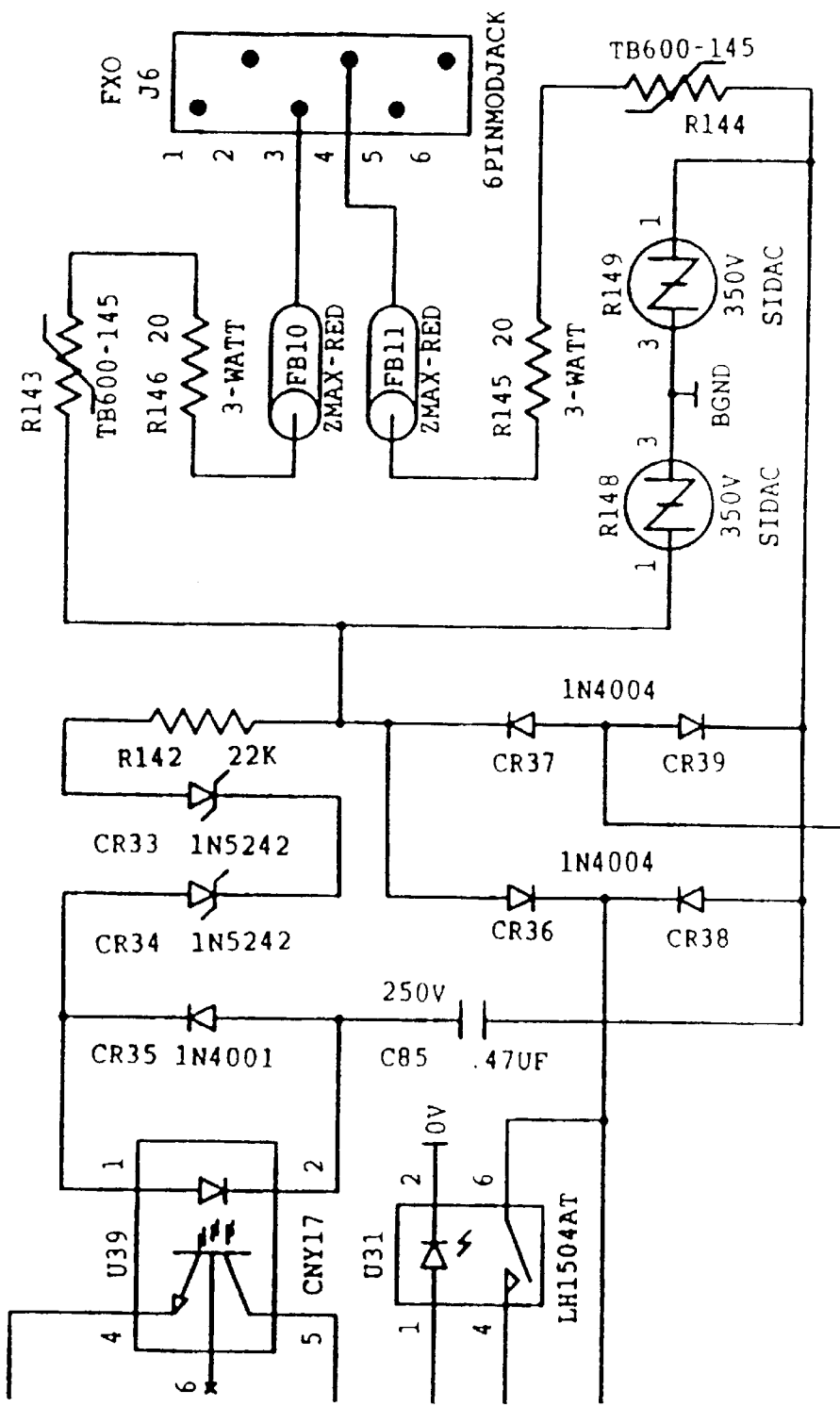
Figure 10G:
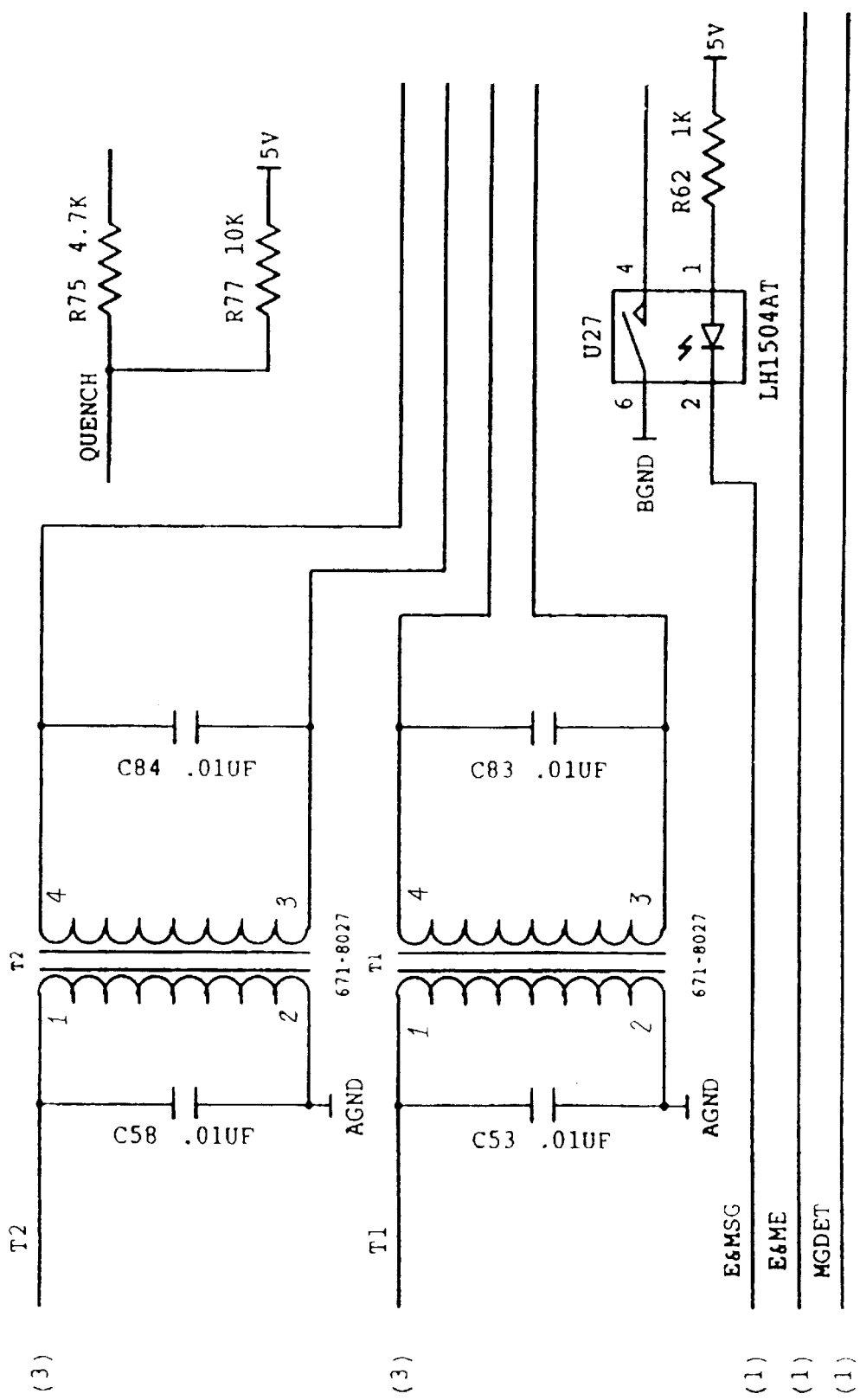
Figure 10H:
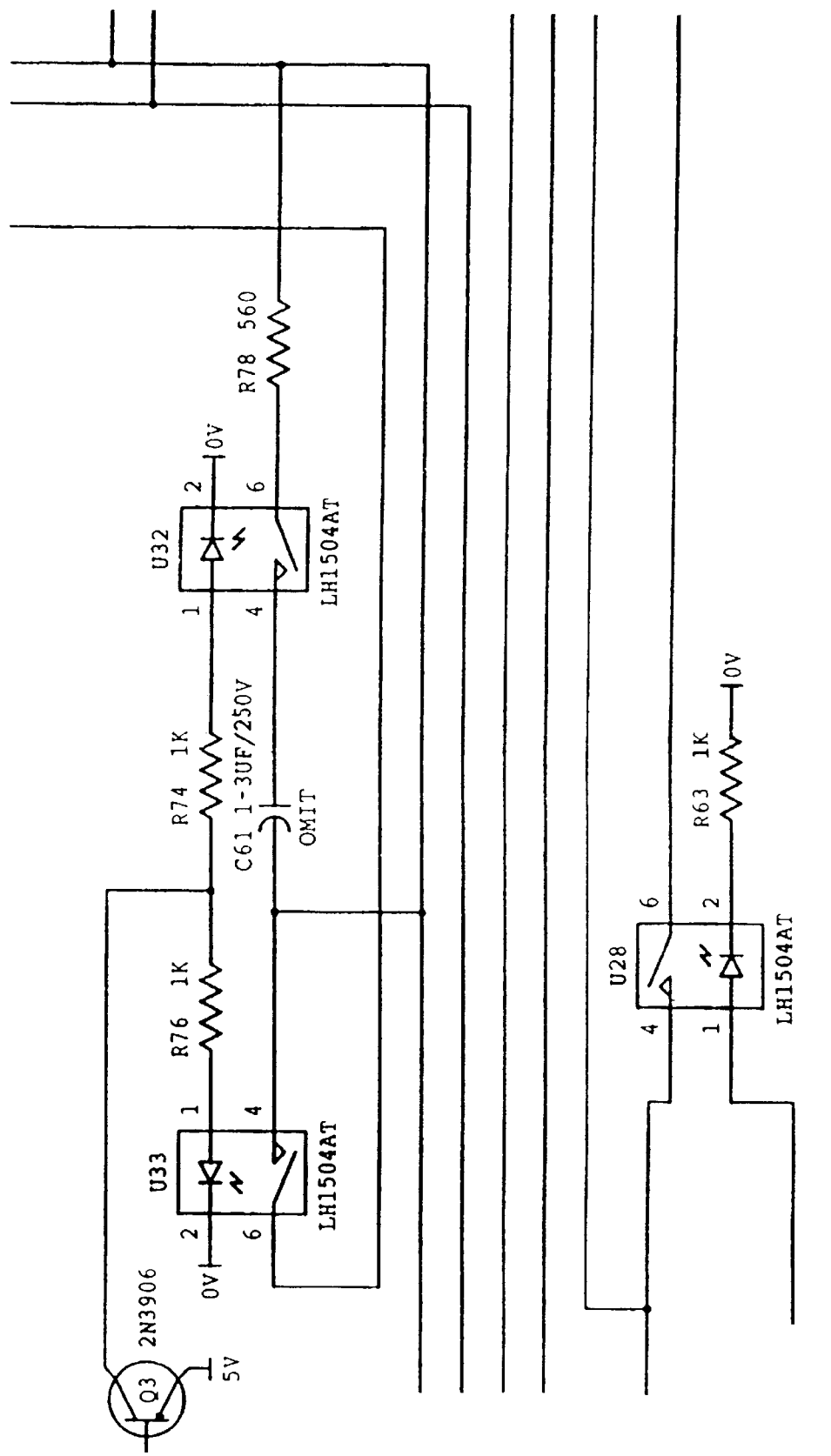
Figure 10J:
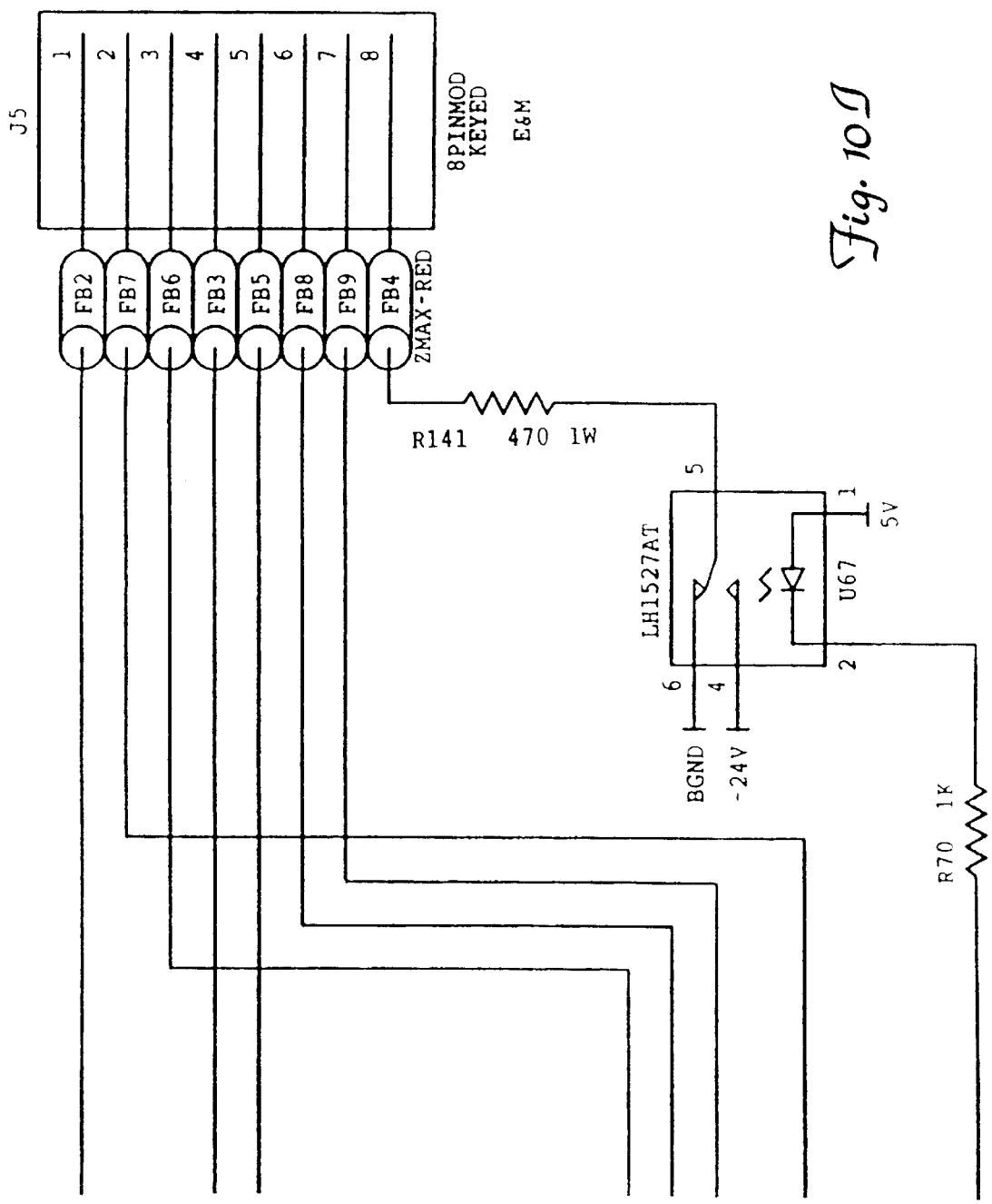

As described above, channel 1 and channel 2 of the voice/fax board are identical and correspond to Voice Channel Equipment (VCE) Channel 1 circuit 402a or VCE Channel 2 circuit 402b of FIG. 5. Only one channel circuit is shown in the electrical schematic diagrams of FIGS. 10A and 10B and the control signal labels shown in the electrical schematic diagram of FIG. 7B match by placing a "B" in front of any control signal label to indicate channel 1. For example, the signal E&ME of the electrical schematic diagram of FIG. 7B matches the signal E&ME of the electrical schematic diagram of FIG. 10A for channel 2 and the signal BE&ME of the electrical schematic diagram of FIG. 7B matches the signal E&ME of the electrical schematic diagram of FIG. 10A for channel 1. In FIGS. 10A and 10B, the FXS, FXO and E&M connections for the voice/fax card 402 are shown to the right of FIG. 10B. The E&M trunk line connector J5 handles both two-wire and four-wire interfaces.

Figure 8A:
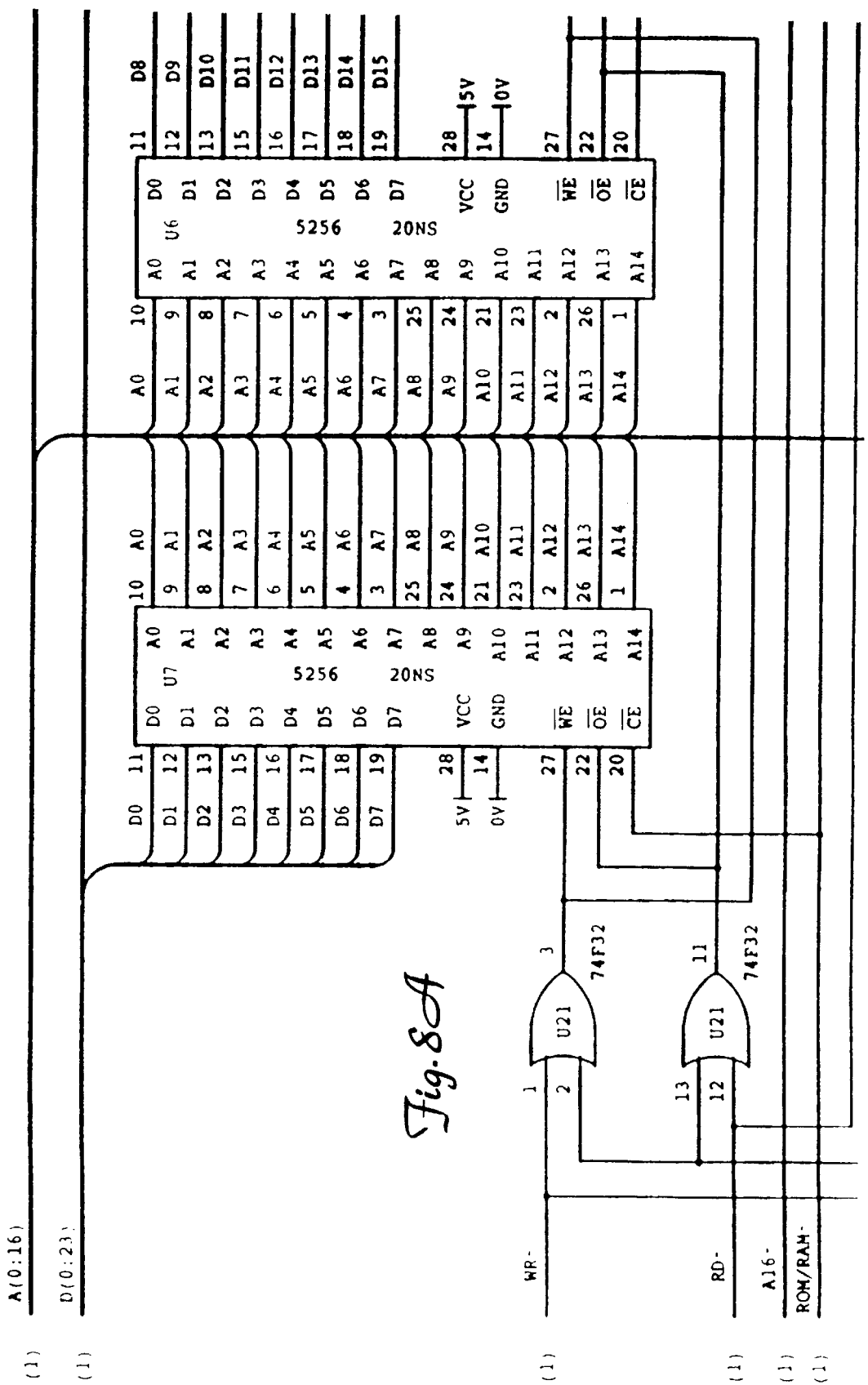
Figure 8B:
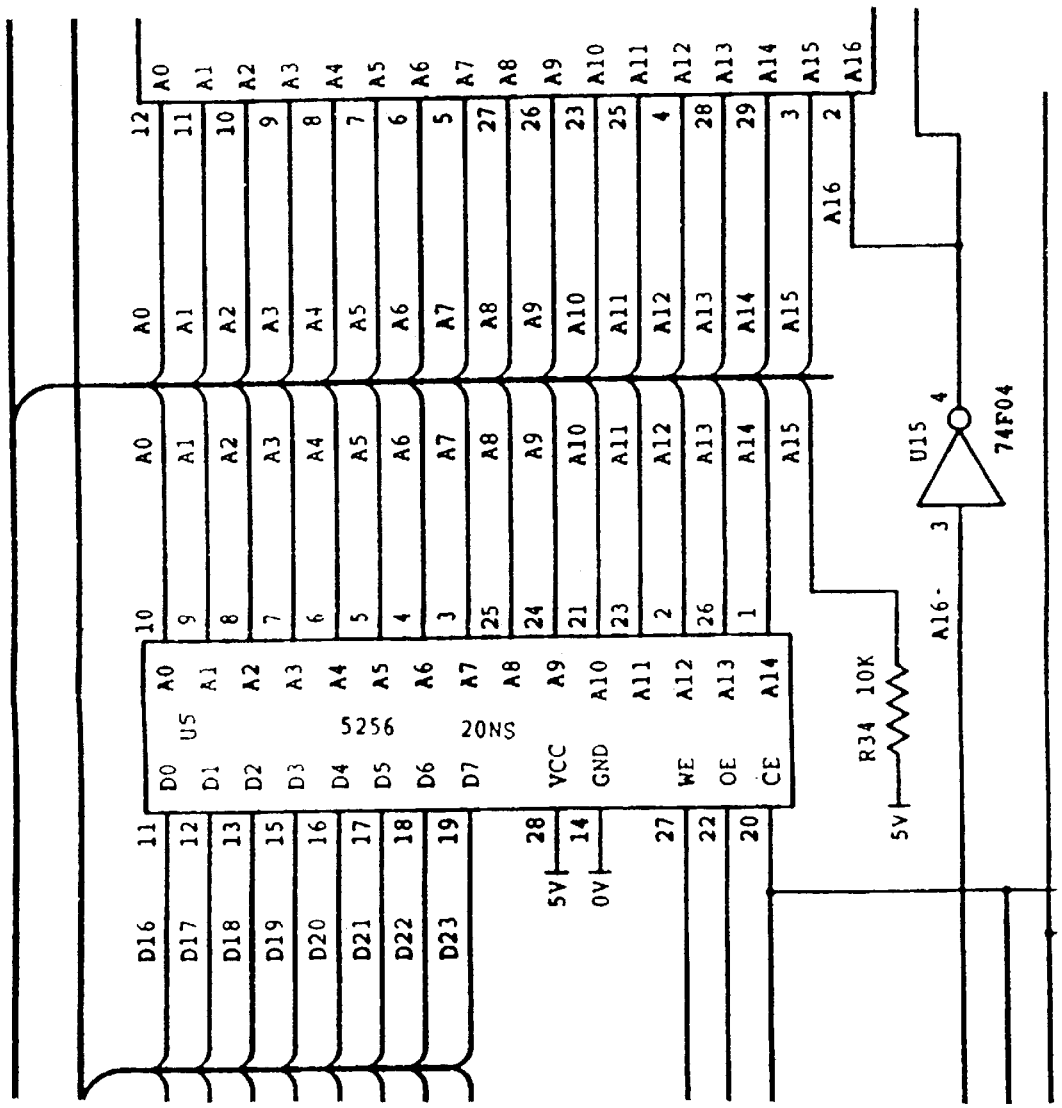
Figure 8C:
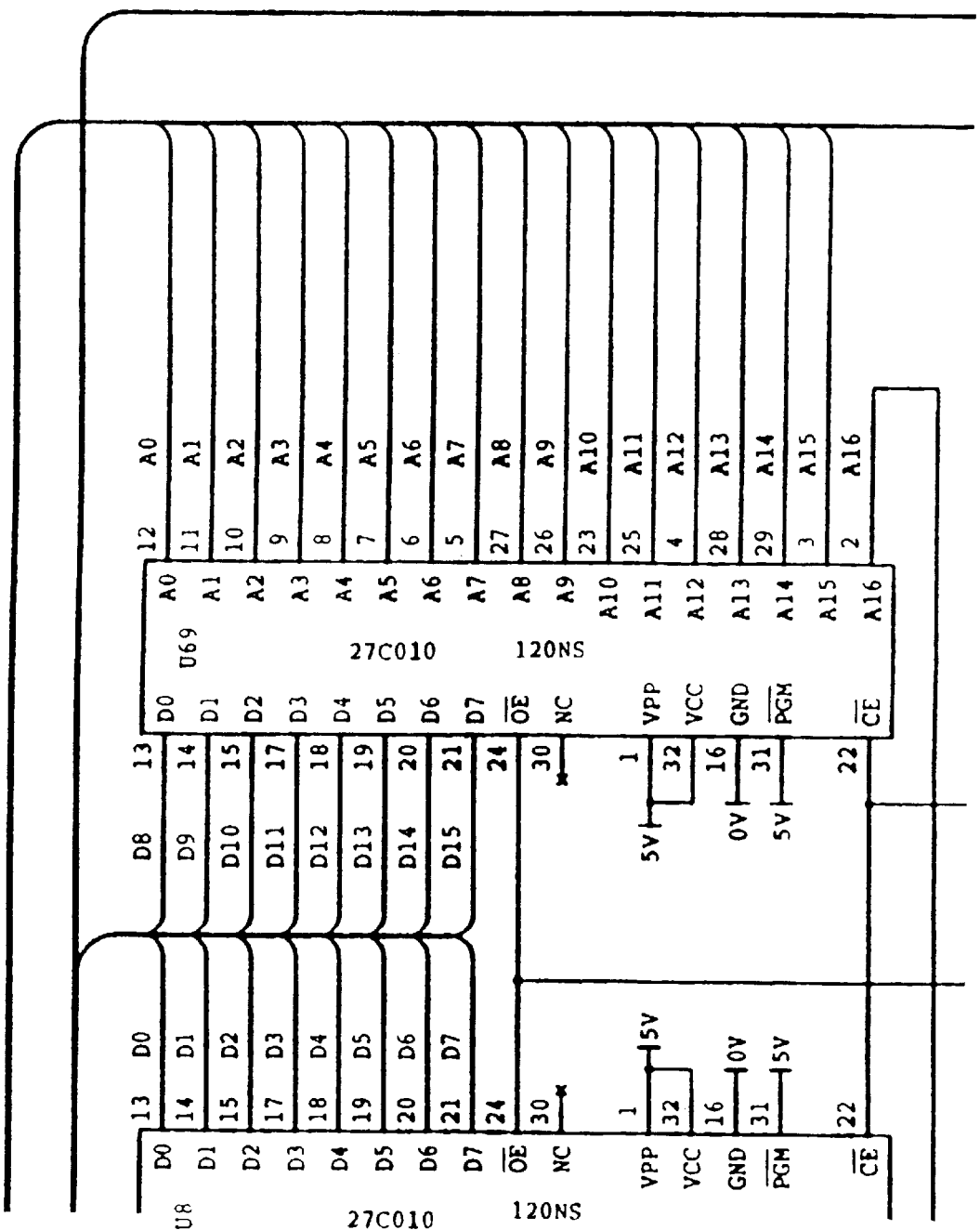
Figure 8E:
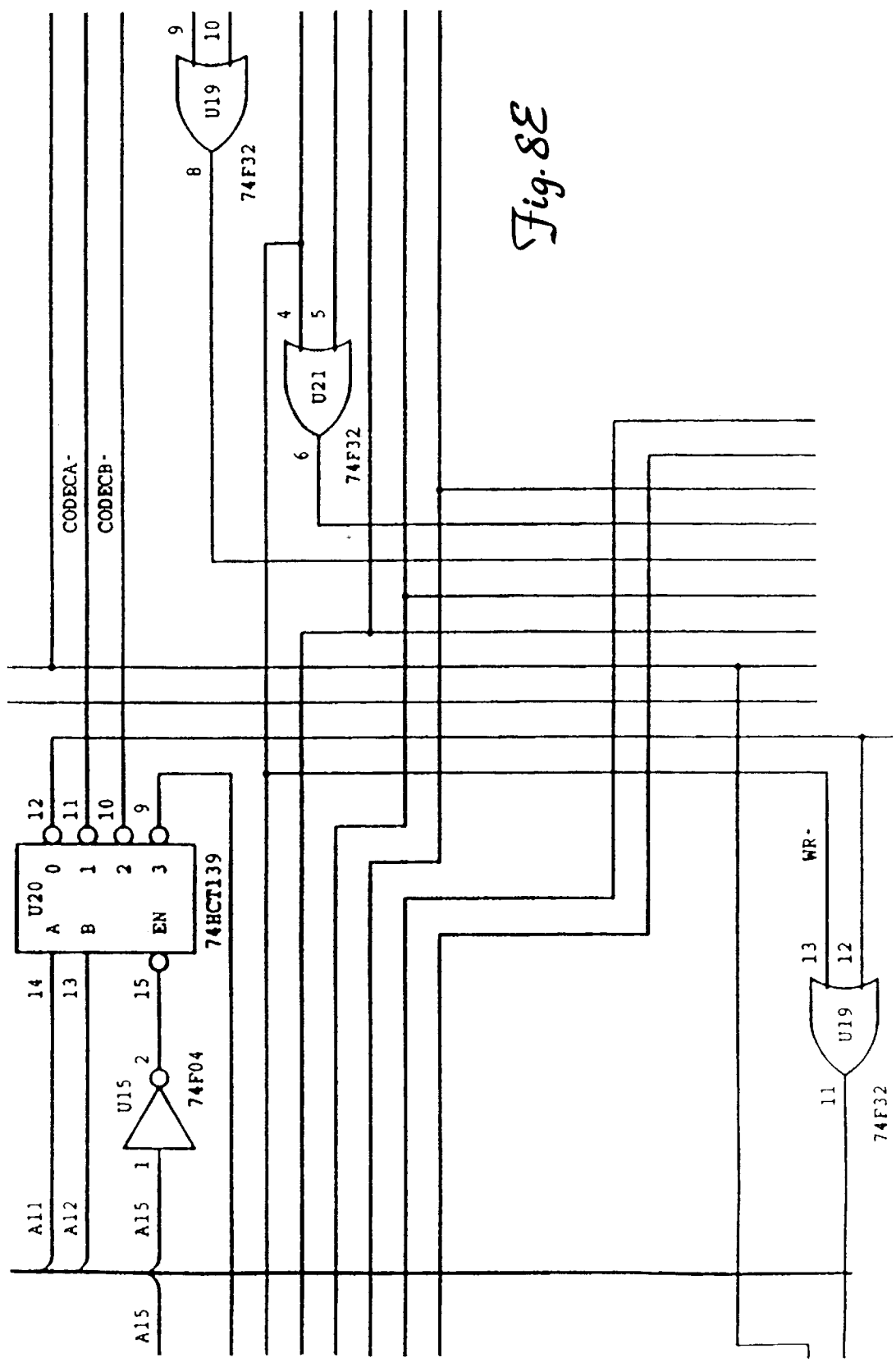
Figure 8J:
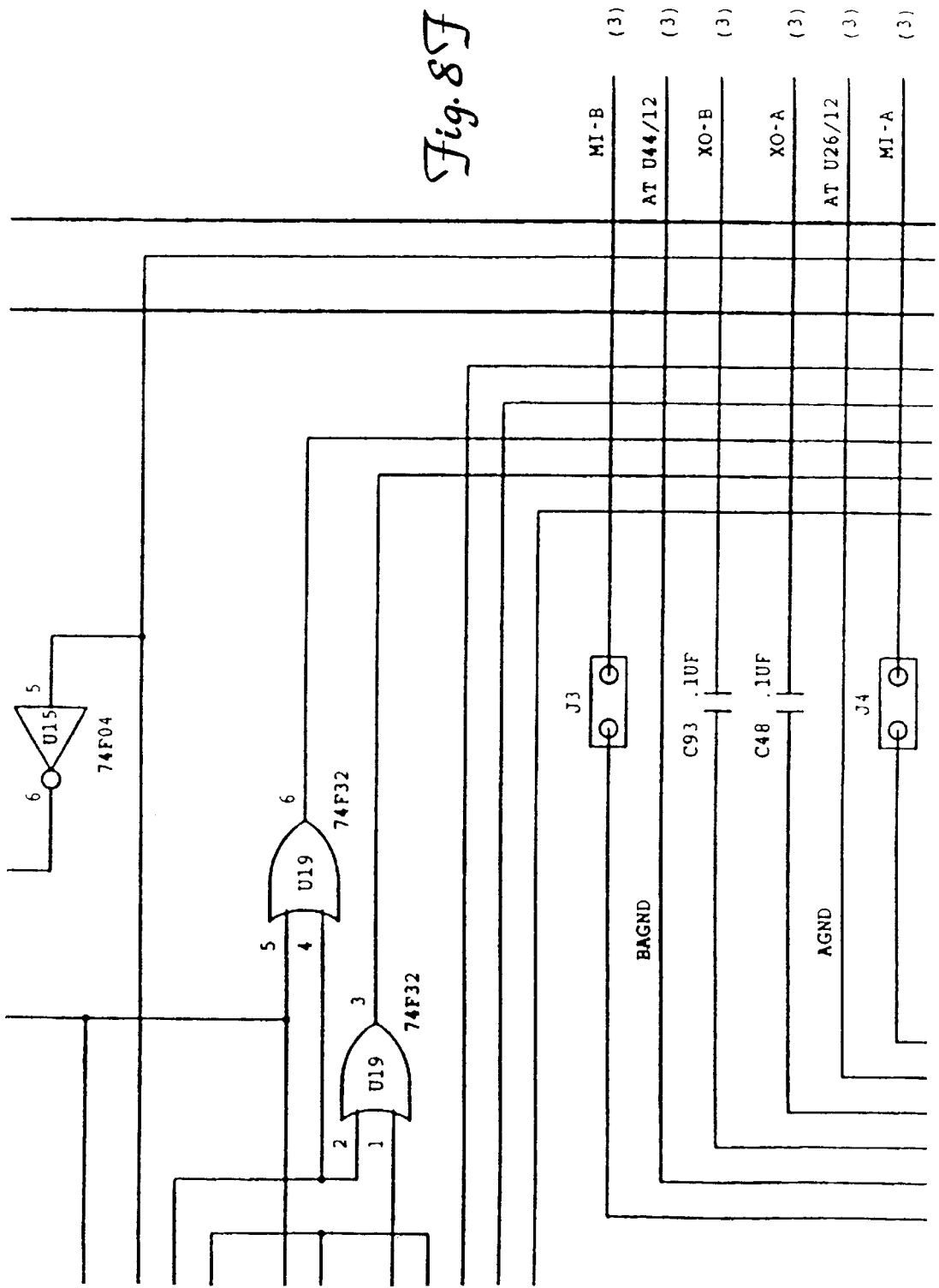
Figure 89:
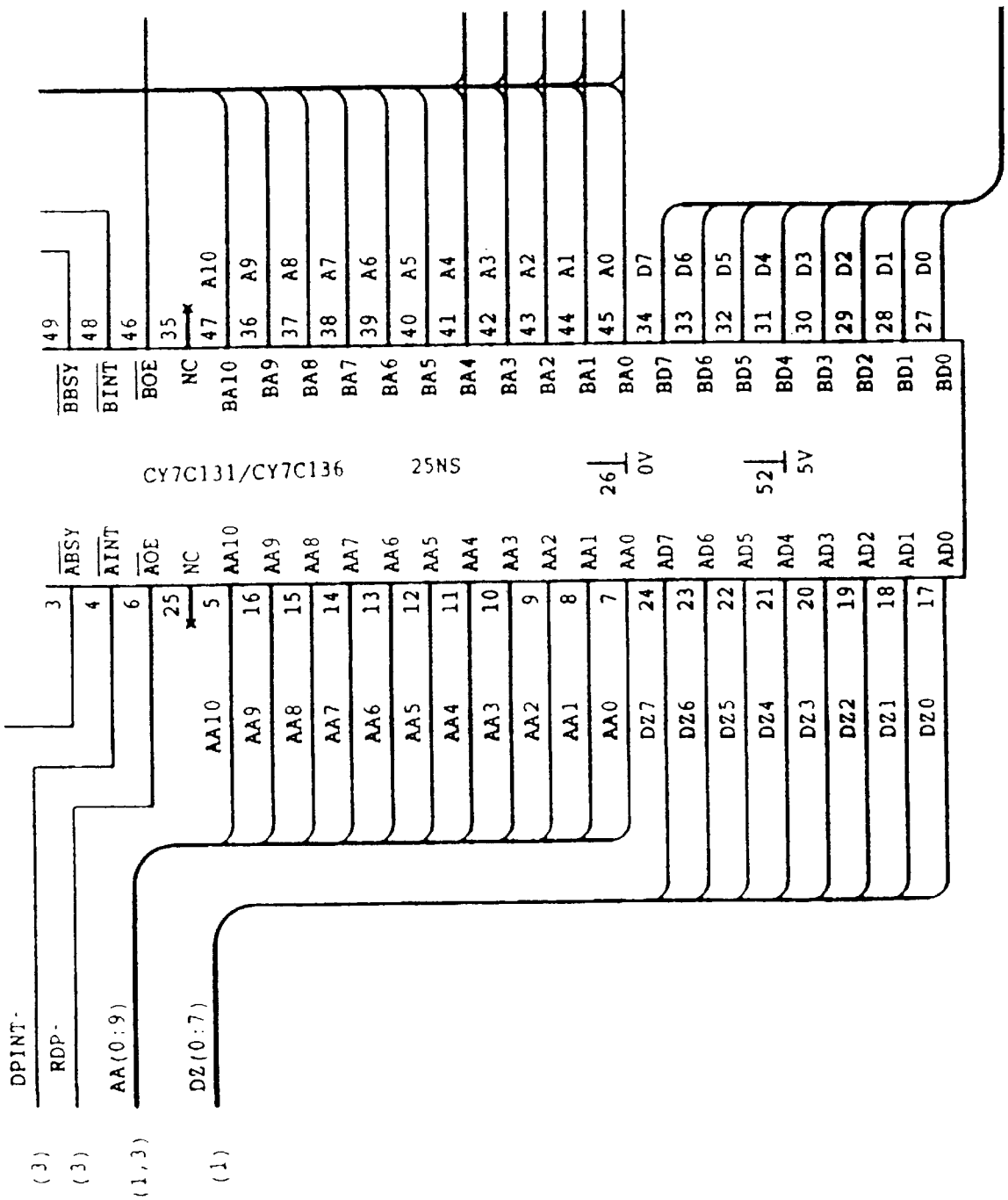
Figure 84:
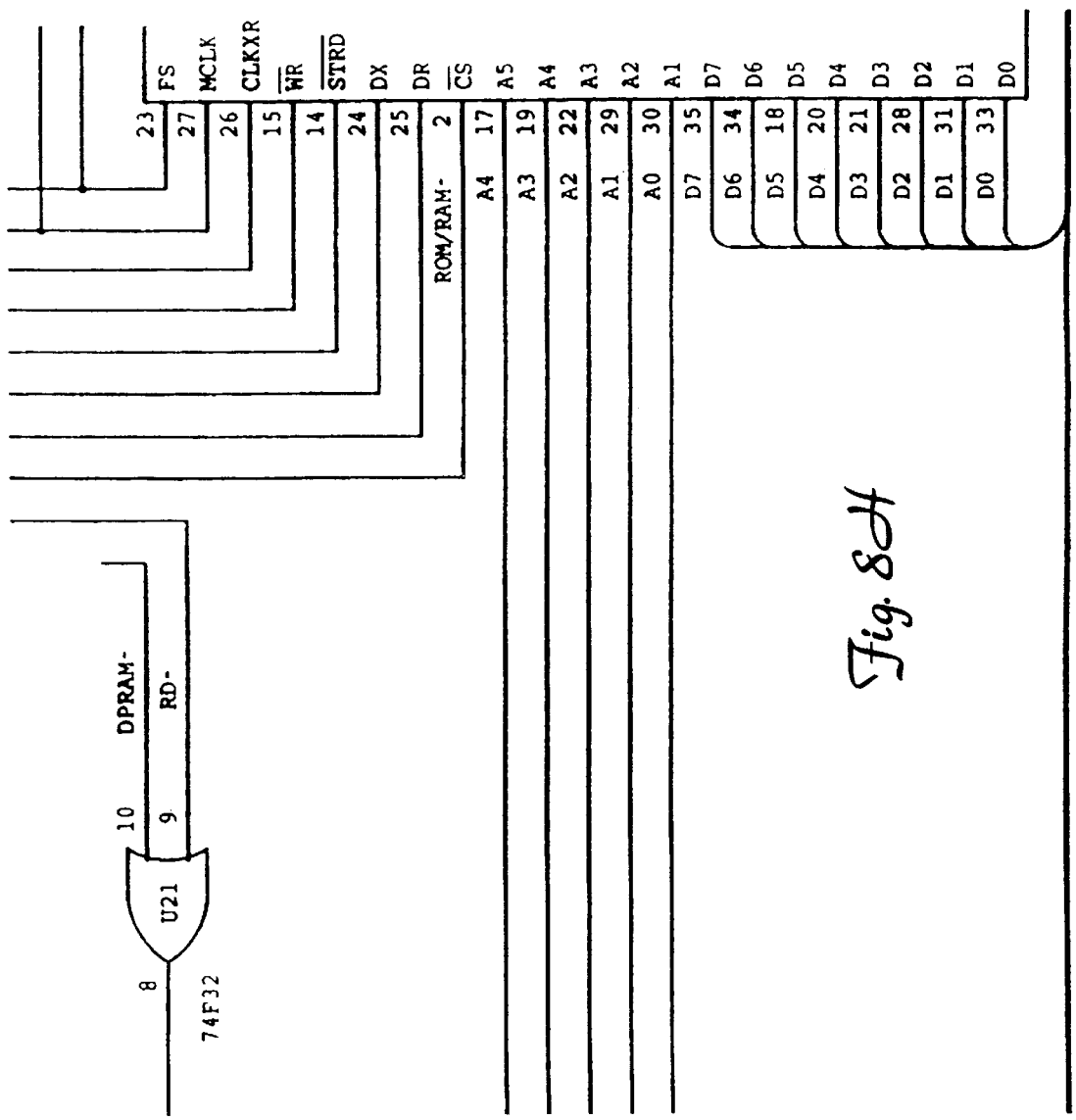

Referring to FIGS. 8A and 8B, the dual port RAM memory U10 corresponds to the dual port RAM memory 307 of FIGS. 6C, 5 and 4. Dual port RAM 307 is used to transfer the voice and fax packets to and from the command processor 612 of FIG. 6B. SRAM circuits U5, U6 and U7 in the upper parts of FIGS. 8A and 8B correspond to the RAM memory 618 of FIG. 6C. This memory contains the operating programs for DSP U14 of FIG. 7A (corresponding to DSP 620 of FIG. 6C). DSP U14 executes the program code from SRAM memory circuits U5, U6 and U7 but the code is permanently stored in non-volatile EPROM memory 619 of FIG. 6C corresponding to EPROM circuits U8 and U69 of FIG. 8B. The code executes much faster from the RAM memory 618 so the operating program code is loaded from the EPROM 618 to the RAM 619 upon power up of the system.

Figure 9A:
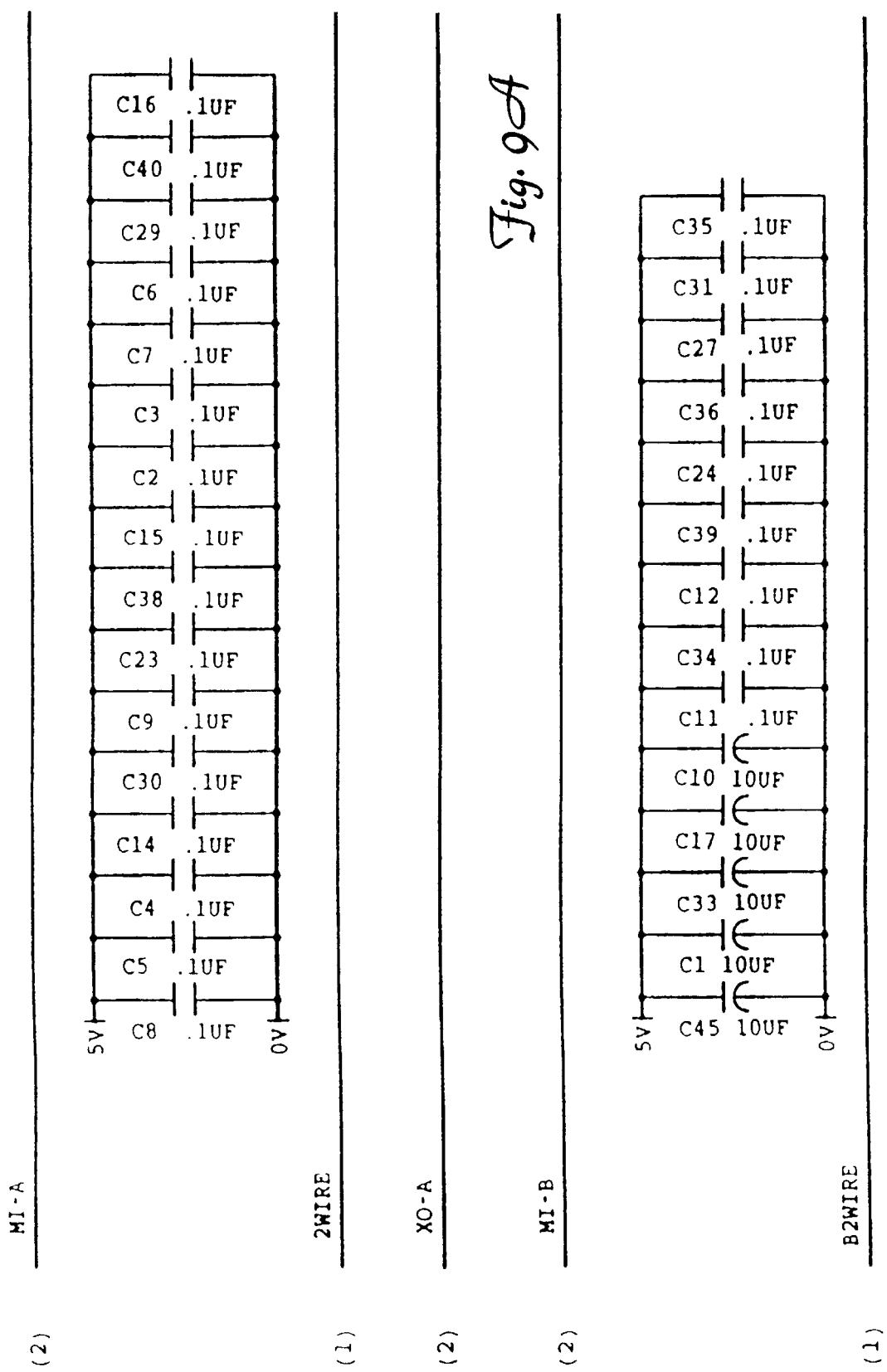
Figure 9B:
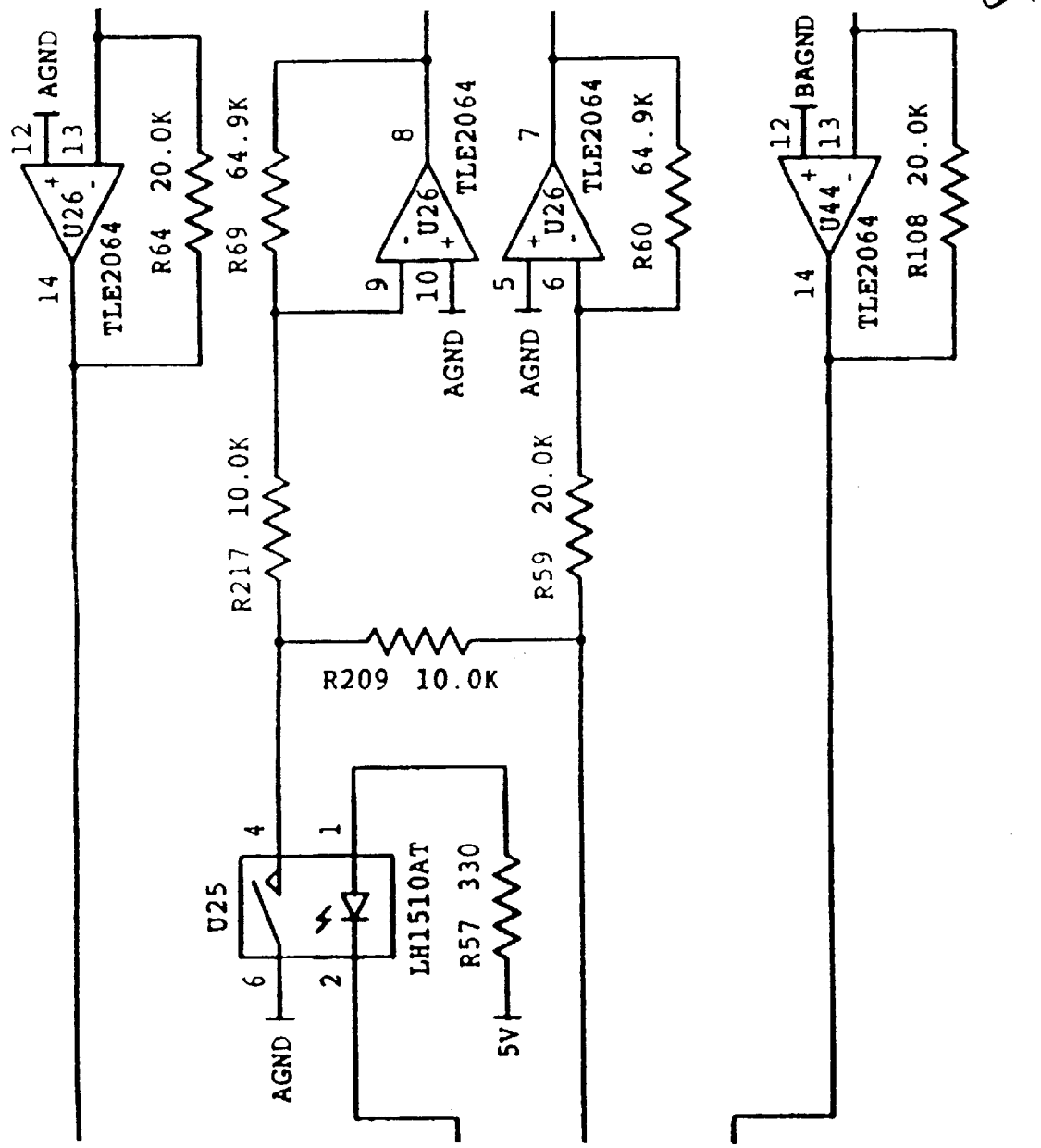
Figure 9C:
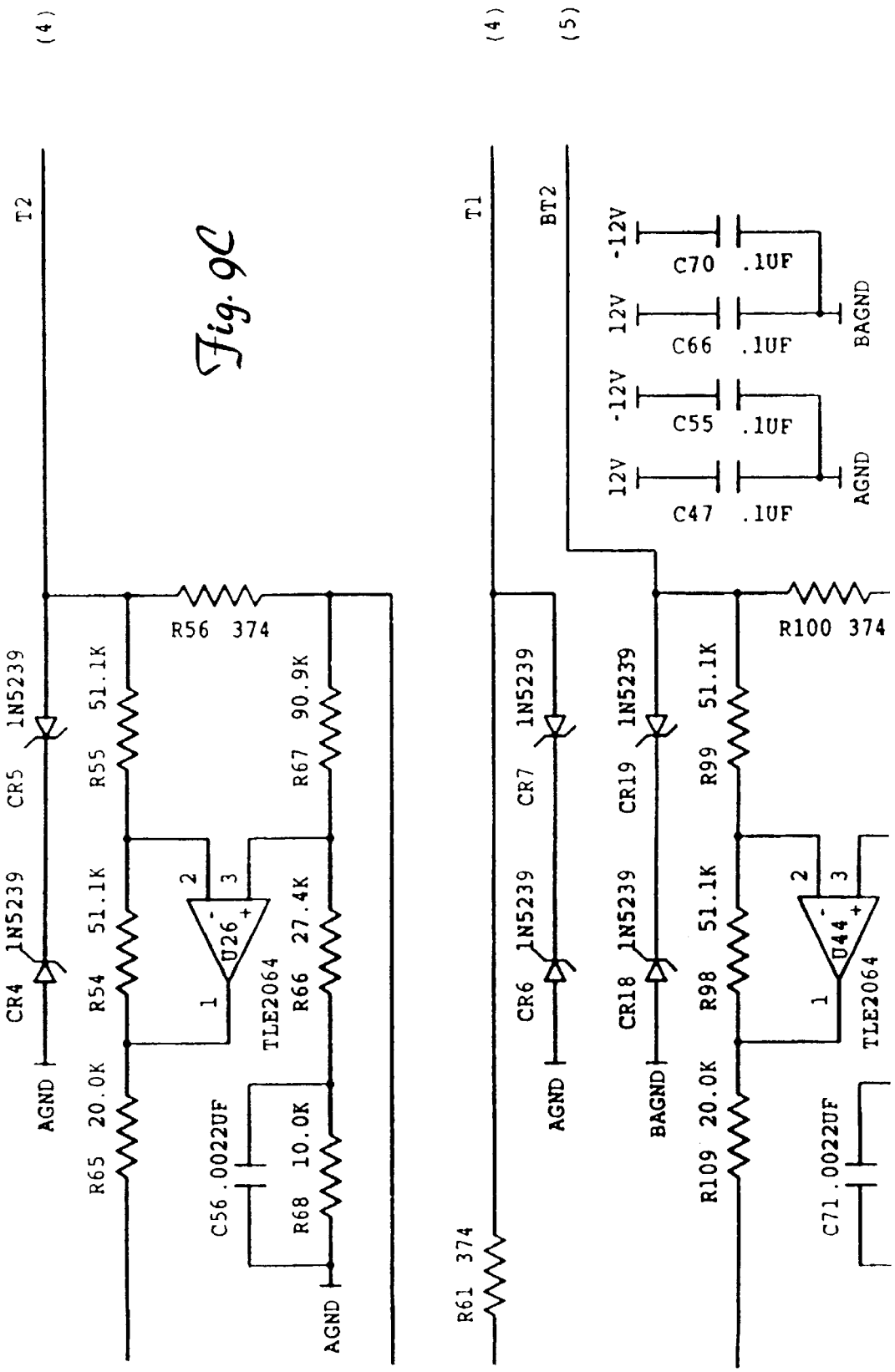
Figure 9D:
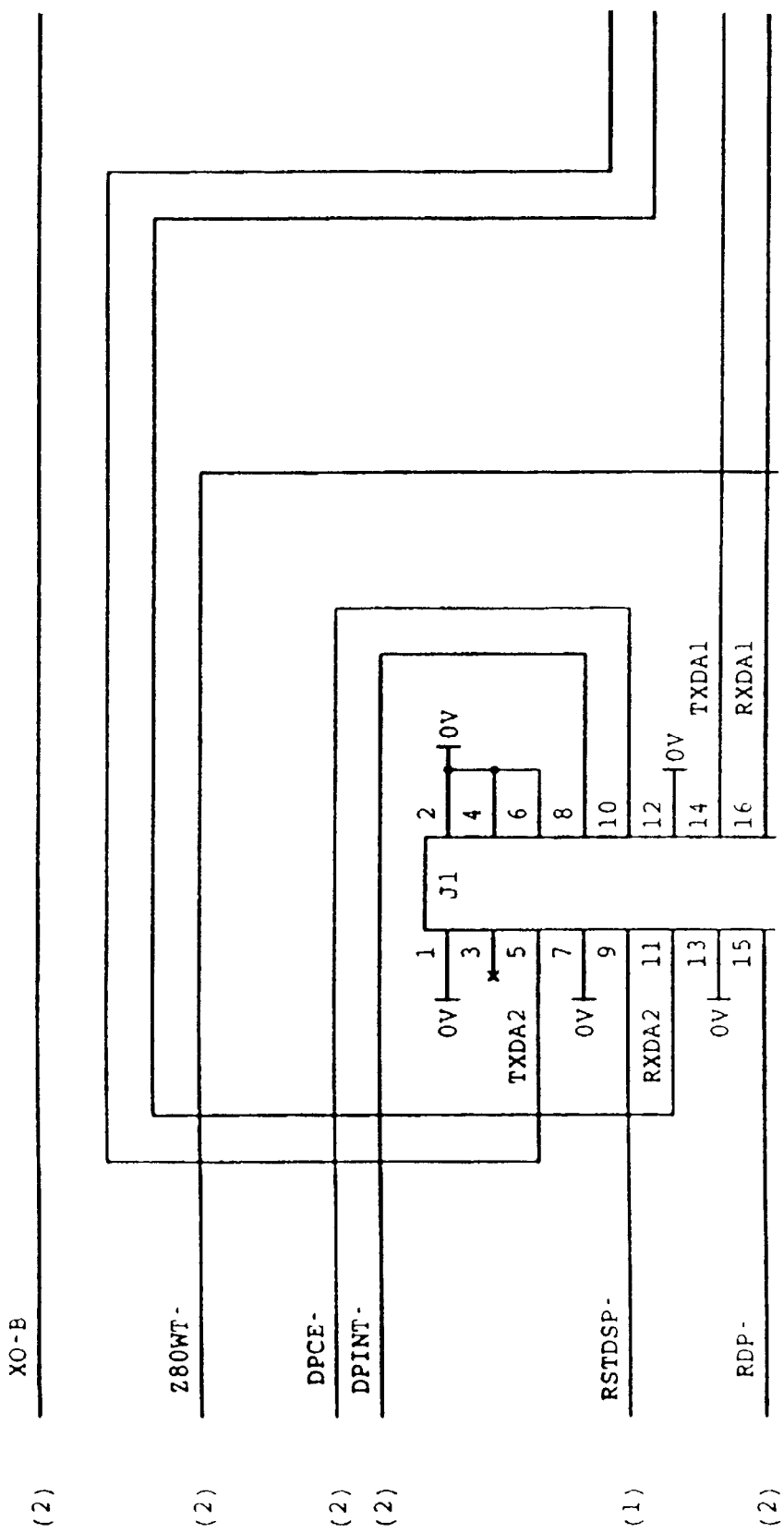
Figure 9E:
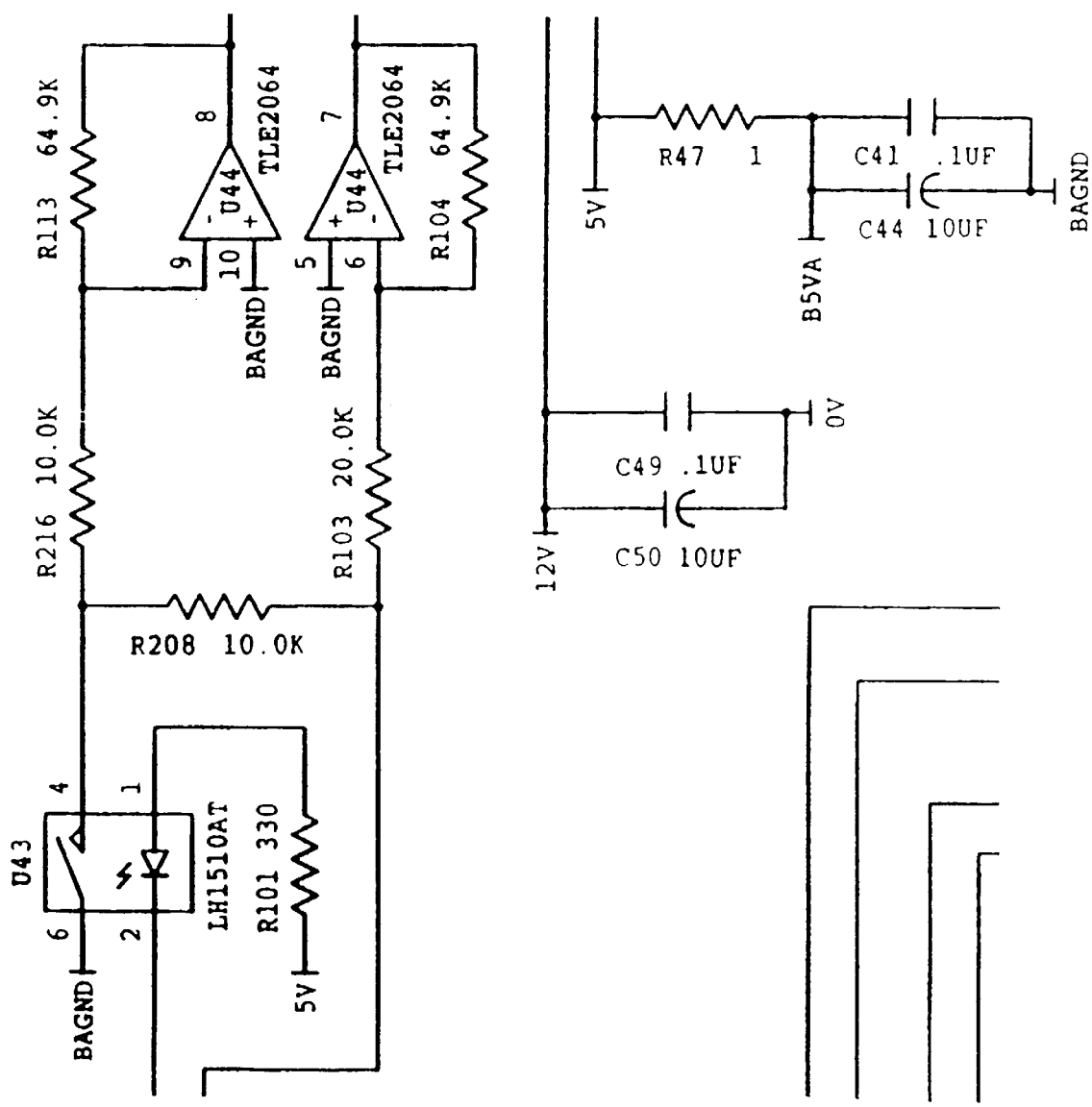
Figure 9J:
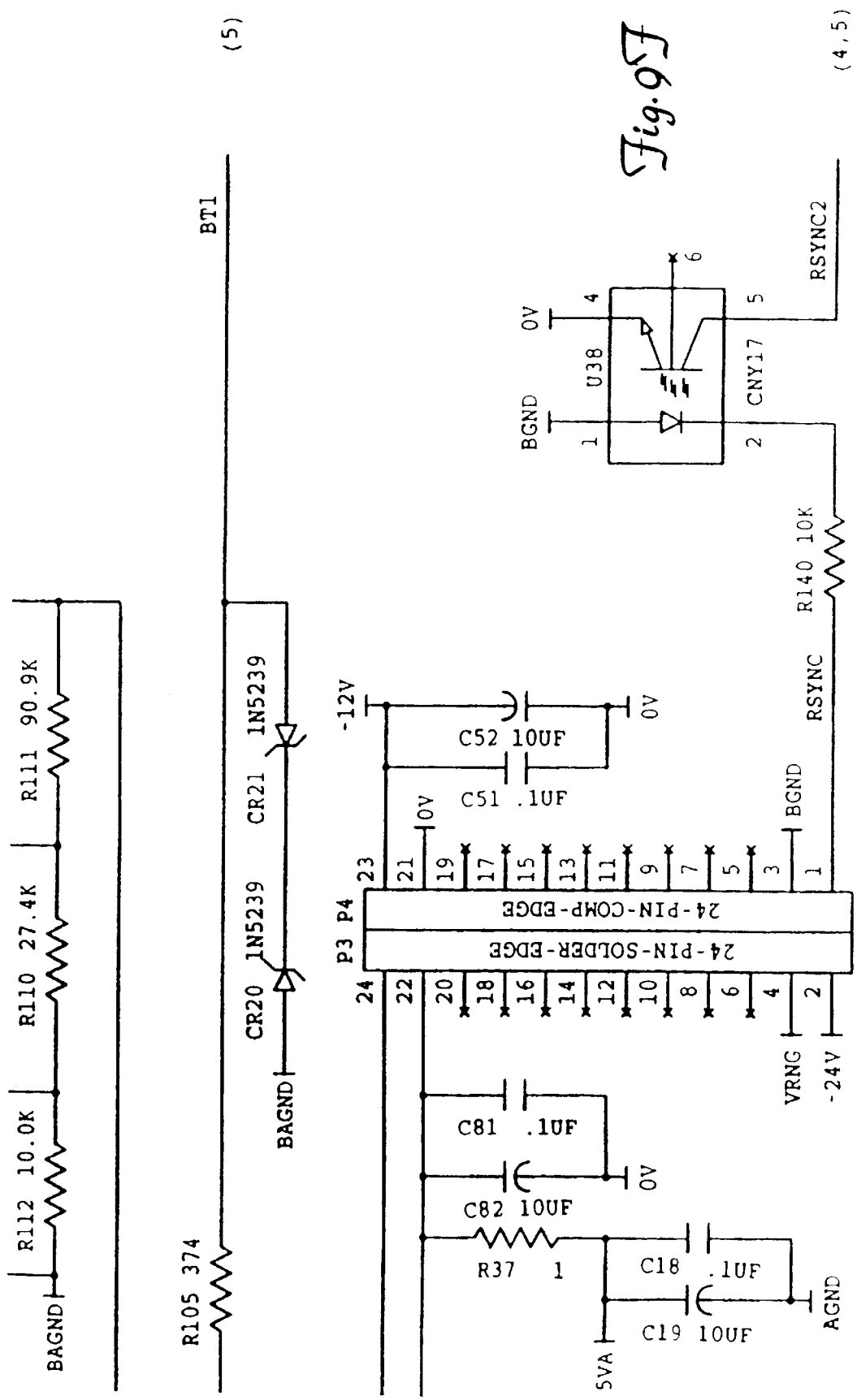
Figure 9S:
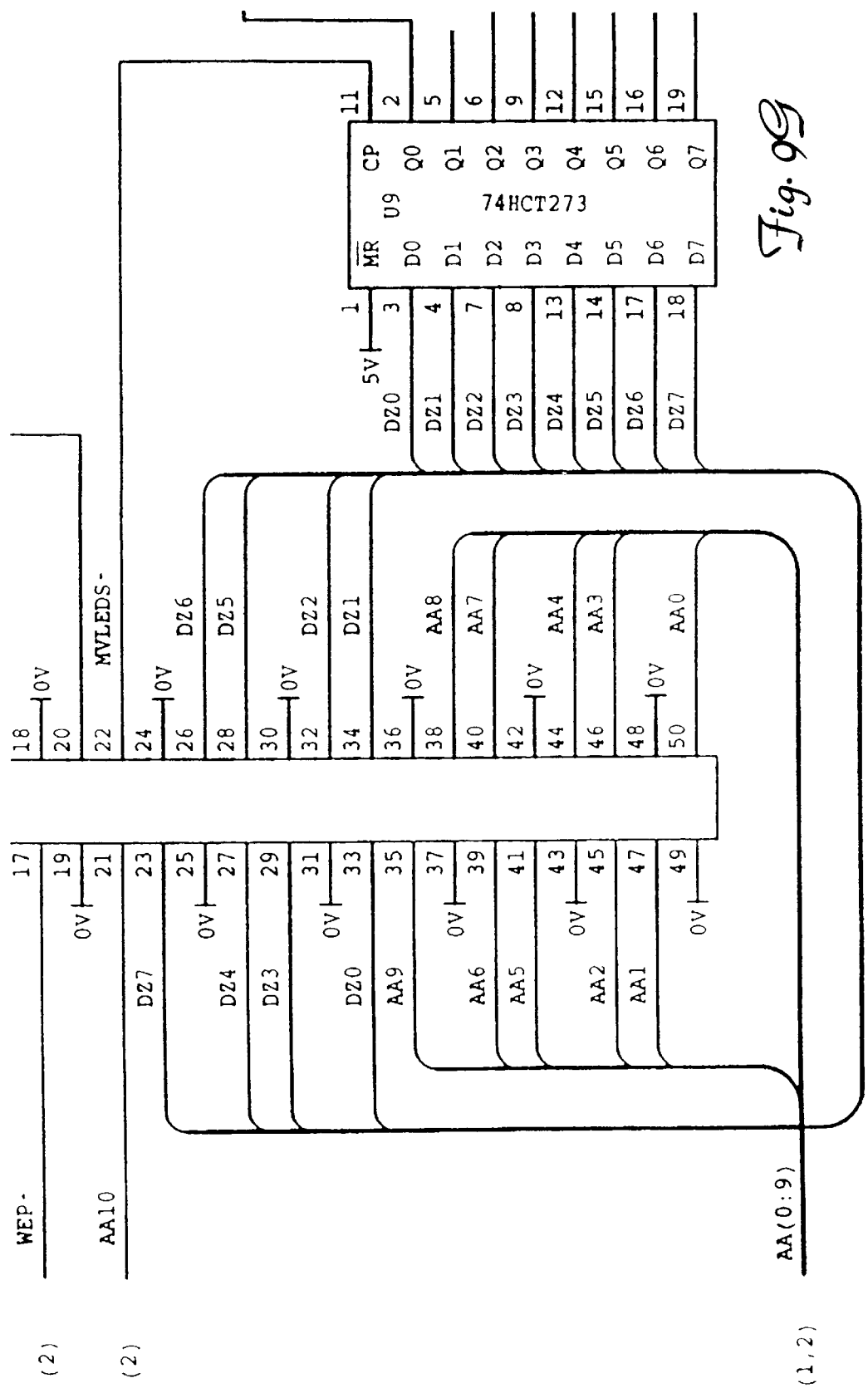
Figure 9D:
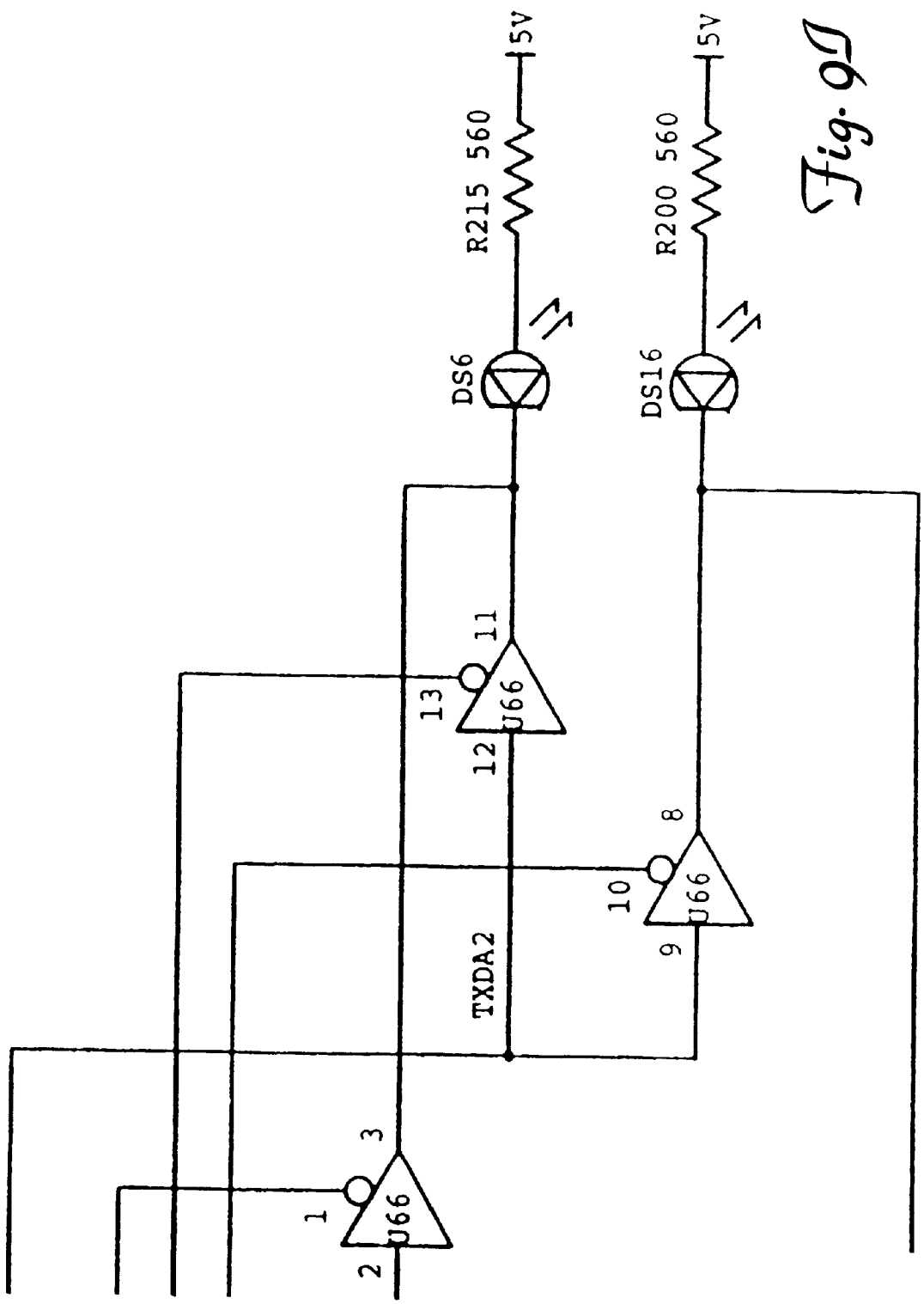

Referring to FIGS. 9A and 9B, connector J1 is the interface 607 with the main aggregate board of FIG. 6B. The operational amplifiers in the top portion of FIG. 9B are used for gain control and level control of the analog voice signals. Not shown in these schematic diagrams are the AC (ring voltage) and DC voltage sources.

CODEC 621a for channel 1 of FIG. 6C corresponds to CODEC circuit U24 of FIG. 8B. CODEC 621b for channel 2 of FIG. 6C corresponds to CODEC circuit U16 of FIG. 8B. CODEC's U24 and U16 include an analog to digital (A/D) converter and a digital to analog (D/A) converter.

Additional detail regarding echo cancellation, voice digitization and voice compression can be found in copending U.S. patent application Ser. No. 08/002,467 filed Jan. 8, 1993 entitled "COMPUTER-BASED MULTIFUNCTION PERSONAL COMMUNICATIONS SYSTEM", the complete application of which, including the microfiche appendix, is hereby incorporated by reference. This application is assigned to the same assignee as the present invention. The DSP 56002 DSP U14 is described more fully in the DSP56002 Digital Signal Processor User's Manual published in 1993 Motorola, Inc., which is hereby incorporated by reference. CODEC chips U16 and U24, in the preferred embodiment, are part number T7540 Digital Telephone CODEC manufactured and sold by AT&T Microelectronics. A more detailed description of this telephone CODEC chip U12 is described in the T7540 Digital Telephone CODEC Data Sheet and Addendum published July, 1991 by AT&T Microelectronics, which is hereby incorporated by reference.

Speech Compression

The Speech Compression Algorithm for compressing/decompressing the digitized speech information of the present system is accomplished via the DSP 620 of FIG. 6C. The analog voice signals are received and digitized by the telephone CODEC circuits 621a or 621b. The digitized voice information is passed from the digital telephone CODEC circuits to the digital signal processor (DSP) 620 which is programmed to do the voice compression algorithm. The DSP 620 compresses the speech and places the compressed digital representations of the speech into special voice packets described more fully below. As a result of the voice compression algorithm, the compressed voice information is passed to the dual port RAM circuit 307 for forwarding to the aggregate board in FIG. 6B.

Speech Compression Algorithm

To multiplex high-fidelity speech with digital data and transmit both over the over the telephone line, a high available bandwidth would normally be required. In the present invention, the analog voice information is digitized into 8-bit PCM data at an 8 kHz sampling rate producing a serial bit stream of 64,000 bps serial data rate. This rate cannot be transmitted over the telephone line. With the Speech Compression algorithm described below, the 64 kbs digital voice data is compressed into a 9500 bps encoding bit stream using a fixed-point (non-floating point) DSP such that the compressed speech of channel 1 can be transmitted over the telephone line multiplexed with fax data, compressed speech of channel 2, or asynchronous data. This is accomplished in an efficient manner such that enough machine cycles remain during real time speech compression to allow to allow for echo cancellation in the same fixed-point DSP 620.

A silence detection function is used to detect quiet intervals in the speech signal which allows the data processor 620 to substitute asynchronous data in lieu of voice data packets over the composite link to efficiently time multiplex the voice and asynchronous data transmission. The allocation of time for asynchronous data transmission is constantly changing depending on how much silence is on either of the voice channels.

The voice compression algorithm of the present system relies on a model of human speech which shows that human speech contains redundancy inherent in the voice patterns. Only the incremental innovations (changes) need to be transmitted. The algorithm operates on 128 digitized speech samples (20 milliseconds at 6400 Hz), divides the speech samples into time segments of 32 samples (5 milliseconds) each, and uses predicted coding on each segment. Thus, the input to the algorithm could be either PCM data sampled at 6400 Hz or 8000 Hz. If the sampling is at 8000 Hz, or any other selected sampling rate, the input sample data stream must be decimated from 8000 Hz to 6400 Hz before processing the speech data. At the output, the 6400 Hz PCM signal is interpolated back to 8000 Hz and passed to the CODEC.

With this algorithm, the current segment is predicted as best as possible based on the past recreated segments and a difference signal is determined. The difference values are compared to the stored difference values in a lookup table or code book, and the address of the closest value is sent to the remote site along with the predicted gain and pitch values for each segment. In this fashion, the entire 20 milliseconds of speech can be represented by 190 bits.

To produce this compression, the present system includes a unique Vector Quantization (VQ) speech compression algorithm designed to provide maximum fidelity with minimum compute power and bandwidth. The VQ algorithm has two major components. The first section reduces the dynamic range of the input speech signal by removing short term and long term redundancies. This reduction is done in the waveform domain, with the synthesized part used as the reference for determining the incremental "new" content. The second section maps the residual signal into a code book optimized for preserving the general spectral shape of the speech signal.

Figure 11:
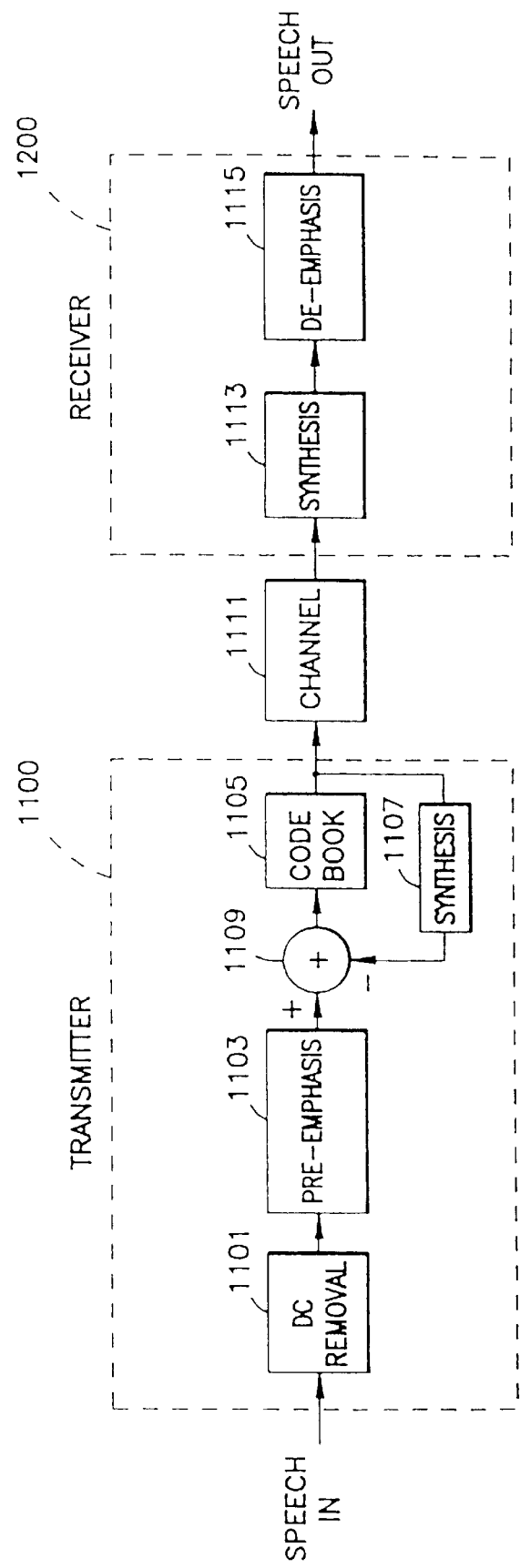
FIG. 11 is a signal flow diagram of the speech compression algorithm.

FIG. 11 is a high level signal flow block diagram of the speech compression algorithm used in the present system to compress the digitized voice for transmission over the telephone line in the voice over data mode of operation or for storage and use on the personal computer. The transmitter and receiver components are implemented using the DSP 620 of FIG. 6C.

The DC removal stage 1101 receives the digitized speech signal and removes the D.C. bias by calculating the long-term average and subtracting it from each sample. This ensures that the digital samples of the speech are centered about a zero mean value. The pre-emphasis. Stage 1103 whitens the spectral content of the speech signal by balancing the extra energy in the low band with the reduced energy in the high band.

The system finds the innovation in the current speech segment by subtracting 1109 the prediction from reconstructed past samples synthesized from synthesis stage 1107. This process requires the synthesis of the past speech samples locally (analysis by synthesis). The synthesis block 1107 at the transmitter performs the same function as the synthesis block 1113 at the receiver. When the reconstructed previous segment of speech is subtracted from the present segment (before prediction), a difference term is produced in the form of an error signal. This residual error is used to find the best match in the code book 1105. The code book 1105 quantizes the error signal using a code book generated from a representative set of speakers and environments. A minimum mean squared error match is determined in segments. In addition, the code book is designed to provide a quantization error with spectral rolloff (higher quantization error for low frequencies and lower quantization error for higher frequencies). Thus, the quantization noise spectrum in the reconstructed signal will always tend to be smaller than the underlying speech signal.

The channel 1111 corresponds to the aggregate board 402 and the composite link in which the compressed speech bits are multiplexed with data bits using a packet format described below. The voice bits are sent in packets of 5 frames each, each frame corresponding to 20 ms of speech in 128 samples. The size of the packets depends upon the type of compression used. Three compression algorithms are described which will be called 8K, 9.6K and 16K. The 8K and 9.6K algorithms results in a 24 byte packet while the 16K algorithm produces a packet of 48 bytes for each 20 ms speech segment.

Each frame of 20 ms is divided into 4 sub-blocks or segments of 5 ms each. In each sub-block of the data consists of a plurality of bits for the long term predictor, a plurality of bits for the long term predictor gain, a plurality of bits for the sub-block gain, and a plurality of bits for each code book entry for each 5 ms. The bits for the code book entries consists of four or five table entries in a 256 long code book of 1.25 ms duration. In the code book block, each 1.25 ms of speech is looked up in a 256 word code book for the best match. The table entry is transmitted rather than the actual samples. The code book entries are pre-computed from representative speech segments, as described more fully below.

On the receiving end 1200, the synthesis block 1113 at the receiver performs the same function as the synthesis block 1107 at the transmitter. The synthesis block 1113 reconstructs the original signal from the voice data packets by using the gain and pitch values and code book address corresponding to the error signal most closely matched in the code book. The code book at the receiver is similar to the code book 1105 in the transmitter. Thus the synthesis block recreates the original pre-emphasized signal. The de-emphasis stage 1115 inverts the pre-emphasis operation by restoring the balance of original speech signal.

The complete speech compression algorithm is summarized as follows:

a) Digitally sample the voice to produce a PCM sample bit stream sampled at 16,000 samples per second, 9600 samples per second or 8,000 samples per second.

b) Decimate the sampled data to produce a common sampling rate of 8,000 samples per second from all of the actual sample rates.

c) Remove any D.C. bias in the speech signal.

d) Pre-emphasize the signal.

e) Find the innovation in the current speech segment by subtracting the prediction from reconstructed past samples. This step requires the synthesis of the past speech samples locally (analysis by synthesis) such that the residual error is fed back into the system.

f) Quantize the error signal using a code book generated from a representative set of speakers and environments. A minimum mean squared error match is determined in 5 ms segments. In addition, the code book is designed to provide a quantization error with spectral rolloff (higher quantization error for low frequencies and lower quantization error for higher frequencies). Thus, the quantization noise spectrum in the reconstructed signal will always tend to be smaller than the underlying speech signal.

g) At the transmitter and the receiver, reconstruct the speech from the quantized error signal fed into the inverse of the function in step (e) above. Use this signal for analysis by synthesis and for the output to the reconstruction stage below.

h) Use a de-emphasis filter to reconstruct the output.

The major advantages of this approach over other low-bit-rate algorithms are that there is no need for any complicated calculation of reflection coefficients (no matrix inverse or lattice filter computations). Also, the quantization noise in the output speech is hidden under the speech signal and there are no pitch tracking artifacts: the speech sounds "natural", with only minor increases of background hiss at lower bit-rates. The computational load is reduced significantly compared to a VSELP algorithm and variations of the present algorithm thus provides bit rates of 8, 9.6 and 16 Kbit/s, and can also provide bit rates of 9.2 kbits/s, 9.5 kbits/s and many other rates. The total delay through the analysis section is less than 20 milliseconds in the preferred embodiment. The present algorithm is accomplished completely in the waveform domain and there is no spectral information being computed and no filter computations are needed.

Detailed Description of the Speech Compression Algorithm

The speech compression algorithm is described in greater detail with reference to FIGS. 11 through 13, and with reference to the block diagram of the hardware components of the present system shown at FIG. 6C. Also, reference is made to the detailed schematic diagrams in FIGS. 7A–10B. The voice compression algorithm operates within the programmed control of the DSP circuit 620. In operation, the speech or analog voice signal is received through the telephone interfaces such as FXS and is digitized by the CODEC circuit 621a or 621b. The CODEC for circuit 621a or 621b is a commanding µ-law CODEC. The analog voice signal from the telephone interface is band-limited to about 3,000 Hz and sampled at a selected sampling rate by digital telephone CODEC 621a or 621b. The sample rates in the preferred embodiment of the present invention are 8 kb/s, 9.6 kb/s and 16 kb/s. Each sample is encoded into 8-bit PCM data producing a serial 64 kb/s, 76.8 kb/s or 128 kb/s signal, respectively. The digitized samples are passed to the DSP 620. There, the 8-bit µ-law PCM data is converted to 13-bit linear PCM data. The 13-bit representation is necessary to accurately represent the linear version of the logarithmic 8-bit µ-law PCM data. With linear PCM data, simpler mathematics may be performed on the PCM data.

The sampled and digitized PCM voice signals from the telephone µ-law CODEC 621a or 621b are passed to the DSP 620 via direct data lines clocked and synchronized to a clocking frequency. The sample rates in CODEC 621a or 621b in the preferred embodiment of the present invention are 8 kb/s, 9.6 kb/s and 16 kb/s. The digital samples are loaded into DSP 620 one at a time through the serial input and stored into an internal queue held in RAM, converted to linear PCM data and decimated to a sample rate of 6.4 Kb/s. As the samples are loaded into the end of the queue in the RAM of the DSP 620, the samples at the head of the queue are operated upon by the voice compression algorithm. The voice compression algorithm then produces a greatly compressed representation of the speech signals in a digital packet form. The compressed speech signal packets are then passed to the dual port RAM circuit 308 shown in FIG. 6C for use by the data processor 318 for transmission.

Concurrent with this transmit operation, DSP 620 is receiving compressed voice data packets from dual port RAM circuit 307, uncompressing the voice data and transferring the uncompressed and reconstructed digital PCM voice data to the digital telephone CODEC 621a or 621b for digital to analog conversion and eventual transfer to the user through one of the telephone interfaces of FIG. 6C. This is the receive mode of operation of the DSP 620 corresponding to receiver block 1200 of FIG. 11 and corresponding to the decompression algorithm of FIG. 13. Thus, the DSP circuit 620 is processing the voice data in both directions in a full-duplex fashion.

Digital Signal Processor (DSP) 620 operates at a clock frequency of approximately 24.576 MHz while processing data at sampling rates of approximately 8 KHz in both directions. The voice compression/decompression algorithms and packetization of the voice data is accomplished in a quick and efficient fashion to ensure that all processing is done in real-time without loss of voice information. This is accomplished in an efficient manner such that enough machine cycles remain in the voice control DSP circuit 620 during real time speech compression to allow real time acoustic and line echo cancellation in the same fixed-point DSP.

In programmed operation, the availability of an eight-bit sample of PCM voice data from the µ-law digital telephone CODEC circuit 621a or 621b causes an interrupt in DSP 620 where the sample is loaded into internal registers for processing. Once loaded into an internal register it is transferred to a RAM address which holds a queue of samples. The queued PCM digital voice samples are converted from 8-bit µ-law data to a 13-bit linear data format using table lookup for the conversion. Those skilled in the art will readily recognize that the digital telephone CODEC circuit 621a or 621b could also be a linear CODEC.

Sample Rate Decimation

The sampled and digitized PCM voice signals from the telephone µ-law CODEC 621a or 621b shown in FIG. 6C are passed DSP 620 via direct data lines clocked and synchronized to a clocking frequency. The sample rates in the preferred embodiment of the present invention are 8 kb/s, 9.6 kb/s and 16 kb/s. The digital samples for the 9.6K and 8K algorithms are decimated using a digital decimation process to produces a 6.4K and 6K sample rate, respectively. At the 16K sampling rate for the 16K algorithm, no decimation is needed for the voice compression algorithm.

Referring to FIG. 11, the decimated digital samples are shown as speech entering the transmitter block 1100. The transmitter block, of course, is the mode of operation of DSP 620 operating to receive local digitized voice information, compress it and packetize it for transfer to the dual port RAM 307 for eventual multiplexing and transmission on the composite link, which corresponds to the channel 1111 of FIG. 11. A frame rate for the voice compression algorithm is 20 milliseconds of speech for each compression. This correlates to 128 samples to process per frame for the 6.4K decimated sampling rate. When 128 samples are accumulated in the queue of the internal DSP RAM, the compression of that sample frame is begun.

Data Flow Description

DSP circuit 620 is programmed to first remove the DC component 1101 of the incoming speech. The DC removal is an adaptive function to establish a center base line on the voice signal by digitally adjusting the values of the PCM data. This corresponds to the DC removal stage 1203 of the software flow chart of FIG. 12. The formula for removal of the DC bias or drift is as follows:

$$x(n) = s(n) - s(n-1) + \alpha * x(n-1)$$

where $$\alpha = \frac{32735}{32768}$$

and where n=sample number, s(n) is the current sample, and x(n) is the sample with the DC bias removed.

The removal of the DC is for the 20 millisecond frame of voice which amounts to 128 samples at the 6.4K decimated sampling rate which corresponds to the 9.6K algorithm. The selection of a is based on empirical observation to provide the best result.

Figure 12A:
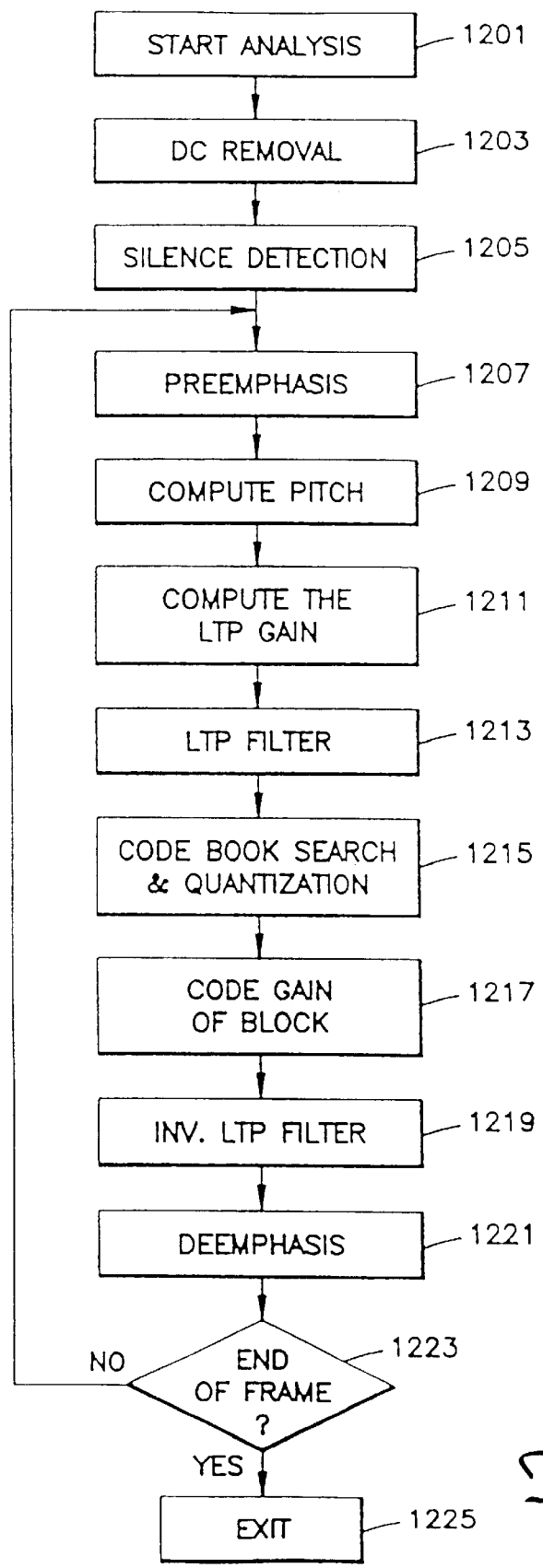
FIG. 12A is a detailed function flow diagram of the speech compression algorithm.
Figure 12B:
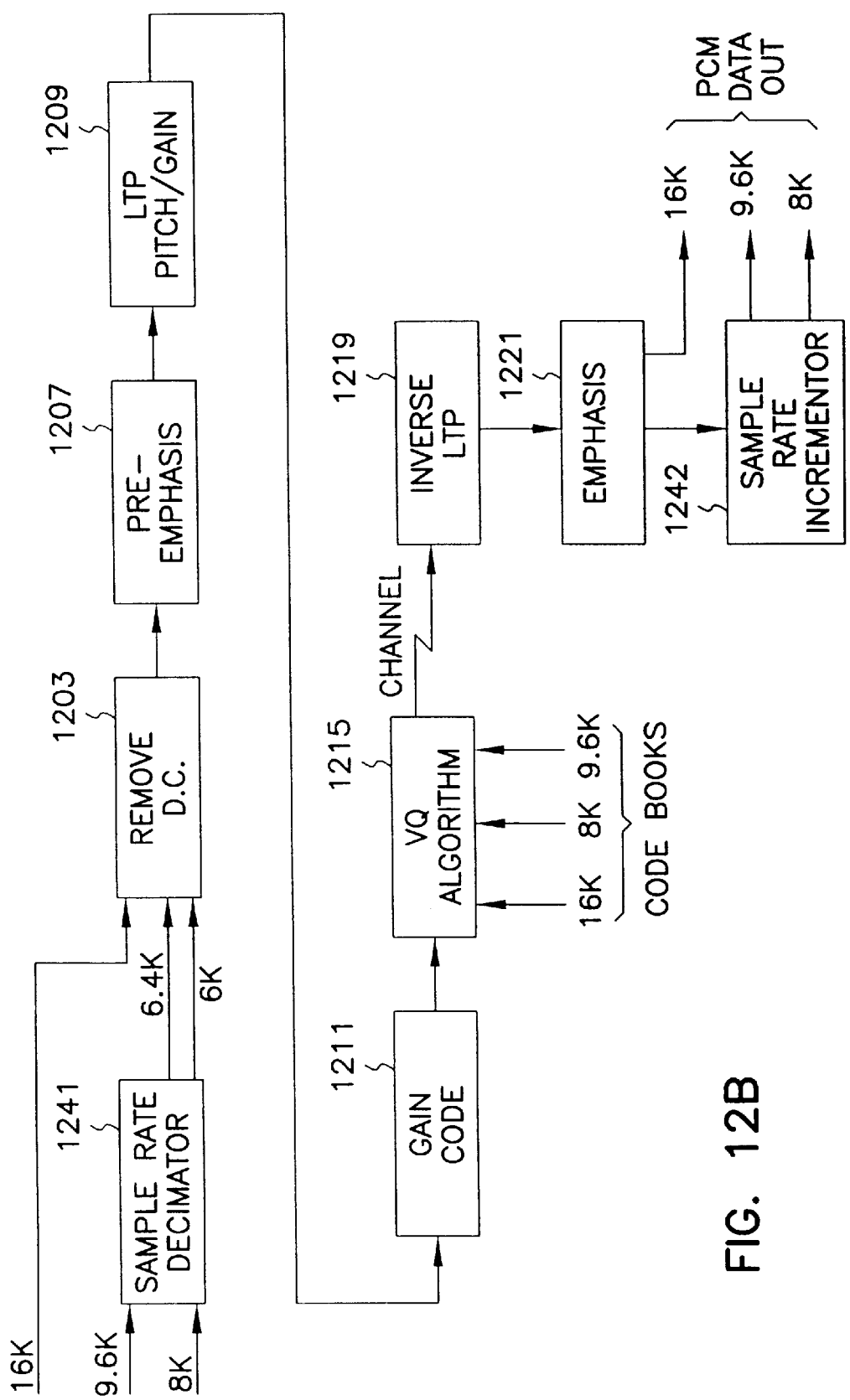
FIG. 12B is a signal flow diagram of the speech compression algorithm showing details of the code book synthesis.

Referring again to FIG. 12, the voice compression algorithm in a control flow diagram is shown which will assist in the understanding of the block diagram of FIG. 11. FIG. 12B is a simplified data flow description of the flow chart of FIG. 12A showing the sample rate decimator 1241 and the sample rate incrementor 1242. The analysis and compression begin at block 1201 where the 13-bit linear PCM speech samples are accumulated until 128 samples (for the 6.4K decimated sampling rate) representing 20 milliseconds of voice or one frame of voice is passed to the DC removal portion of code operating within the DSP 620. The DC removal portion of the code described above approximates the base line of the frame of voice by using an adaptive DC removal technique.

A silence detection algorithm 1205 is also included in the programmed code of the DSP 620. The silence detection function is a summation of the square of each sample of the voice signal over the frame. If the power of the voice frame falls below a preselected threshold, this would indicate a silent frame. The detection of a silence frame of speech is important for later multiplexing of the V-data (voice data) and C-data (asynchronous computer data) described below. During silent portions of the speech, data processor 318 will transfer conventional digital data (C-data) over the telephone line in lieu of voice data (V-data). The formula for computing the power is $$PWR = \sum_{n=0}^{128-1} x(n) * x(n)$$

where $n$ is the sample number, and $x(n)$ is the sample value

If the power PWR is lower than a preselected threshold, then the present voice frame is flagged as containing silence. The 128-sample silent frame is still processed by the voice compression algorithm; however, the silent frame packets are discarded by the data processor 318 so that asynchronous digital data may be transferred in lieu of voice data. The rest of the voice compression is operated upon in segments where there are four segments per frame amounting to 32 samples of data per segment. It is only the DC removal and silence detection which is accomplished over an entire 20 millisecond frame.

The pre-emphasis 1207 of the voice compression algorithm shown in FIG. 12A is the next step. The sub-blocks are first passed through a pre-emphasis stage which whitens the spectral content of the speech signal by balancing the extra energy in the low band with the reduced energy in the high band. The pre-emphasis essentially flattens the signal by reducing the dynamic range of the signal. By using pre-emphasis to flatten the dynamic range of the signal, less of a signal range is required for compression making the compression algorithm operate more efficiently. The formula for the pre-emphasis is $$x(n)=x(n)-\rho*x(n-1)$$

where $\rho=0.5$
and where n is the sample number,
x (n) is the sample
Each segment thus amounts to five milliseconds of voice which is equal to 32 samples. Pre-emphasis then is done on each segment. The selection of $\rho$ is based on empirical observation to provide the best result.

The next step is the long-term prediction (LTP). The long-term prediction is a method to detect the innovation in the voice signal. Since the voice signal contains many redundant voice segments, we can detect these redundancies and only send information about the changes in the signal from one segment to the next. This is accomplished by comparing the speech samples of the current segment on a sample by sample basis to the reconstructed speech samples from the previous segments to obtain the innovation information and an indicator of the error in the prediction.

The long-term predictor gives the pitch and the LTP-Gain of the sub-block which are encoded in the transmitted bit stream. In order to predict the pitch in the current segment, we need at least 3 past sub-blocks of reconstructed speech. This gives a pitch value in the range of MIN_PITCH (32) to MAX_PITCH (95). This value is coded with 6-bits. But, in order to accommodate the compressed data rate within a 9600 bps link, the pitch for segments 0 and 3 is encoded with 6 bits, while the pitch for segments 1 and 2 is encoded with 5 bits. When performing the prediction of the Pitch for segments 1 and 2, the correlation lag is adjusted around the predicted pitch value of the previous segment. This gives us a good chance of predicting the correct pitch for the current segment even though the entire range for prediction is not used. The computations for the long-term correlation lag PITCH and associated LTP gain factor $\beta$ j (where j=0, 1, 2, 3 corresponding to each of the four segments of the frame) are done as follows:

For j=min_pitch . . . max_pitch, first perform the following computations between the current speech samples x(n) and the past reconstructed speech samples x'(n)

$$S_{xx'}(j) = \sum_{i=0}^{31} x(i) * x'(i + MAX\_PITCH - j)$$

$$S_{xx'}(j) = \sum_{i=0}^{31} x'(i + MAX\_PITCH - j) * x'(i + MAX\_PITCH - j)$$

The Pitch j is chosen as that which maximizes $S_{xx'}^2/S_{x'x'}$. Since $\beta$j is positive, only j with positive $S_{xx'}^2$ is considered.

Since the Pitch is encoded with different number of bits for each sub-segment, the value of min_pitch and max_pitch (range of the synthesized speech for pitch prediction of the current segment) is computed as follows:

if (seg_number=0 or 3)
{
min_pitch=MIN_PITCH
max_pitch=MAX_PITCH
}
if (seg_number=1 or 2)
{
min_pitch=prev_pitch−15
if (prev_pitch<MIN_PITCH+15)
  min_pitch=MIN_PITCH
if (prev_pitch>MAX_PITCH+15)
  min_pitch=MAX_PITCH−30
max_pitch=min_pitch+30 }
The prev_pitch parameter in the above equation, is the pitch of the previous sub-segment. The pitch j is the encoded in 6 bits or 5 bits as:

encoded bits=j−min_pitch

The LTP-Gain is given by $$\beta = \frac{S_{xx'}(j)}{S_{x'x'}(j)}$$

for $$S_{x'x'}(j) \neq 0$$

The value of the β is a normalized quantity between zero and unity for this segment where β is an indicator of the correlation between the segments. For example, a perfect sine wave would produce a β which would be close to unity since the correlation between the current segments and the previous reconstructed segments should be almost a perfect match so β is one. The LTP gain factor is quantized from a LTP Gain Encode Table. This table is characterized in Table 1. The resulting index (bcode) is transmitted to the far end. At the receiver, the LTP Gain Factor is retrieved from Table 2, as follows:

$$\beta_q = dlb\_tab[bcode]$$

TABLE 1

LTP Gain Encode Table

```
          0.1    0.3    0.5    0.7    0.9
◄——| |——| |——| |——| |——| |——►
bcode = 0    1     2     3     4     5
```

TABLE 2

LTP Gain Decode Table

```
β = 0.0   0.2    0.4    0.5    0.8    1.0
◄——| |——| |——| |——| |——| |——►
bcode = 0    1     2     3     4     5
```

After the Long-Term Prediction, we pass the signal through a pitch filter to whiten the signal so that all the pitch effects are removed. The pitch filter is given by:

$$e(n) = x(n) - \beta_q * x'(n-j)$$

where j is the Lag, and $\beta_q$ is the associated Gain.

Next, the error signal is normalized with respect to the maximum amplitude in the sub-segment for vector-quantization of the error signal. The maximum amplitude in the segment is obtained as follows:

$$G = \text{MAX}\{|e(n)|\}$$

The maximum amplitude (G) is encoded using the Gain Encode Table. This table is characterized in Table 3. The encoded amplitude (gcode) is transmitted to the far end. At the receiver, the maximum amplitude is retrieved from Table 4, as follows:

$$G_q = dlg\_tab[gcode]$$

The error signal e(n) is then normalized by $$e(n) = e(n)/G_q$$

TABLE 3

Gain Encode Table

```
G = 16   32    64   128   256   512  1024  2048  4096  8192
◄——| |——| |——| |——| |——| |——| |——| |——| |——| |——►
    0     1     2     3     4     5     6     7     8     9
(gcode)
```

TABLE 4

Gain Decode Table

```
G = 16   32    64   128   256   512  1024  2048  4096  8192
◄——| |——| |——| |——| |——| |——| |——| |——| |——| |——►
    0     1     2     3     4     5     6     7     8     9
(gcode)
```

From the Gain and LTP Gain Encode tables, we can see that we would require 4 bits for gcode and 3 bits for bcode. This results in total of 7 bits for both parameters. In order to reduce the bandwidth of the compressed bit stream, the gcode and bcode parameters are encoded together in 6 bits, as follows:

$$BGCODE = 6*gcode + bcode$$

The encoded bits for the G and LTP-Gain (β) at the receiver can be obtained as follows:

$$gcode = BGCODE/6$$

$$bCODE = BGCODE - 6*gcode$$

Each segment of 32 samples is divided into 4 vectors of 8 samples each. Each vector is compared to the vectors stored in the CodeBook and the Index of the Code Vector that is closest to the signal vector is selected. The CodeBook consists of 512 entries (512 addresses). The index chosen has the least difference according to the following minimalization formula:

$$Min\left\{\sum_{i=0}^{7}(x_i - y_i)^2\right\}$$

where $x_i$=the input vector of 8 samples, and $y_i$=the code book vector of 8 samples The minimization computation, to find the best match between the subsegment and the code book entries is computationally intensive. A brute force comparison may exceed the available machine cycles if real time processing is to be accomplished. Thus, some shorthand processing approaches are taken to reduce the computations required to find the best fit. The above formula can be computed in a shorthand fashion as follows.

By expanding out the above formula, some of the unnecessary terms may be removed and some fixed terms may be pre-computed:

$$(x_i - y_i)^2 = (x_i - y_i)*(x_i - y_i) = (x_i^2 - x_i y_i - x_i y_i + y_i^2) = (x_i^2 - 2x_i y_i + y_i^2)$$

where $x_i^2$ is a constant so it may be dropped from the formula, and the value of $-\frac{1}{2}\Sigma y_i^2$ may be precomputed and stored as the 9th value in the code book so that the only real-time computation involved is the following formula:

$$Min\left\{\sum_{i=0}^{7}(x_i y_i)\right\}$$

Thus, for a segment of 32 samples, we will transmit 4 CodeBook Indexes (9 bits each) corresponding to 4 subsegments of 8 samples each. This means, for each segment, we have 36 bits to transmit.

After the appropriate index into the code book is chosen, the input speech samples are replaced by the corresponding vectors in the chosen indexes. These values are then multiplied by the $G_q$ to denormalize the synthesized error signal, e'(n). This signal is then passed through the Inverse Pitch Filter to reintroduce the Pitch effects that was taken out by the Pitch filter. The Inverse Pitch Filter is performed as follows:

$$y(n) = e'(n) + \beta_q * x'(n-j)$$

where $\beta_q$ is the decoded LTP-Gain from Table 3, and j is the Lag.

The Inverse Pitch Filter output is used to update the synthesized speech buffer which is used for the analysis of the next sub-segment. The update of the state buffer is as follows:

$$x'(k) = x'(k + MIN\_PITCH)$$

where k=0, . . . , (MAX_PITCH−MIN_PITCH)−1

$$x'(l) = y(n)$$

where l=MAX_PITCH−MIN_PITCH, . . . , MAX_PITCH−1

The signal is then passed through the deemphasis filter since preemphasis was performed at the beginning of the processing. In the analysis, only the preemphasis state is updated so that we properly satisfy the Analysis-by-Synthesis method of performing the compression. In the Synthesis, the output of the deemphasis filter, s'(n), is passed on to the D/A to generate analog speech. The deemphasis filter is implemented as follows:

$$s'(n) = y(n) + \rho * s'(n-1)$$

where ρ=0.5

Figure 13:
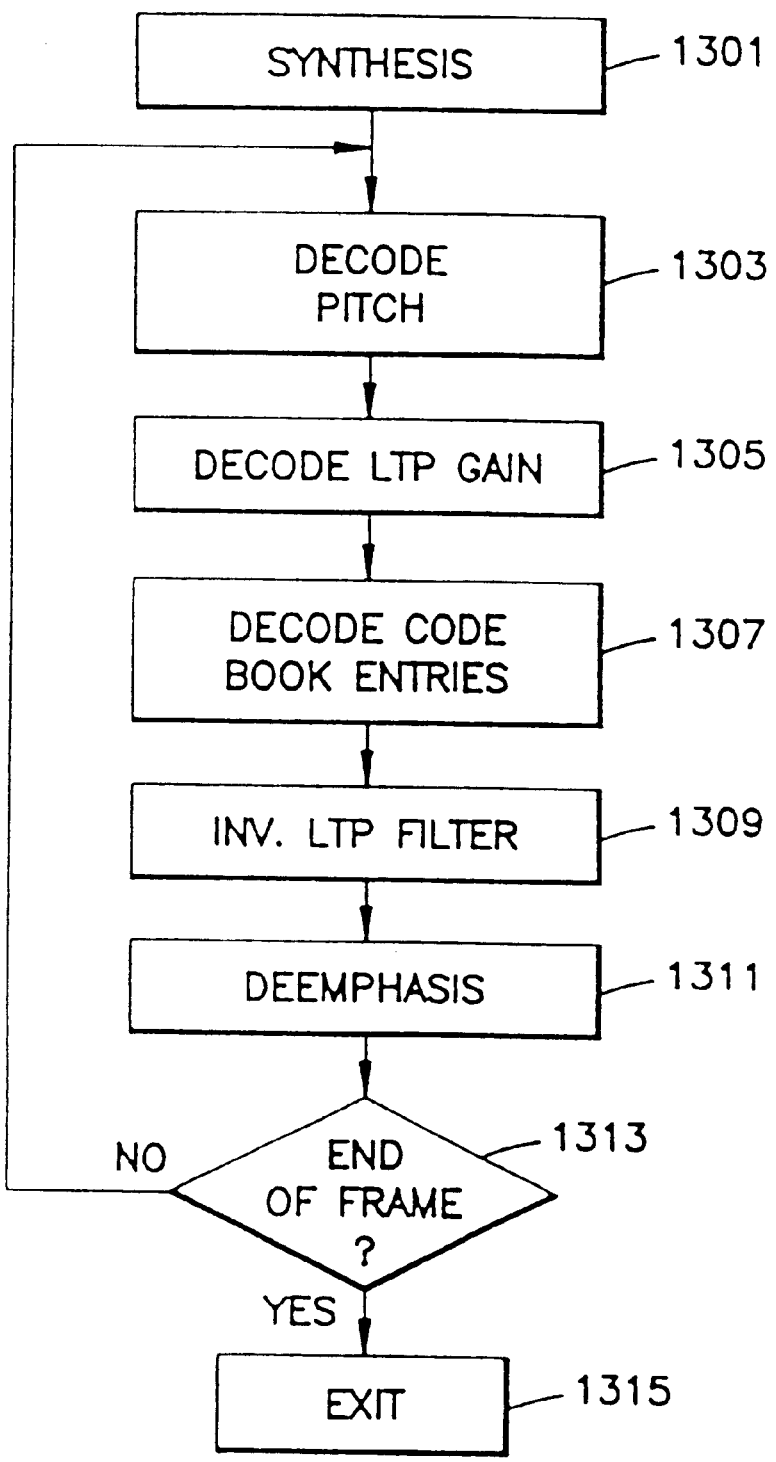
FIG. 13 is a detailed function flow diagram of the speech decompression algorithm.

The voice is reconstructed at the receiving end of the voice-over data link according to the reverse of the compression algorithm as shown as the decompression algorithm in FIG. 13.

If a silence frame is received, the decompression algorithm simply discards the received frame and initialize the output with zeros. If a speech frame is received, the pitch, LTP-Gain and GAIN are decoded as explained above. The error signal is reconstructed from the codebook indexes, which is then denormalized with respect to the GAIN value. This signal is then passed through the Inverse filter to generate the reconstructed signal. The Pitch and the LTP-Gain are the decoded values, same as those used in the Analysis. The filtered signal is passed through the Deemphasis filter whose output is passed on to the D/A to put out analog speech.

The compressed frame contains 23 8-bit words and one 6-bit word. Thus a total of 24 words. Total number of bits transferred is 190, which corresponds to 9500 bps as shown in Table 5.

TABLE 5

| Compressed Frame Packet for 9.6K Algorithm | | | | | | | | |
|---|---|---|---|---|---|---|---|---|
| 7 | 6 | 5 | 4 | 3 | 2 | 1 | 0 | Bit Number |
| S | S | $p_0^5$ | $p_0^4$ | $p_0^3$ | $p_0^2$ | $p_0^1$ | $p_0^0$ | Comp_Frame[0] |
| $V_2^8$ | $V_1^8$ | $V_0^8$ | $p_1^4$ | $p_1^3$ | $p_1^2$ | $p_1^1$ | $p_1^0$ | Comp_Frame[1] |
| $V_5^8$ | $V_4^8$ | $V_3^8$ | $p_2^4$ | $p_2^3$ | $p_2^2$ | $p_2^1$ | $p_2^0$ | Comp_Frame[2] |

TABLE 5-continued

Compressed Frame Packet for 9.6K Algorithm

| 7 | 6 | 5 | 4 | 3 | 2 | 1 | 0 | Bit Number |
|---|---|---|---|---|---|---|---|---|
| $V_7^8$ | $V_6^8$ | $p_3^5$ | $p_3^4$ | $p_3^3$ | $p_3^2$ | $p_3^1$ | $p_3^0$ | Comp_Frame[3] |
| $V_9^8$ | $V_8^8$ | $BG_0^5$ | $BG_0^4$ | $BG_0^3$ | $BG_0^2$ | $BG_0^1$ | $BG_0^0$ | Comp_Frame[4] |
| $V_{11}^8$ | $V_{10}^8$ | $BG_1^5$ | $BG_1^4$ | $BG_1^3$ | $BG_1^2$ | $BG_1^1$ | $BG_1^0$ | Comp_Frame[5] |
| $V_{13}^8$ | $V_{12}^8$ | $BG_2^5$ | $BG_2^4$ | $BG_2^3$ | $BG_2^2$ | $BG_2^1$ | $BG_2^0$ | Comp_Frame[6] |
| $V_{15}^8$ | $V_{14}^8$ | $BG_3^5$ | $BG_3^4$ | $BG_3^3$ | $BG_3^2$ | $BG_3^1$ | $BG_3^0$ | Comp_Frame[7] |
| $VQ_0^7$ | $VQ_0^6$ | $VQ_0^5$ | $VQ_0^4$ | $VQ_0^3$ | $VQ_0^2$ | $VQ_0^1$ | $VQ_0^0$ | Comp_Frame[8] = LS 8 bits VQ[0] |
| $VQ_1^7$ | $VQ_1^6$ | $VQ_1^5$ | $VQ_1^4$ | $VQ_1^3$ | $VQ_1^2$ | $VQ_1^1$ | $VQ_1^0$ | Comp_Frame[9] = LS 8 bits VQ[1] |
| $VQ_{14}^7$ | $VQ_{14}^6$ | $VQ_{14}^5$ | $VQ_{14}^4$ | $VQ_{14}^3$ | $VQ_{14}^2$ | $VQ_{14}^1$ | $VQ_{14}^0$ | Comp_Frame[22] LS 8 bits VQ[14] |
| $VQ_{15}^7$ | $VQ_{15}^6$ | $VQ_{15}^5$ | $VQ_{15}^4$ | $VQ_{15}^3$ | $VQ_{15}^2$ | $VQ_{15}^1$ | $VQ_{15}^0$ | Comp_Frame[23] LS 8 bits VQ[15] | where BG = Beta/Gain, P = Pitch, VQ = CodeBook Index and S = Spare Bits

Code Book Descriptions

The code books used for the VQ algorithm described above are attached as microfiche Appendices A, B and C. Appendix A includes the code book data for the 8K algorithm, Appendix B includes the code book data for the 9.6K algorithm and Appendix C includes the code book data for the 16K algorithm. Table 6 describes the format of the code book for the 9.6K algorithm. The code book values in the appendices are stored in a signed floating point format which is converted to a Q22 value fixed point digital format when stored in the lookup tables of the present invention. There are 256 entries in each code book corresponding to 256 different speech segments which can be used to encode and reconstruct the speech.

TABLE 6

Code Book Format for the 9.6K Algorithm

| ------------- Code Book Entries ------------ | ---- ½ Sum² Constant ---- |
|---|---|
| 8 entries | 1 entry |

For the 9.6K algorithm, the code book comprises a table of nine columns and 256 rows of floating point data. The first 8 rows correspond to the 8 samples of speech and the ninth entry is the precomputed constant described above as $-\frac{1}{2}\Sigma y_i^2$. An example of the code book data is shown in Table 7 with the complete code book for the 9.6K algorithm described in Appendix B.

TABLE 7

Code Book Example for the 9.6 K Algorithm

| 0.786438 | 1.132875 | 1.208375 | 1.206750 | 1.114250 | 0.937688 | 0.772062 | 0.583250 | 3.93769 |
| 0.609667 | 1.019167 | 0.909167 | 0.957750 | 0.999833 | 0.854333 | 1.005667 | 0.911250 | 3.36278 |
| 0.614750 | 1.150750 | 1.477750 | 1.548750 | 1.434750 | 1.304250 | 1.349750 | 1.428250 | 6.95291 |
| 0.657000 | 1.132909 | 1.279909 | 1.204727 | 1.335636 | 1.280818 | 1.162000 | 0.958818 | 5.24933 |
| 0.592429 | 0.897571 | 1.101714 | 1.337286 | 1.323571 | 1.349000 | 1.304857 | 1.347143 | 5.6239 |
| 0.325909 | 0.774182 | 1.035727 | 1.263636 | 1.456455 | 1.356273 | 1.076273 | 0.872818 | 4.628 |

The code books are converted into Q22 format and stored in PROM memory accessible by the Voice DSP as a lookup table. The table data is loaded into local DSP memory upon the selection of the appropriate algorithm to increase access speed. The code books comprise a table of data in which each entry is a sequential address from 000 to 511. For the 9.6K algorithm, a 9×512 code book is used. For the 16K algorithm, a 9×512 code book is used and for the 8K algorithm, a 9×512 code book is used. Depending upon which voice compression quality and compression rate is selected, the corresponding code book is used to encode/decode the speech samples.

Generation of the Code Books

The code books are generated statistically by encoding a wide variety of speech patterns. The code books are generated in a learning mode for the above-described algorithm in which each speech segment which the compression algorithm is first exposed to is placed in the code book until 512 entries are recorded. Then the algorithm is continually fed a variety of speech patterns upon which the code book is adjusted. As new speech segments are encountered, the code book is searched to find the best match. If the error between the observed speech segment and the code book values exceed a predetermined threshold, then the closest speech segment in the code book and the new speech segment is averaged and the new average is placed in the code book in place of the closest match. In this learning mode, the code book is continually adjusted to have the lowest difference ratio between observed speech segment values and code book values. The learning mode of operation may take hours or days of exposure to different speech patterns to adjust the code books to the best fit.

The code books may be exposed to a single person's speech which will result in a code book being tailored to that particular persons method of speaking. For a mass market sale of this product, the speech patterns of a wide variety of speakers of both genders are exposed to the code book learning algorithm for the average fit for a given language. For other languages, it is best to expose the algorithm to speech patterns of only one language such as English or Japanese.

Voice or Fax Data Packet

When the DSP circuit 620 completes the compression of one 20 ms portion of voice or fax information, it will send a block of voice or fax data every 20 ms to the dual port RAM 307 where the data processor 318 can retrieve it for transmission. Each voice or fax data packet has three header bytes and 23 bytes of voice or fax data (for 9200 baud voice compression) or 43 bytes of voice data (for 16K baud voice compression) in the dual port RAM. The header bytes indicate the destination address, destination channel, frame ID, byte count, etc. Bits 6 and 7 of the first header byte indicate the packet type. The voice/fax packet is described in Table 5.

Bits 6 and 7 of the first byte of the header contains the packet identifier which identifies the contents of the packet (see Table 5 above). These bits are defined as follows:

00=the following voice packet contains silent sound
01=the following voice/fax packet contains information
10=the following packet contains telephone signalling or control information
11=reserved.

Silence Suppression

If there is a silence period indicated by the DSP 620 in an empty packet sent to the data processor 318 through the dual port RAM 307, the data processor 318 will not send the silence packets to the remote site. Instead, the data processor will send a two-byte packet indicating no voice information to be sent or the data processor will set a bit in one of the acknowledgement, data, or network control packets to alert the receiving side. The detection and suppression of the transmission of the voice packets frees up bandwidth for the transmission of other data. In this fashion, the use of the bandwidth over the composite link is dynamically allocated between voice, fax and data. Since human speech is typically 60% silence (pauses between spoken words and sentences), a highly efficient multiplexing is accomplished.

HDLC Protocol with Advanced Priority Statistical Multiplexing

Figure 14:
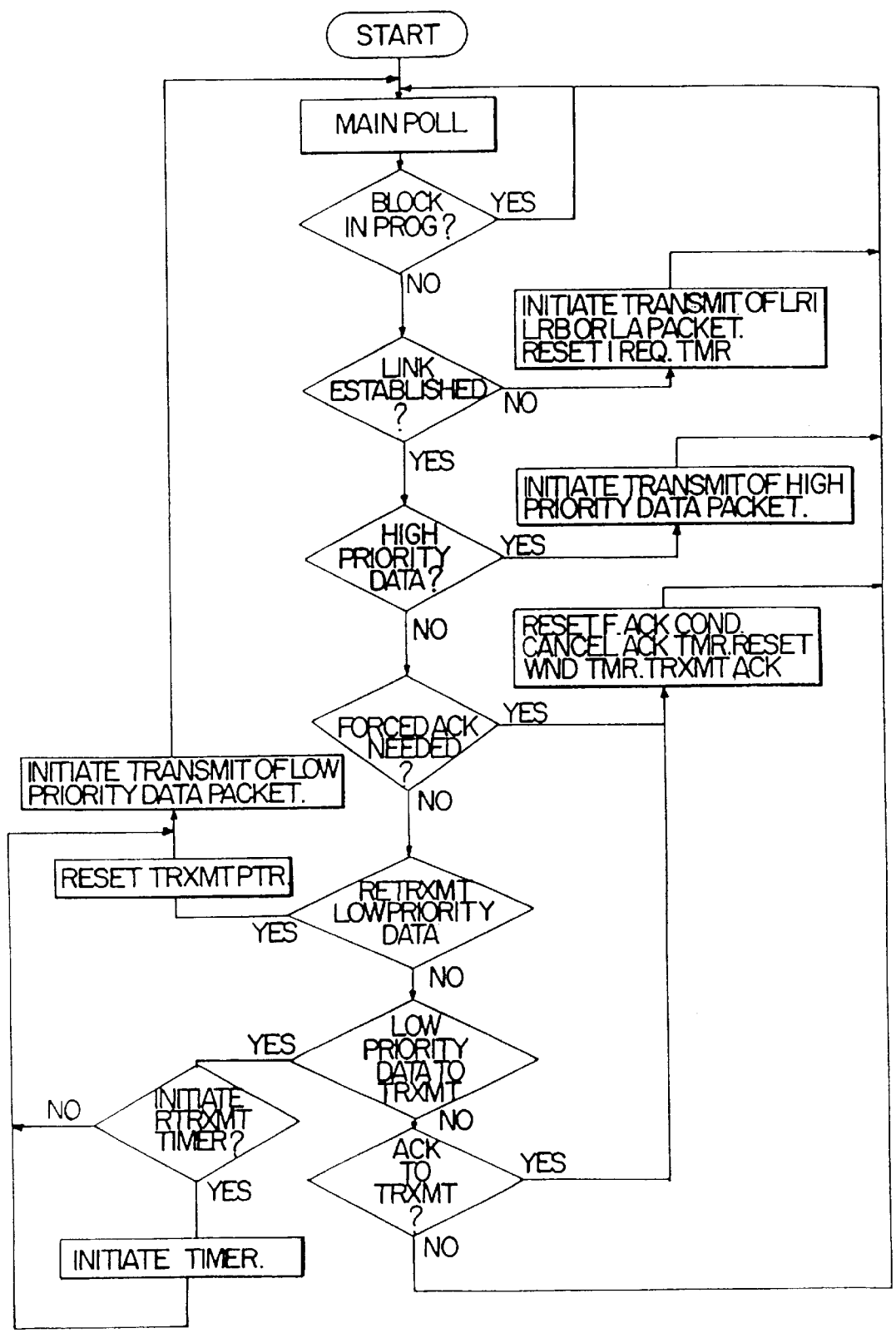
FIG. 14 is a flow chart of the modified HDLC transmission packet protocol using priority statistical multiplexing of the data/voice/fax multiplexor of FIGS. 6A, 6B and 6C.

Referring once again to FIG. 4, the multiplexed data over composite link 313 between the synchronous multiplexors 300 uses advanced priority statistical multiplexing (APSM) on top of a modified form of high-level synchronous data link control (HDLC) to transmit and receive the data packets. In general, this protocol follows the CCITT V.32 standard and the like for handshaking and communication. In the initial handshake period in establishing a communications link, a special link protocol is used. This protocol is described in the flow chart of FIG. 14.

Link Protocol

Figure 15:
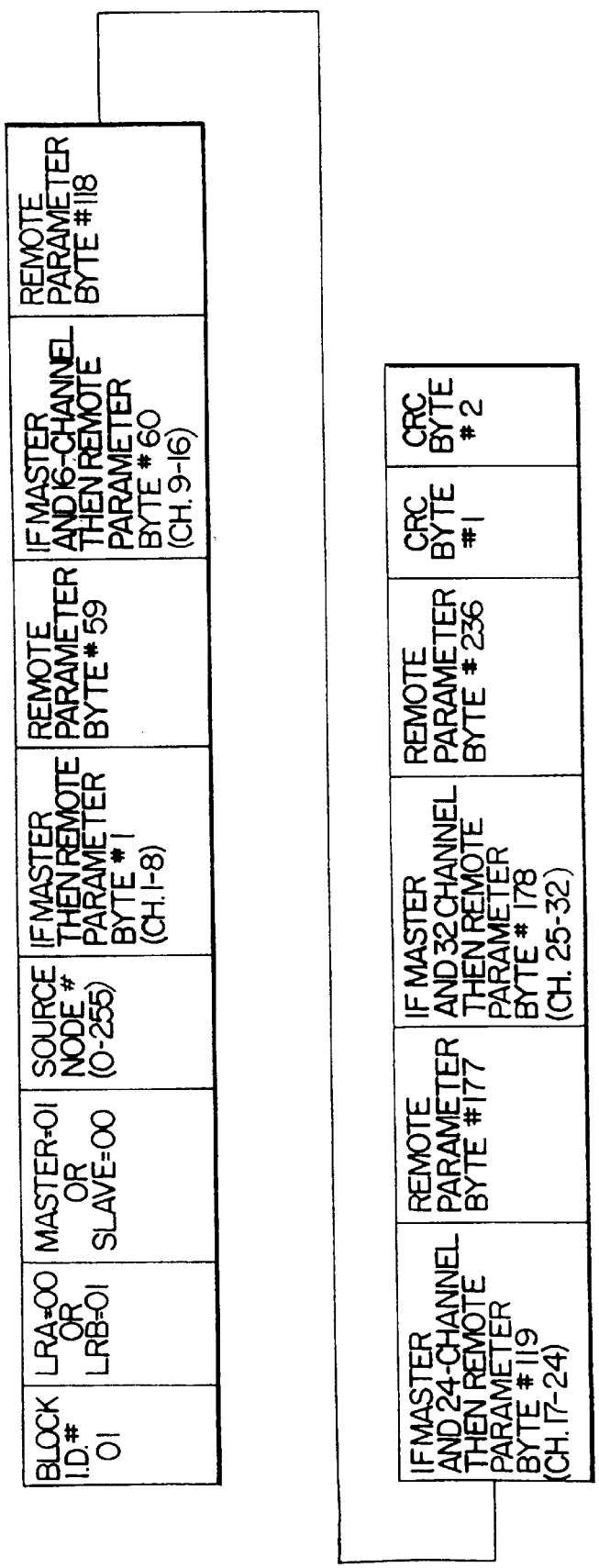
FIG. 15 shows a Link Request Frame used to initiate and establish a connection between multiplexers using modified HDLC with Advanced Priority Statistical Multiplexing.

Both multiplexors 300 and the associated composite link (either analog or digital) transmit and receive a link request A or link request B, and a link acknowledgement as shown in FIG. 15. Data cannot be transferred until the link has been established. Link Request A (LRA) is transmitted by the initiating modem to the remote and receiving modem to initiate a link process. This link request is retransmitted every three seconds until link request B is received.

The called, or receiving, modem transmits Link Request B (LRB) to the transmitting multiplexor after LRA is received. LRB is transmitted every three seconds until link acknowledgement is received. Link Acknowledgement (LA) is transmitted to remote multiplexors only after LRA is sent and LRB is received, and LRA is received and LRB is sent, by the transmitting and receiving modems, respectively.

Acknowledgements

Figure 19:
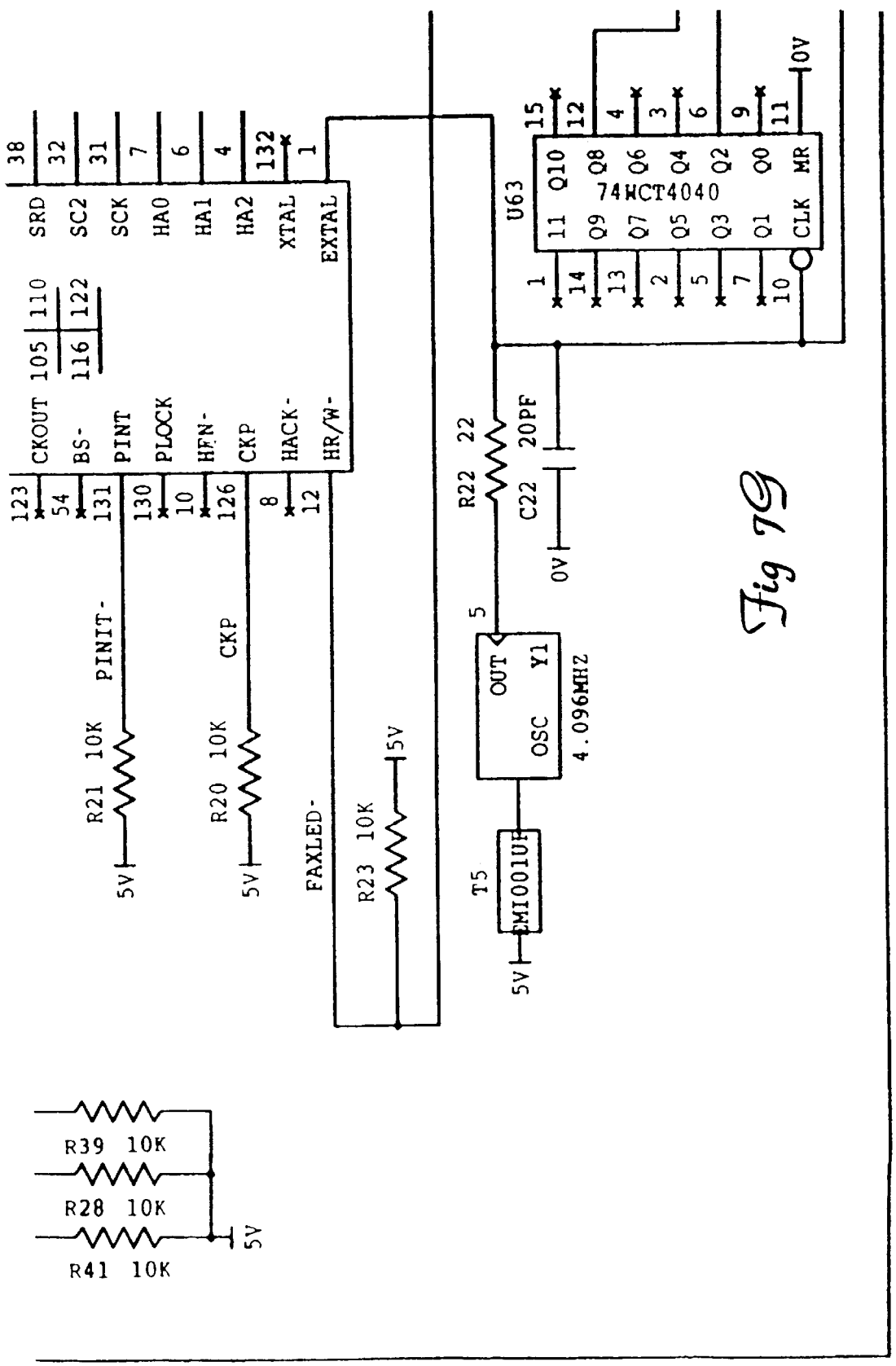
FIG. 19 shows an Acknowledgement Frame used to acknowledge communications between multiplexers.
Figure 7D:
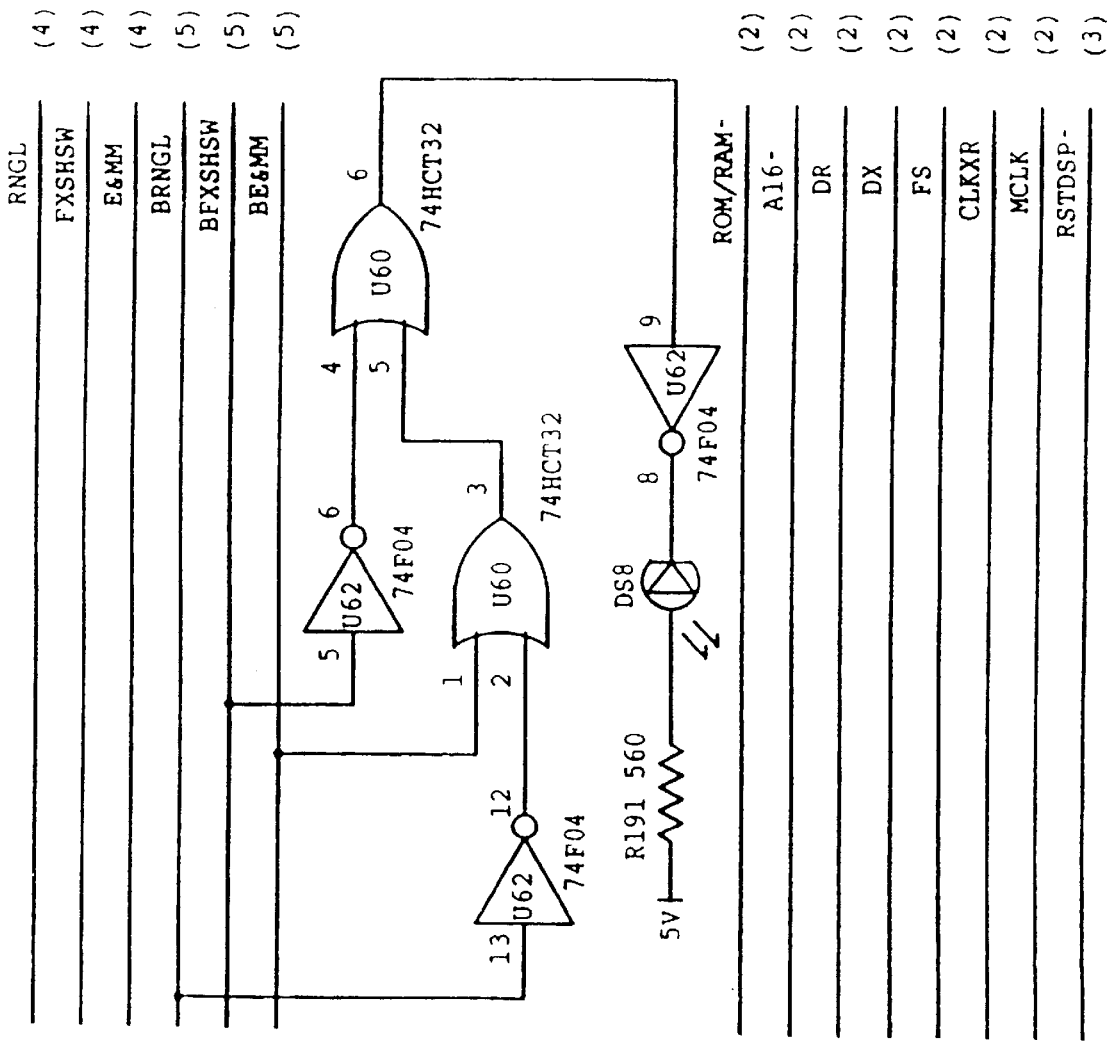

Acknowledgement blocks are used to acknowledge valid (uncorrupted) data blocks that were received as well as to relay control information to the remote multiplexer. An acknowledgement is always transmitted with the sequence number of the last received data block as shown in FIG. 19. Forced acknowledgements are acknowledgements which must be transmitted immediately. If one of the following conditions exist, a forced acknowledgement is required:

1.) Control information needs to be sent to the remote multiplexer.
   For example, a receive buffer of a local channel is full.
2.) Four data blocks have been received without an acknowledgement.
3.) Two consecutive out-of-sequence data blocks are received.
4.) A window flow time expires (see below).

Unforced acknowledgements are transmitted only after all of the following conditions are checked:

1.) A forced acknowledgement condition doesn't exist.
2.) A retransmissions of a data block is not necessary.
3.) There are no new data blocks to send.
4.) One or more data blocks have been received without an acknowledgement being transmitted.

The frame in FIG. 19 is used to acknowledge asynchronous channel data frames, transmit control information and provide synchronization between multiplexers. Block ID with bit 7 set indicates a forced acknowledgement condition due to the receive buffers being full or a change in EIA signals. Block IDs with bits 5 and/or 6 set indicates silence for the respective voice channel. Bit 6 set indicates silence for voice channel 2 and bit 6 being set indicates voice channel 1 is silent. Sequence numbers are N0–N8 where N represents the buffer number of the acknowledged asynchronous data frame.

Data Transfer

A voice/fax data frame is shown in FIG. 16 and an asynchronous channel data frame is shown in FIG. 18. Transfer of data takes place under the following conditions:

A.) A retransmission of data blocks is needed if one or two events occur:
   1.) Duplicate acknowledgements (consecutive acknowledgements with the same sequence number) are received while outstanding data blocks still exist.
   2.) The retransmission timer expires.

Retransmission of a data block should start with the first unforced acknowledgement. Data blocks follow in sequential order.

B.) New data blocks are transmitted only if data exists in the transmit buffer and all of the following conditions are met:
   1.) Forced acknowledgement condition doesn't exist.
   2.) Retransmission of data is not necessary.
   3.) The source channel doesn't have more than four outstanding unacknowledged conditions.
   4.) The total number of outstanding data blocks doesn't exceed seven.

The frame in FIG. 16 is a Voice/Fax/Data Frame. This frame transmits voice/fax channel data. The frame in FIG.

18 is an asynchronous channel data frame and is used to transmit asynchronous channel dta. A byte count of zero (0) represents a break condition and requires the respective destination channel to transmit a break. Block IDs with bits 5 and/or 6 set indicates silence for the respective voice channel. Bit 5 being set indicates a silent packet for voice channel 2 and bit 6 being set indicates a silent packet for voice channel 1.

Timers

The following timers are used for the present modified HDLC:

1.) A link request timer is a three second timer which is initiated on a reset of the multiplexer 300 or if the Link Request A (described above) is received. This timer is cancelled once the link has been established. This timer is reset each time LRA (Link Request A), LRB (Link Request B) or LA (Link Acknowledgement) is transmitted.

2.) A window flow timer is a three second timer which is initiated after the link has been established. This timer is reset only when an acknowledgement (forced or unforced) is transmitted. If this timer expired, a forced acknowledgement is required.

3.) An acknowledgement timer is a two second timer which is initiated when a valid data block is received. This timer is cancelled when an acknowledgement is transmitted. This timer is never reset but it is either initiated or cancelled. If this timer expires, a forced acknowledgement is required.

4.) A retransmit timer is a four second timer which is initiated at the time a data block is transmitted. This timer is reset when a positive acknowledgement (an acknowledgement for any outstanding data blocks) is received or when a duplicate acknowledgement is received while an outstanding exists. The latter is a retransmission condition. This timer is cancelled when all outstanding data blocks have been acknowledged. This timer should only be initiated if this timer has been cancelled and a data block is to be transmitted. If this timer expires, retransmission of all blocks is required starting with the first unacknowledged block.

Miscellaneous

Receive Status Bytes are bytes which are included in the acknowledgement frame. The number of Receive Status Bytes is a minimum of one byte (for an eight channel multiplexer) and a maximum of four (for a thirty-two channel multiplexer) in the preferred embodiment. One bit is assigned per channel whereby each bit represents the status of the corresponding channel receive buffer (ie.: bit zero of Receive Status Byte number one corresponds to channel 1 and bit five of Receive Status Byte number four corresponds to channel 30). Each bit being set indicates that the corresponding channel receive buffer is full. In such a condition, the remote multiplexer will hold any data blocks that are intended for that channel. If the bit is clear, then the corresponding receive buffer is clear for receiving data. Any change in status of any of these bits causes a forced acknowledgement to be sent.

Remote Parameter Bytes are byte used to configure the remote slave unit (multiplexer) 300 and are included in the LRA (Link Request A) and LRB (Link Request B) frames only if the local multiplexer 300 is configured as a master unit. The configuration of a master or slave is by selection of switches on the multiplexer 300. There are 59 bytes per eight channels with a minimum of 59 bytes (for eight channels) and a maximum of 236 bytes (for a 32 channel multiplexer).

The present invention will emulate the Hewlett-Packard ENQ/ACK flow control. If the ENQ is received by a channel port, it is passed through to the remote site and an ACK (acknowledgement) is immediately transmitted by the local channel to the HP device. If the remote channel detects ENQ in its data stream to the HP (Hewlett-Packard) device, it will transmit the ENQ and wait for a ACK (acknowledgement) to be received before transmitting any more data. Once the ACK is received, transmission is continued and the ACK is discarded.

Network Control

The multiplexor 300 may be a part of a series or chain of identical multiplexers 300 connected to pass data, voice and fax information along the chain. Thus, aggregate card 400 of FIG. 6B shows two composite links 610a and 610b which may be connected to "upstream" and "downstream" multiplexers 300. The aggregate card 400 contains pass-through buffers which simply pass along packets to the other multiplexers if those packets are not addressed to the local site.

The network control frame shown in FIG. 17 is used for network congestion control. If the pass-through buffers of the local multiplexer become full, the local multiplexer must tell the upstream multiplexers that are sending packets to stop until the downstream multiplexers have emptied the local pass-through buffers. The network control frame of FIG. 17 is sent upstream to all multiplexers until it is received by the multiplexer on the end of the chain. The packet of FIG. 17 is then returned downstream as a form of acknowledgment that all multiplexers upstream have ceased sending packets.

The frame in FIG. 17 is a network control frame. This frame is initiated when the respective pass through buffer (Link A>Buffer 9, Line B>Buffer 4) of a multiplexer has changed status (Empty <>Full). This frame is only used in a networking environment. The initiating mux generates the first four bytes (Block ID, Buffer Full/Empty, Byte Count and Source Node Number). All intermediate muxes in the network receive this control frame. They set/reset flags to stop/resume transmission of the nodes in the network that utilize the pass-through buffer of the initiating node. After setting the appropriate flags, the intermediate muxes append their source node number to the frame, increment the byte count and pass the frame out the other composite link port. The end node receives the control frame, sets/resets its flags, appends its source node number, increments the byte count, and transmits the control frame out the same composite link port. The control frame is terminated after the originating mux receives the frame with all source node numbers of the adjacent muxes appended to the original frame. The initiating mux generates this control frame every five (5) seconds until it receives the original control frame.

Advanced Priority Statistical Multiplexing

In one embodiment of the present invention, an advanced priority statistical multiplexing scheme is incorporated to maximize data throughput on any particular communication channel while preserving quality and reliability of high priority data and maintaining the efficiency of statistical multiplexing.

A proprietary advanced priority statistical multiplexing (APSM) paradigm is implemented in conjunction with the above-described modified HDLC protocol to allow high-priority (time sensitive) data such as voice, fax, LAN (local area network), synchronous, and video to be multiplexed with low priority data (such as asynchronous data) over a composite link. The fundamental difference between the two groups of data is the absence of the modified HDLC protocol overhead with high priority data. This absence of the modified HDLC protocol overhead is due to the time-sensitive nature of the high priority data which requires that the high priority data be transmitted and received with a minimal amount of delay. The time sensitive condition removes any type of error correction or detection scheme, any type of retransmissions or any type of acknowledgements that are associated with the modified HDLC protocol employed with high priority data.

This advanced priority statistical multiplexing uses variable-length packets and statistical multiplexing of low priority data for transmission efficiency and quality. Advanced priority statistical multiplexing also assures predictable and minimal delay of higher priority packets by interrupting low priority data transmission when higher priority data is ready for transmission.

Overview of High Priority and Low Priority Data

In general, packetized data may be categorized as high priority or low priority. Data which is designated as high priority data is time-critical data. Time-critical data is any data which must be transferred in a given time period due to the nature of the information transferred. Some examples of time-critical (high priority) data are voice and video data. An example of low priority data is asynchronous digital data, such as a binary file. Transmission and reception of voice data must occur regularly to ensure that the voice information is not delayed or garbled, however, binary files can be transferred in bursts and accumulated at the receiver over an extended period of time. Therefore the transmission of high priority data takes precedence over low priority data in order to meet the time critically of the high priority data. If the communication channel has bandwidth in excess of that needed to transmit the maximum number of high priority data bytes, then there is bandwidth available for the transmission of low priority data. By multiplexing the low priority data within the transmissions of high priority data, the total bandwidth of the composite link can be exploited, resulting in greater throughput and efficiency of data transferred over the composite link.

An Advanced Priority Statistical Multiplexing System

Figure 20A:
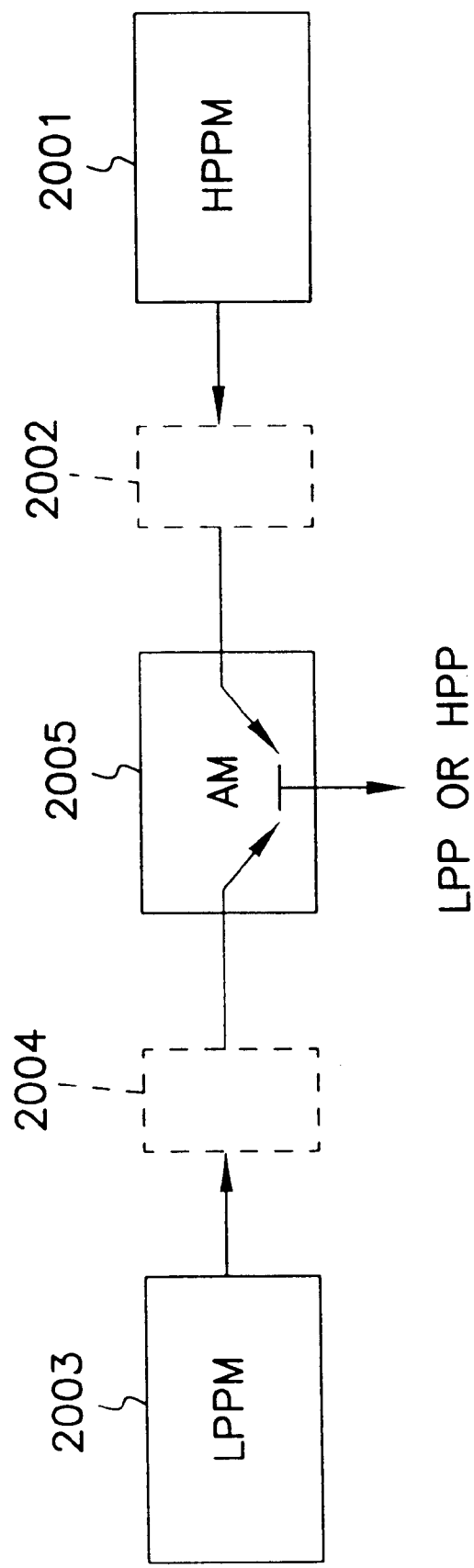
FIG. 20A shows one embodiment of a two priority level multiplexer.

FIG. 20A is a block diagram of one embodiment of the present invention. High priority data is transmitted, received, packetized and unpacketized by high priority packet module (HPPM) 2001. High priority packet module 2001 can be any transceiver of high priority data, such as voice/fax board 402, shown in FIG. 6C. High priority packet module 2001 may perform other functions as well, such as compression and decompression of high priority data. Low priority data is transmitted, received, packetized and unpacketized by low priority packet module (LPPM) 2003. Low priority packet module 2003 is any generator of low priority data, such as channel board 401, shown in FIG. 6A. Those skilled in the art will readily recognize that several other generators of high priority and low priority data are possible without departing from the scope and spirit of this embodiment of the present invention, and these examples are not offered in a limiting or exhaustive sense.

High priority packet module 2001 communicates with aggregate module (AM) 2005 via common memory 2002, and low priority packet module 2003 communicates with aggregate module 2005 via common memory 2004. Aggregate module 2005 transceives high priority packets (HPPs) and low priority packets (LPPs) from high priority packet module 2001 and low priority packet module 2004, respectively. Aggregate module 2005 contains hardware and firmware to prioritize, multiplex, and demultiplex the high priority packets and low priority packets transceived between high priority packet module 2001 and low priority packet module 2004, respectively. One example of an aggregate module 2005 is aggregate board 400 shown in FIG. 6B.

In one embodiment of the present invention in which voice over data communications are performed, it is important to transmit the voice packets as highest priority to minimize system voice delay. Advanced priority statistical multiplexing can ensure transmission quality and efficiency by multiplexing the voice packets as high priority packets and digital data packets as low priority packets.

Another embodiment of the present invention includes multiple high priority packet modules 2001 which have independent high priority packet times. Such systems must use the shortest high priority packet time in order to preserve the time-criticality of each high priority packet in the system. Additionally, there are other embodiments of the present invention having network topologies which result in high priority packet traffic passing through a node. The advanced priority statistical multiplexing scheme must account for the worst case number of high priority generators in each node to determine both the smallest high priority packet time and the largest number of high priority packets which may be transmitted during that high priority packet time. This information is necessary to ensure that the high priority data is given priority in the time multiplex and that the composite link will have sufficient bandwidth to handle the worst case high priority traffic.

Those skilled in the art will readily recognize that other combinations of modules are possible without departing from the scope and spirit of this embodiment of the present invention. For example, this embodiment of the present invention is not affected if the common memories 2002 and 2004 resided in the same storage device or separate storage devices. Another example is the data stored in common memories 2002 and 2004 could be saved in a packetized format or in a raw binary format. Other variations are possible as well without departing from the scope and spirit of the present invention.

High priority packets typically do not require error detection or retransmission, however low priority packet data typically must be transceived error free, so error detection and retransmission is incorporated into low priority packet transmissions. Aggregate module 2005 contains software and hardware to perform the necessary error detection and retransmission functions. It also constructs a new voice and data frame (a hybrid frame) according to a new protocol which is discussed below.

Advanced Priority Statistical Multiplexing Bandwidth Allocation Overview

In the present system, if the bandwidth of the sampled high priority data is much lower than the bandwidth of the composite link over which it is communicated, then the high priority data appears as packetized bursts over the composite link. As the bandwidth of the high priority data approaches the bandwidth of the composite link, the high priority data appears as a continuous transmission of data, with few spaces interspersed. As long as the bandwidth of the composite link exceeds the bandwidth of the high priority data there is room for multiplexed transmission of low priority data.

However, the multiplexing problem is complicated by the fact that high priority data packets may be generated in different combinations, resulting in varying burst lengths. Two approaches to multiplexing such data are: (1) reserving an interval in the time multiplex for the maximum number of high priority data bytes which potentially could be sent by the system and transmitting low priority bytes around this 'reserved space' in the time multiplex; and (2) by transmitting high priority data bytes whenever they are generated and instantaneously packing low priority data bytes around the high priority data bytes.

Method (1) is adequate if the statistical variation in high priority packet length is relatively small when compared to the average packet length, however, if large fluctuations in high priority packet length are observed, then method (1) results in a substantial loss of unused bandwidth which could be exploited for transmission of low priority data. Method (2) can utilize the entire bandwidth of the composite link, but is much more processor intensive than method (1) due to constant monitoring for gaps in high priority data.

One embodiment of the present invention multiplexes low priority packetized data by periodically interrupting the low priority packet datastream to transmit high priority packet data. The interrupt period is based on the highest possible bandwidth of high priority packet data, and low priority packet data is sent in increments based on the interrupt period when high priority packet data is not being sent. The multiplex ensures that the maximum possible high priority packet data will always be sent with only periodic interruptions of the low priority packet data. Gaps in high priority packet transmissions are filled to efficiently use the entire bandwidth of the channel to transmit low priority packet data on a lower priority basis. This embodiment of the present invention offers increased throughput over method (1) and reduced processor time over method (2).

Calculation of the Interrupt Period

The resulting data transmissions can be characterized by various indices such as high priority packet time (HPPT) which is a measure of the time high priority packet module 2001 needs to construct a high priority packet. The high priority packet time is commensurate with the sampling rate of the high priority input and is dictated by the nature of the high priority signal, level of compression of that signal, and requisite bandwidth. Each high priority packet is loaded into shared memory 2002 by high priority packet module 2001 for later transmission by aggregate module 2005. Aggregate module 2005 transceives the packets at the same rate as high priority packet module 2001 so each packet will be transferred within one high priority packet time, ensuring that the high priority data is timely. If the high priority packet module 2001 is the voice/fax card 308, then the high priority packet time is dependent on the speech compression algorithm selected. For example, the earlier section entitled "Speech Compression Algorithm" described a 20 ms speech sample time. In this case the high priority packet time would be 20 ms, since voice packets are generated and must be processed every 20 ms. The high priority packet time multiplied by the overall baud transmission rate of the link sets the maximum bandwidth (in bytes) which may be allocated to high priority packet transmission, known as $HPPT_n$. Another index is the interrupt boundary byte count (IBBC), which is the excess overhead of the communications channel assuming the maximum number of high priority packet bytes were continually transmitted. The calculation of the interrupt boundary byte count is described below by the following pseudocode procedures:

1. Determine the high priority packet time (HPPT), which is the amount of time it takes an active high priority packet module 2001 to construct a high priority packet and load it in shared memory 2002 for transmission by the aggregate module 2005.
2. Determine the total number of bytes transmitted by the system in one high priority packet time ($HPPT_n$) where: $HPPT_n$=link baud rate×HPPT.
3. Determine the number of high priority channels in the node and channels passing through.
4. Determine the maximum number of high priority bytes transmitted per channel. In the case of voice over data communications, for instance, it is conceivable that the number of high priority bytes would be multiplied by a factor of j for j voice generators being transmitted by the link (either originating at the link or passing through).
5. Calculate the sum of the maximum number of high priority bytes transmitted over all the channels, $HPPT_{sum}$.
6. Calculate the interrupt boundary byte count, which is equal to $HPPT_n - HPPT_{sum}$.

A transmission period is defined as the amount of time it takes to transfer one byte of information. For instance, if the bytes in the system are eight (8) bits long and the baud rate is 9,600 baud, then a transmission period is equal to 8/9,600 of a second or approximately 833 microseconds. The multiplexing algorithm creates and updates an interrupt counter (IC) which polls shared memory 2002 every IBBC transmission periods after the last high priority packet byte is transmitted. The IC must increment on each transmission period whether data is being transmitted or not, since the interrupt boundary byte count interrupt must occur regularly in time, even if there is no low priority packet data to transmit. This ensures that at least every IBBC transmission periods the shared memory 2002 associated with pending high priority packet data is polled, and therefore, the high priority packet data is regularly detected and transmitted.

Hybrid Frame Protocol and Multiplexing Algorithm

In this embodiment of the present invention aggregate module 2005 monitors for and detects pending high priority packet and low priority packet data in order to properly multiplex the pending data. Pending high priority data is high priority data stored in common memory 2002 and awaiting transmission via aggregate module 2005. Similarly, pending low priority data is low priority data stored in common memory 2004 and awaiting transmission via aggregate module 2005. If aggregate module 2005 polls the shared memories 2002 and 2004 and determines that the only pending data is high priority packet data, voice or fax data, for example, then aggregate module 2005 transmits a voice frame according to the protocol given in FIG. 16. If aggregate module 2005 has only digital asynchronous data to transfer, then the packet is sent according to the asynchronous channel data frame of FIG. 18. If high priority packet data is pending during the transmission of low priority packet data, this embodiment of the present invention will interrupt the low priority packet data transmission on the IBBCth byte of low priority packet data transfer to insert the high priority packet data with an identifying header byte to denote which type of data follows. This way the interpreter at the receiving end need only scan the first byte of header information on every IBBC+1th word to determine whether the following data is high priority packet or low priority packet data. Therefore, in this embodiment of the present invention, the voice/fax frame of FIG. 16 contains only voice/fax data, however, the asynchronous channel data frame of FIG. 18 is modified to include both low priority packet and high priority packet data, yielding a hybrid frame similar in format to FIG. 18. The hybrid frame length, $F_n$, is limited by considerations such as buffer memory sizes and link speed.

The multiplexing algorithm must check for one potential ambiguity in construction of the hybrid frame. Since identification numbers are used in the hybrid frame to signal a switch in the datastream from high priority packet to low priority packet data, the multiplexing algorithm must check for the case of when a data byte in the IBBCth+1 position in the frame is identical to a voice/fax identification number. The receiver would misinterpret such a byte as an indicator that the datastream switched over to voice data, when in fact, the byte is merely a data byte which matched the identification number only by chance. To correct this condition, when a potential identification problem arises, the current hybrid frame is terminated and a new hybrid frame is transmitted. The misidentification is impossible in the new packet, since the header information clearly defines the following bytes as data. However, every time an identification word is present in the IBBCth byte, this procedure must be performed to prevent the receiver from misinterpreting the resulting frame. The chances of this happening are statistically low, and therefore the correction will occur infrequently. For example, in one embodiment where there are 256 possible identification codes there is a 1/256 chance of a misinterpretation, assuming a random generation of data bytes.

The following algorithm can be used to multiplex the data:

1. Select a hybrid packet length (predetermined based on available buffer memory size and transmission considerations), $F_n$, and
2. Transmit high priority packet and low priority packet data:
   2a. if only high priority packet data is pending, transmit the high priority packet data and complete the transmission of high priority packet data before sending low priority packet data or hybridized low priority packet and high priority packet data (transmission of the high priority data is according to the frame protocol of FIG. 16);
   2b. if low priority packet data is pending,
      transmit header information for the frame,
      transmit X bytes of low priority packet data, wherein X is less than or equal to IBBC (depending on whether the packet length is greater than or equal to IBBC), and
      check for pending high priority packet data;
   2c. if there is high priority packet data, insert it into the datastream with the appropriate identification number for the high priority packet data at the X+1th byte;
   2d. if there is no pending high priority packet data, then check the IBBCth+1 byte to ensure it is not equivalent to an identification byte;
   2e. if this byte is equivalent, then terminate the present frame and send the remaining data via a new frame;
   2f. if the byte is not equivalent, then add IBBC bytes of the low priority packet to the present frame or until the end of frame is reached ($F_n$ bytes in the frame);
   2g. continue multiplexing low priority packet and high priority packet data in the frame until end of frame is reached ($F_n$ bytes in the frame); and
   2h. add error correction bytes to the end of the frame (CRC1 and CRC2).

Using this algorithm, aggregate module 2005 polls for high priority data at the beginning of each transmission of a frame and in IBBC byte intervals measured from the transmission of the last high priority data byte. In one embodiment of the present invention the low priority packet module 2003 transfers packetized data to common memory 2004 upon three conditions: (1) reaching a predetermined maximum low priority packet packet byte count; (2) when a flash timer signals the transfer prior to filling the packet up to the packet byte count; or (3) if a high priority header occurs on the IBBC+1th byte in the hybrid stream. Therefore, X may be less than IBBC, since the low priority packet byte count is less than IBBC bytes in cases (1) and (2).

This algorithm automatically adjusts the dynamic bandwidth of the high priority packets based on the instantaneous volume of high priority packet information transmitted. Similarly, the bandwidth associated with the low priority packets is also automatically adjusted to fill the remaining bandwidth left unused by the high priority packets. Assuming an ample amount of low priority packet information to be transferred, the bandwidth relationship is described by the equation:

No. of high priority packets transceived+No. of low priority packets transceived=$HPPT_n$(per HPPT interval).

This method ensures that the high priority packet information is always current within every high priority packet time interval as long as the interrupt boundary byte count is greater than zero. The extent to which the interrupt boundary byte count exceeds zero is indicative of the available bandwidth for low priority packet data. Therefore, the bandwidths of both the high priority packet and low priority packet data are constantly changing to provide continuous transfer of high priority packet data, and maximum bandwidth for transfer of low priority packet data.

An alternate embodiment of the present invention combines the features of the above embodiment with an additional prioritization scheme for systems with multiple high priority packet modules. For example, if multiple high priority packet modules are transceiving information on the system, then latency for packets passing through the system can be minimized by transmitting the high priority and low priority packets in the following descending order:

1. pass-through high priority packets,
2. local high priority packets,
3. pass-through low priority packets, and
4. local low priority packets.

Using this prioritization the latency for packets passing through is minimized.

Receiver Demultiplexing Algorithm

In one embodiment of the present invention the interrupt boundary byte count can be coded into the header of the frames transmitted from one node to the next. Other embodiments might employ an interrupt boundary byte count negotiation when link communications are initiated, enabling the interrupt boundary byte count to be known by all active nodes in the system prior to the interchange of low priority and high priority packet information.

Assuming the receiving node has the interrupt boundary byte count information, the receiver can demultiplex received packets by the following algorithm:

1. frame length counter is set to $F_n$.
2. if the frame is an asynchronous channel data frame, then the process is as follows:
   2a. reading X bytes of data, wherein X is the lesser of the number of bytes read before the end of packet is reached or IBBC bytes are read (the first time this operation is performed, the data must be low priority packet data to start with);
   2b. checking the IBBCth+1 byte for an identification byte identifying the following data as continuing low priority packet data or high priority packet data;
   2c. subtracting X from the frame length counter;
   2d. if the identification byte indicates a switch between low priority packet and high priority packet data, then storing the following data in the appropriate memory buffer; and
   2e. if the frame length counter is greater than zero, repeating this process.
3. if the frame is a voice/fax frame, then demultiplex the voice information according to the frame shown in FIG. 16.

Demultiplexed high priority packet information may be instantly used by the receiver, since error correction and retransmission is not typically performed on high priority packet data. This allows the high priority (for instance, voice/fax information) received to be used immediately, and potentially prior to complete transmission of the hybrid frame by the transmitter.

Error Correction

In this embodiment of the present invention, transmission of purely high priority data (for example, voice/fax data) employs no error checking mechanisms. Defective high priority frames are discarded or used by the system without significant impact to transmission fidelity. Hybridized frames have error checking incorporated into both the voice and data portions of the frame, however, the receiver requests retransmission of only the corrupt data portions (low priority) of each transmission.

One skilled in the art would readily recognize that other frame protocols could be incorporated without departing from the scope and spirit of the present invention, and that other forms of information, such as video, could be characterized as low priority packet and high priority packet data for the purposes of this invention. Therefore this embodiment of the present invention is not limiting or exclusive. Other error checking and retransmission schemes are also possible without modifying the spirit and scope of the present invention.

Advanced priority statistical multiplexing not only ensures high quality and efficient transmissions, but actually reduces processor overhead in the composite link as the aggregate baud rate of the link increases. As baud rates increase, typically interrupt boundary byte count values also increase, since a larger average number of low priority bytes may be transmitted with the high priority bytes. This results in less interrupts to the multiplexing hardware in aggregate module 2005 as link speed increases, since such interrupts are based on the interrupt boundary byte count. The result is an efficient, high quality throughput of the low priority and high priority data with a statistically minimal amount of processor overhead at both the transmitting and receiving ends, with improved efficiency with increasing baud rate.

Examples of Hybrid Frame Multiplexing Using Advanced Priority Statistical Multiplexing The following examples are provided for demonstrating different embodiments of the present invention and are not exclusive or limiting. Those skilled in the art would readily recognize that the parameters and procedures demonstrated may be modified without departing from the spirit and scope of the present invention.

Figure 20B:
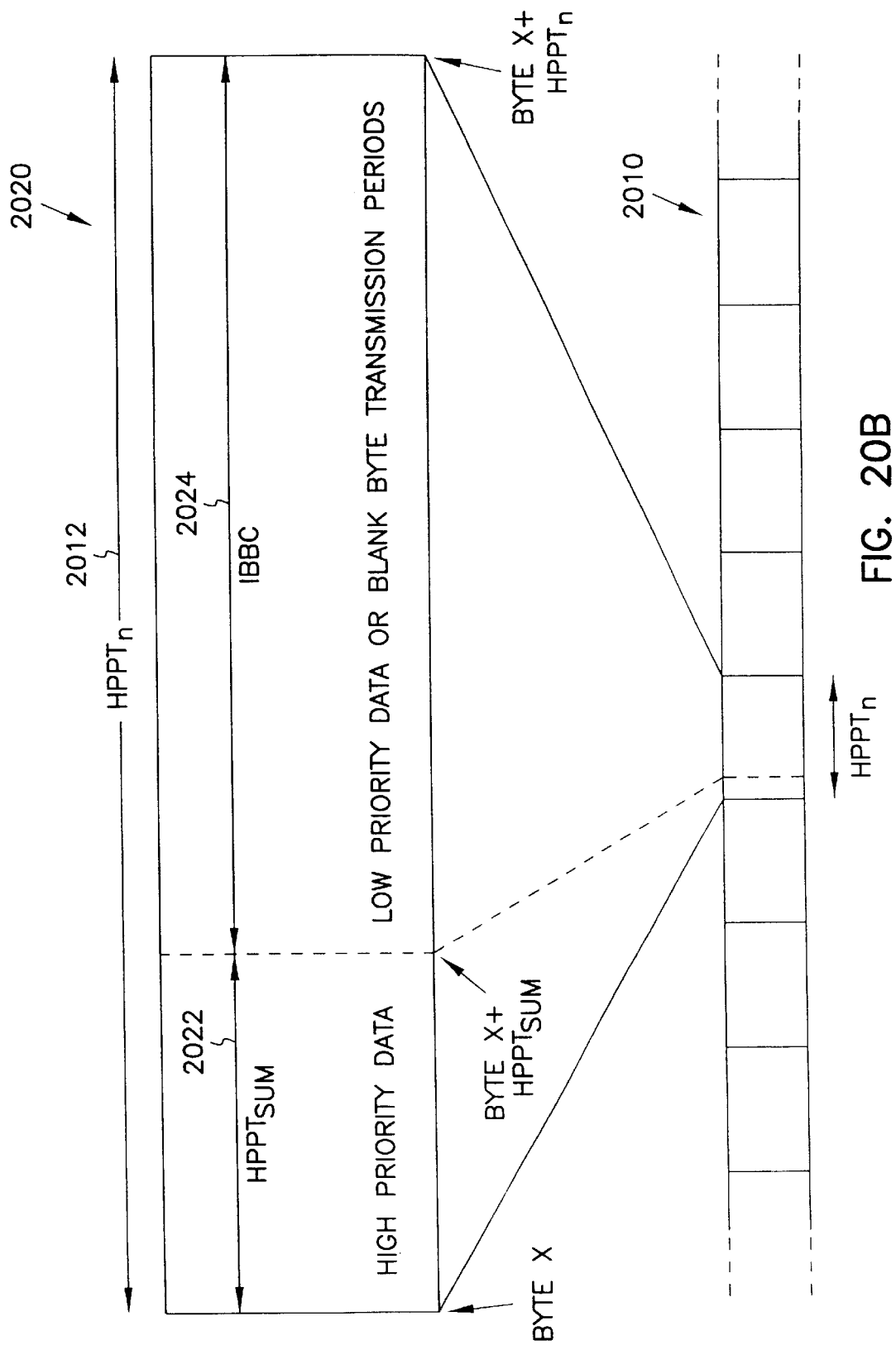
FIG. 20B shows a portion of the multiplexed high priority and low priority data transmitted by one embodiment of a two priority level advanced priority statistical multiplexer.

FIG. 20B shows the output from one embodiment of a two priority level advanced priority statistical multiplexer. Data segment 2020 is an enlargement of one segment of duration equal to one high priority packet time taken from an output data stream 2010. The number of bytes which can be transmitted in one high priority packet time is $HPPT_n$ 2012. In order to graphically illustrate the interrupt boundary byte count, the high priority portion of the segment 2020 demonstrates the maximum number of high priority data bytes which can be transmitted in one high priority packet time, $HPPT_{sum}$ 2022. The difference between $HPPT_n$ 2012 and $HPPT_{sum}$ 2022 is the interrupt boundary byte count 2024. However, in ordinary transmissions the high priority portion of a segment may have anywhere from zero to $HPPT_{sum}$ bytes of high priority data.

Figure 21:
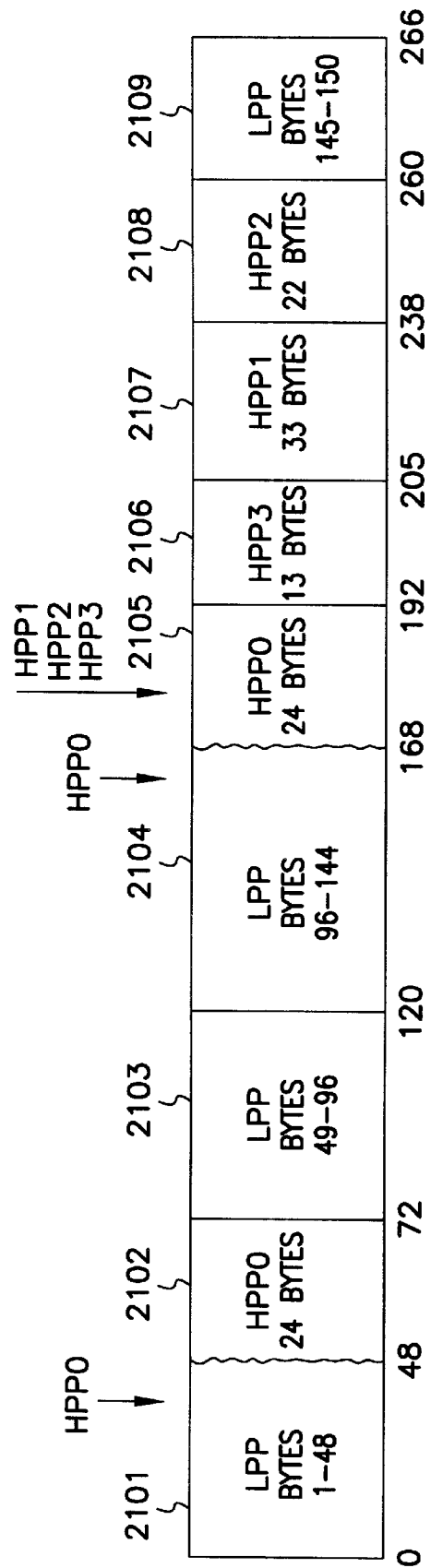
FIG. 21 is an example of multiplexing two priority levels of data in a hybrid frame.

FIG. 21 demonstrates how 150 bytes of low priority packet data ($LPP_x$) could be multiplexed with high priority packet data. The details of one example are given in Table 8 below. In this example, high priority packet time is given as 20 msec and the baud rate is 7 bytes/msec, therefore $HPPT_n$ is 140 bytes. $HPPT_{sum}$ is given as 92 bytes, so the IBBC is 140 minus 92 or 48 bytes. As the first byte of $LPP_x$ is being transmitted 48 bytes (IBBC) of $LPP_x$ are sent in frame segment 2101. During that segment transmission HPP0 becomes available for transmission. Since the shared memory 2002 is polled every IBBC transmission periods after the last high priority packet byte is sent, HPP0 is detected and sent in the next segment, 2102, which is only 24 bytes long. Since there is still low priority packet data to send (recall $LPP_x$ is 150 bytes long) segment 2103 consists of 48 bytes (IBBC) of $LPP_x$ data, however, there is no pending high priority packet data, so another low priority packet frame segment is sent 2104 of 48 (IBBC) bytes. Since HPP0 has become available in segment 2104, it is detected and transmitted at byte 168 as 24 bytes of HPP0 in segment 2105. During the transmission of segment 2105 HPP1, 2, and 3 have become available, so a total of 68 bytes of HPP1, 2, and 3 are sent in segments 2106, 7, and 8, respectively. These packets are followed by the remaining 6 bytes of $LPP_x$ in segment 2109.

TABLE 8

Figure 22:
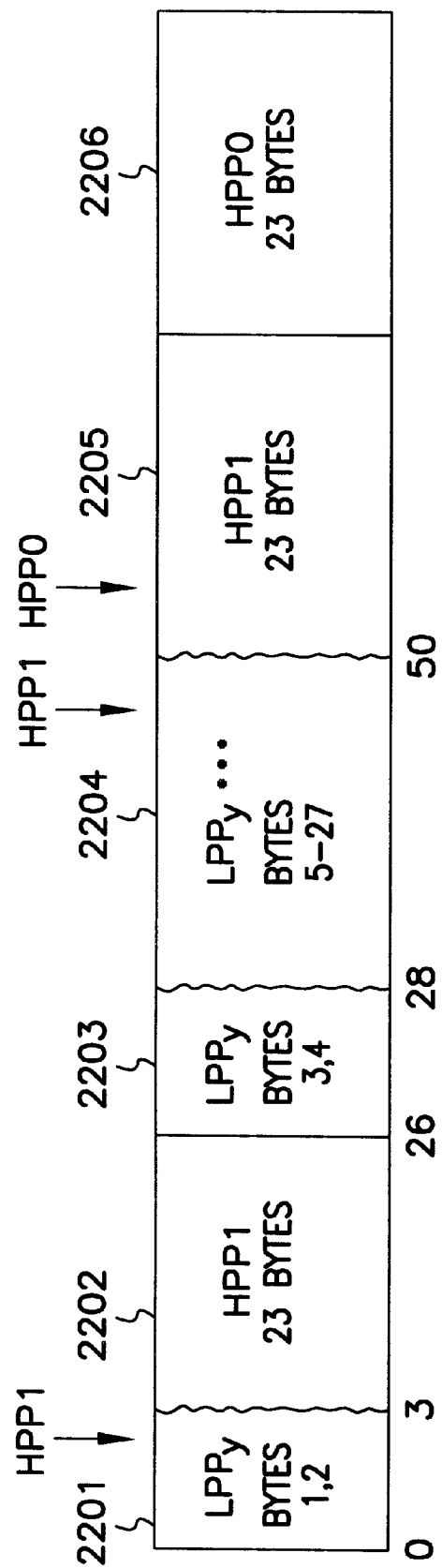
FIG. 22 is another example of multiplexing two priority levels of data in a hybrid frame.

Link Speed = 56,000 bps = 7 Kbytes/sec = 7 bytes/msec
HPPT = 20 msec
No. high priority channels in mode = 2 (HPP0, HPP1)
No. high priority channels passing through = 2 (HPP2, HPP3)
Max. no. of high priority bytes in HPPT = 92 bytes
    HPP0 = 24 bytes   HPP1 = 33 bytes
    HPP2 = 22 bytes   HPP3 = 13 bytes
Max. no of bytes per HPPT = 7 bytes/msec × 20 msec = 140 bytes
IBBC = 140 − 92 = 48 bytes
$LPP_x$ = 150 bytes FIG. 22 demonstrates how $LPP_y$ of 128 bytes is multiplexed with pending high priority packet data. The details of one example are given in Table 9 below. The high priority packet time is given as 20 msec, therefore with a baud rate of 2.4 bytes/msec the $HPPT_n$ is 48 bytes. $HPPT_{sum}$ is given as 46 bytes, so IBBC is 48 minus 46 or 2 bytes. Viewing the data transfer as the first byte of LPP$_y$ is being transmitted, 2 bytes (IBBC) of LPP$_Y$ are sent in segment 2201. Then, since HPP1 has become available during the transmission of this segment, HPP1 is sent in segment 2202, which is only 23 bytes long. Next, 22 bytes of low priority packet data are sent in 11 transmissions of 2 bytes in segment 2204. HPP1 has become available in the 11th transmission, so transmission of LPP$_Y$ is paused to transmit 23 bytes of HPP1 in segment 2205. Meanwhile, HPP0 has become available, so the 23 bytes of HPP0 are sent in segment 2206. The remaining bytes of low priority packet data will be sent in 2 byte increments interspersed between high priority packet bytes in the same fashion as demonstrated.

TABLE 9

Link speed = 19,200 BPS = 2,400 Bytes/sec = 2.4 bytes/msec
HPPT = 20 msec
No. high priority channels in node = 2 (HPP0, HPP1)
No. high priority channels passing through = 0
Max. no. high priority bytes in HPPT = 46 bytes
    HPP0 = 23 bytes   HPP1 = 23 bytes
Max. no. bytes per HPPT = 2.4 bytes/msec × 20 msec = 48 bytes
IBBC = 48 − 46 2 bytes
LPP$_y$ = 128 Bytes

Alternate Embodiments for Transmission of Intermediate Priority Data

Figure 23:
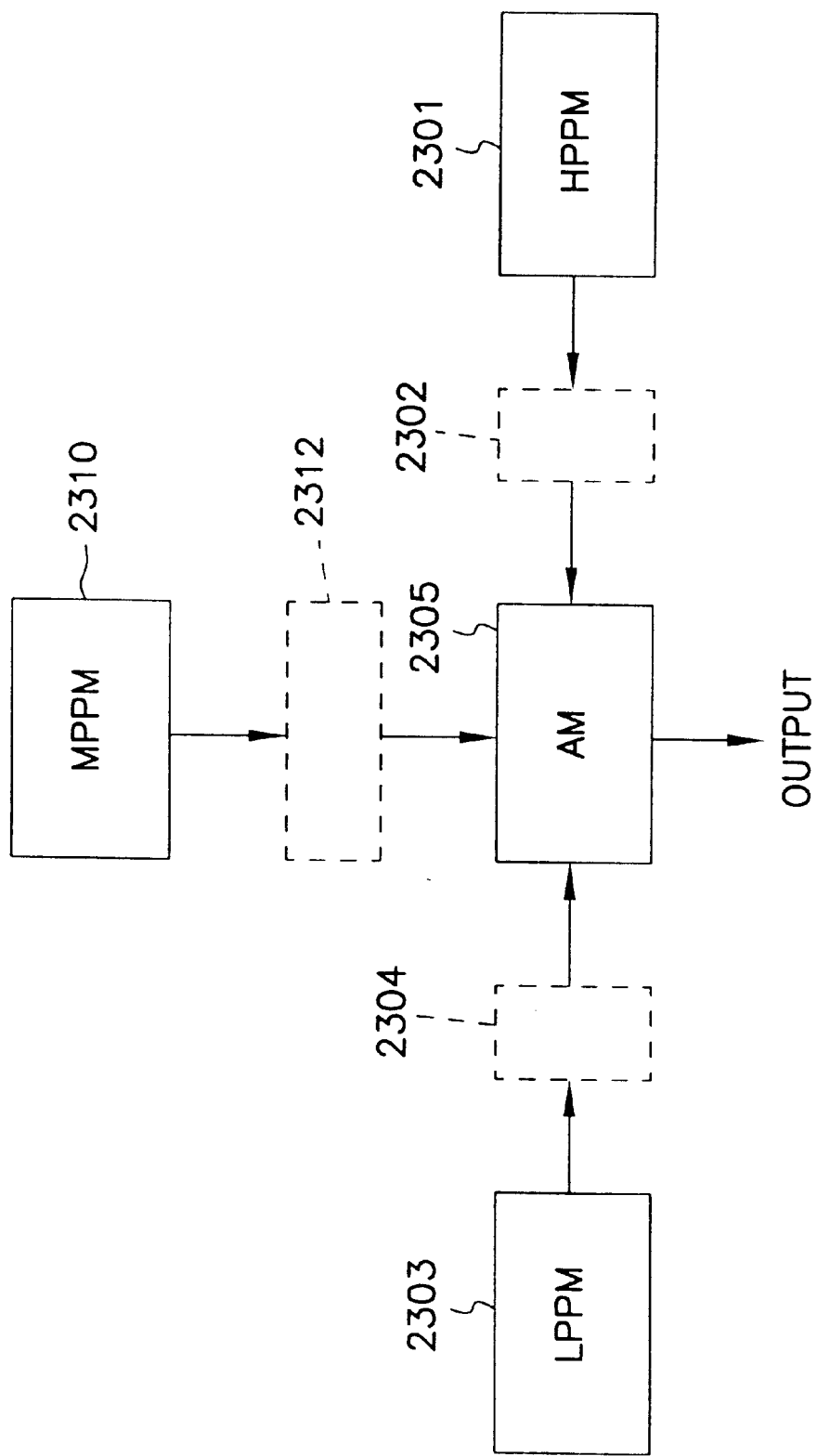
FIG. 23 shows one embodiment of a three priority level multiplexer.

FIG. 23 shows the topology of an alternate embodiment of the present invention incorporating a new data priority level. FIG. 23 is similar to FIG. 20A in that it illustrates a low priority packet module 2303, common memories 2304 and 2302, and high priority packet module 2301, but shows the addition of a medium priority packet module (MPPM) 2310 which communicates with an advanced aggregate module 2305 via common memory 2312. Medium priority packet module 2310 generates medium priority data, which is data with less time-criticality than high priority data but greater time-criticality than the low priority data. An example of medium priority data is synchronous data or LAN data. The medium priority information is multiplexed with the high priority data and the low priority data by assigning primary priority to high priority data, secondary priority to the medium priority data, and third priority to the low priority data.

The addition of medium priority data to the present invention requires that the excess non-high priority bandwidth be shared between the low priority data and the medium priority data, based on system needs and the particularities of the low priority and medium priority data. In one embodiment of the present invention the medium priority data takes absolute precedence over the low priority data transferred. Therefore, after all the high priority data is transferred, all medium priority data is transferred before low priority data can be transferred. In another embodiment of the present invention low priority data and medium priority data can share the non-high priority bandwidths during transmissions, so as to not transfer all medium priority information prior to the transfer of low priority information. This may be accomplished by setting a medium priority maximum bandwidth, which must be selected to satisfy the transmission requirements of the medium priority data, yet still transfer some low priority data. For instance, the system could transfer high priority information as stated in earlier embodiments and then transfer only 100 byte increments of the medium priority data, depending on the interrupt boundary byte count, filling the remaining bandwidth with low priority data.

The aspects taught for the low and high priority data in preceding sections apply directly to intermediate level systems. Calculation of the various transmission indices is for a three level system is identical to that for a two level system, except that the interrupt boundary byte count must be shared between the medium and low priority data. The multiplexing and demultiplexing schemes are similar as well, except new identification bytes must be used to identify intermediate priority packets in the frame. In addition, further checking will be needed to ensure that those new identification bytes are not misinterpreted by the receiver by checking the IBBC+1th byte for both high priority and intermediate priority identification codes.

Other intermediate priority levels are possible and can be arbitrated in a similar fashion. For example, a four level system (two intermediate levels) or five level system (three intermediate levels) is contemplated by different embodiments of the present invention. In addition, time criticality is not the only factor by which data may be segregated, and other factors known to those skilled in the art may be substituted. For example, priority could be assigned to packets according to a priority based on their origination or destination, rather than on a time priority basis. Priority could also be assigned based on the content of the packet information (other than time-criticality).

Several priority hierarchies can be established within the scope and spirit of the present invention and many variations of priority assignment are possible. Therefore, the examples given are for illustrative purposes and are not limiting or exclusive.

Many of the examples given in this description concern the voice over data application of advanced priority statistical multiplexing, however, several other applications exist and the concepts of low, high, and intermediate priority data apply equally well to those applications as well. In specific voice over data embodiments the words "voice data" and "high priority data" were often used interchangeably, as were "asynchronous data" and "low priority data". Those skilled in the art will readily appreciate that the concepts of the present invention which were applied to high priority, intermediate priority, and low priority data are applicable to a variety of transmissions and are not limited to the specific embodiments presented. High priority data could be video as well as voice. Intermediate priority data could be synchronous data or LAN data. Other variations known to those skilled in the art are included as well.

Demodulating of Facsimile Information

The transmission of facsimile information is performed by demodulating the fax transmissions, sending only the facsimile image packets over the multiplexed composite link and remodulating the facsimile signals at the remote site for retransmission over an analog telephone line to a remote facsimile machine. The demodulating and remodulating of the facsimile image packets by the present invention is transparent to the facsimile machines except that certain proprietary facsimile protocols are suppressed by the stripping off the proprietary information from the facsimile header packets. The facsimile tone is demodulated in the digital domain by DSP 620 and the facsimile data is placed in a data packet similar to the voice data packet described above in Table 2 except the header of the packet distinguishes between voice data and facsimile data.

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A method for transmitting information, comprising the steps of:

if there is pending high priority data and pending low priority data to be transferred, then sending a hybrid frame by the steps including:

(1) transmitting the pending high priority data;

(2) transmitting up to K bytes of the pending low priority data, K not to exceed an interrupt boundary byte count, wherein the interrupt boundary byte count is equal to a number of bytes transferable in a high priority packet time minus a maximum number of high priority bytes generated per the high priority packet time, and wherein the high priority packet time is an interval of time between a generation of a plurality of high priority bytes; and (3) transmitting further high priority data and low priority data by the steps including:

(i) if there is high priority data to be transferred, transmitting the high priority data, the high priority data preceded by a high priority data identifier; and (ii) if there is low priority data to be transferred, transmitting up to K bytes of low priority data.

2. The method of claim 1, further comprising the step of:

checking a memory for pending high priority data and pending low priority data to be transferred over a link.

3. The method of claim 1, further comprising the steps of:

if there is pending high priority data and no pending low priority data, then sending a high priority packet; and if there is pending low priority data and no pending high priority data, then sending a low priority packet.

4. The method of claim 1, further comprising the step of transmitting a hybrid frame header.

5. The method of claim 1, further comprising the step of inserting a high priority data identifier preceding the high priority data.

6. The method of claim 1, wherein the step (3) of transmitting further high priority data and low priority data further comprises the step of:

(iii) repeating steps (i) and (ii) until one or more termination conditions occurs, the one or more conditions including (A) transmission of a set number of low priority bytes.

7. The method of claim 1, wherein the step (3) of transmitting further high priority data and low priority data further comprises the step of:

(iii) repeating steps (i) and (ii) until one or more termination conditions occurs, the one or more conditions including (A) transmission of a set number of low priority bytes, (B) detection that a first byte of the K bytes of low priority data matches a high priority data identifier.

8. The method of claim 1, wherein the step (3) of transmitting further high priority data and low priority data further comprises the step of:

(iii) repeating steps (i) and (ii) until one or more termination conditions occurs, the one or more conditions including (A) transmission of a set number of low priority bytes, (B) detection that a first byte of the K bytes of low priority data matches a high priority data identifier, and (C) there is no pending low priority data for a set time interval.

9. The method of claim 1, wherein the high priority data includes voice data.

10. The method of claim 1, wherein the high priority data includes facsimile data.

11. The method of claim 1, wherein the high priority data includes video data.

12. The method of claim 1, wherein the step of (1) of transmitting the high priority data comprises the step of placing a byte count identifier preceding the high priority data.

13. The method of claim 1, further comprising the step of placing a frame identifier prior to any data.

14. The method of claim 1, further comprising the step of placing an error correction code in the hybrid frame.

15. The method of claim 1, wherein the interrupt boundary byte count is calculated by:

determining a maximum number of bytes transferred across a link in one high priority packet time, B, by multiplying the high priority packet time by a bit rate of the link divided by a number of bits per byte;

determining a maximum number of high priority data bytes transmitted over the link in one high priority packet time, M; and subtracting M from B to obtain an interrupt boundary byte count.

16. The method of claim 1, wherein the maximum number of high priority bytes generated per the high priority packet time is calculated by including a maximum number of high priority bytes generated for each channel passing through.

17. A method for transmitting information, comprising the steps of:

(a) checking a memory for pending high priority data and pending low priority data to be transferred over a link;

(b) if there is pending high priority data and no pending low priority data, then sending a high priority packet;

(c) if there is pending low priority data and no pending high priority data, then sending a low priority packet; and (d) if there is pending high priority data and pending low priority data to be transferred, then sending a hybrid frame by the steps including:

(1) transmitting a hybrid frame header;

(2) transmitting the pending high priority data, the pending high priority data preceded by a high priority data identifier;

(3) transmitting up to K bytes of the pending low priority data, K not to exceed an interrupt boundary byte count, wherein the interrupt boundary byte count is equal to a number of bytes transferable in a high priority packet time minus a maximum number of high priority bytes generated per the high priority packet time, and wherein the high priority packet time is an interval of time between a generation of a plurality of high priority bytes; and (4) transmitting further high priority data and low priority data by the steps including:

(i) if there is high priority data to be transferred, transmitting the high priority data, the high priority data preceded by a high priority data identifier;

(ii) if there is low priority data to be transferred, transmitting up to K bytes of low priority data; and (iii) repeating steps (i) and (ii) until one or more conditions occurs, the one or more conditions including (A) transmission of a set number of low priority bytes, (B) detection that a first byte of the K bytes of low priority data matches a high priority data identifier, and (C) there is no pending low priority data for a set time interval.

18. The method of claim 17, wherein the high priority data includes voice data.

19. The method of claim 17, wherein the high priority data includes facsimile data.

20. The method of claim 17, wherein the high priority data includes video data.

21. The method of claim 17, wherein the step of inserting comprises the step of placing a byte count identifier at the beginning of the high priority data.

22. The method of claim 17, further comprising the step of placing a frame identifier prior to any data.

23. The method of claim 17, further comprising the step of placing an error correction code in the hybrid frame.

24. The method of claim 17, wherein the interrupt boundary byte count is calculated by:
determining a maximum number of bytes transferred across a link in one high priority packet time, B, by multiplying the high priority packet time by a bit rate of the link divided by a number of bits per byte;
determining a maximum number of high priority data bytes transmitted over the link in one high priority packet time, M; and
subtracting M from B to obtain an interrupt boundary byte count.

25. A method for receiving information, comprising the steps of:
(1) detecting a hybrid frame;
(2) receiving a next byte in the hybrid frame;
(3) if the next byte is a high priority data identifier, receiving one or more high priority data bytes in the hybrid frame;
(4) if the next byte in the hybrid frame is not a high priority identifier, receiving one or more bytes of low priority data, the number of low priority bytes not to exceed the interrupt boundary byte count, wherein the interrupt boundary byte count is equal to a number of bytes transferable in a high priority packet time minus a maximum number of high priority bytes generated per the high priority packet time, and wherein the high priority packet time is an interval of time between a generation of a plurality of high priority bytes; and
(5) returning to step (2) until a last data byte of the hybrid frame is received.

26. The method of claim 25, wherein step (1) of detecting a hybrid frame comprises the step of decoding a frame identifier.

27. The method of claim 25, wherein the interrupt boundary byte count is received from a remote source.

28. The method of claim 25, wherein the interrupt boundary byte count is calculated, comprising the steps of:
determining a maximum number of bytes transferred across a link in one high priority packet time, B, by multiplying the high priority packet time by a bit rate of the link divided by a number of bits per byte;
determining a maximum number of high priority data bytes transmitted over the link in one high priority packet time, M; and
subtracting M from B to obtain the interrupt boundary byte count.

29. The method of claim 25, further comprising the step of decoding an error correction code to determine whether an error occurred.

30. The method of claim 25, wherein the step (3) of if the next byte is a high priority data identifier, receiving one or more high priority data bytes in the hybrid frame, comprises the step of processing the one or more high priority data bytes.

31. The method of claim 25, wherein the step (4) of if the next byte in the hybrid frame is not a low priority identifier, receiving one or more bytes of low priority data, comprises the step of storing the one or more bytes of low priority data in a memory.

32. A method for receiving information, comprising the steps of:
(a) detecting an identifier to determine a type of packet being received;
(b) if a high priority packet is detected, receiving high priority data;
(c) if a low priority packet is detected, receiving low priority data; and
(d) if a hybrid frame is detected, receiving low priority data and high priority data by the steps including:
(1) receiving a next byte in the hybrid frame;
(2) if the next byte is a high priority data identifier, receiving one or more high priority data bytes in the hybrid frame;
(3) if the next byte in the hybrid frame is not a high priority identifier, receiving one or more bytes of low priority data, the number of low priority bytes not to exceed the interrupt boundary byte count, wherein the interrupt boundary byte count is equal to a number of bytes transferable in a high priority packet time minus a maximum number of high priority bytes generated per the high priority packet time, and wherein the high priority packet time is an interval of time between a generation of a plurality of high priority bytes;
(4) returning to step (1) until a last data byte of the hybrid frame is received; and
(5) error checking the low priority data using an error correction code from the hybrid frame;
wherein the high priority data is processed with a higher priority than the low priority data.

33. The method of claim 32, wherein the interrupt boundary byte count is received from a remote source.

34. The method of claim 32, wherein the interrupt boundary byte count is calculated, comprising the steps of:
determining a maximum number of bytes transferred across a link in one high priority packet time, B, by multiplying the high priority packet time by a bit rate of the link divided by a number of bits per byte;
determining a maximum number of high priority data bytes transmitted over the link in one high priority packet time, M; and
subtracting M from B to obtain the interrupt boundary byte count.

35. The method of claim 32, wherein the step (3) of if the next byte in the hybrid frame is not a low priority identifier, receiving one or more bytes of low priority data, comprises the step of storing the one or more bytes of low priority data in a memory.

36. The method of claim 32, wherein the high priority data is processed as received and the low priority data is stored.

37. A method for multiplexing high priority data, intermediate priority data, and low priority data for transmission across a communications link, the link having a maximum bandwidth with a byte transfer period equal to an amount of time needed to transfer one byte of data over the communications link, the method comprising the steps of:

a. determining a high priority packet time;
b. determining a maximum number of bytes transferred in one high priority packet time;
c. determining a maximum number of high priority data bytes transferred in one high priority packet time;
d. subtracting the maximum number of high priority bytes from the maximum number of bytes to obtain an interrupt boundary byte count;
e. multiplexing high priority data, intermediate priority data, and low priority data, wherein the step of multiplexing includes the steps of:
  1. if there is high priority data, transmitting the high priority data;
  2. transmitting J bytes of intermediate priority data and low priority data, wherein J is not greater than the interrupt boundary byte count; and
  3. returning to step 1.

38. The method of claim 37, wherein step 2 further comprises the step of transmitting all intermediate priority data bytes prior to transmitting low priority data bytes.

39. The method of claim 37, wherein step 2 further comprises the step of transmitting X intermediate priority data bytes prior to transmitting low priority data bytes, wherein X is not greater that the interrupt boundary byte count.

40. A method for demultiplexing, comprising the steps of:
if high priority data is detected, receiving the high priority data;
if intermediate or low priority data is detected, checking one byte after a number of intermediate or low priority data bytes to determine if following data is high priority data, the number equal to an interrupt boundary byte count; and
repeating the above steps until all data is demultiplexed, further
wherein the interrupt boundary byte count is calculated, comprising the steps of:
  determining a maximum number of bytes transferred across a link in one high priority packet time, B, by multiplying the high priority packet time by a bit rate of the link divided by a number of bits per byte;
  determining a maximum number of high priority data bytes transmitted over the link in one high priority packet time, M; and
  subtracting M from B to obtain the interrupt boundary byte count.

41. A method for demultiplexing, comprising the steps of:
if high priority data is detected, receiving the high priority data;
if intermediate or low priority data is detected, checking one byte after a number of intermediate or low priority data bytes to determine if following data is high priority data, the number equal to an interrupt boundary byte count; and
repeating the above steps until all data is demultiplexed, further comprising the steps of:
  setting a intermediate or low priority byte count;
  terminating the demultiplexing of a particular frame of data once a number of intermediate or low priority packets equal to the intermediate or low priority byte count are demultiplexed from the particular frame.

\* \* \* \* \*

UNITED STATES PATENT AND TRADEMARK OFFICE
CERTIFICATE OF CORRECTION

PATENT NO. : 6,275,502 B1
DATED : August 14, 2001
INVENTOR(S) : Harinarayana Arimilli It is certified that error appears in the above-identified patent and that said Letters Patent is hereby corrected as shown below:

Column 17,
Line 4, delete "a" after "selection of" and insert -- $\alpha$ --, therefor.

Column 21,
Line 2, delete "geode" and insert -- gcode --, therefor.

Column 42,
Lines 7 and 56, delete "a low" and insert -- the high --, therefor.

Signed and Sealed this

Tenth Day of December, 2002

JAMES E. ROGAN
*Director of the United States Patent and Trademark Office*